United States Patent
Beamon et al.

(10) Patent No.: US 9,525,488 B2
(45) Date of Patent: Dec. 20, 2016

(54) DIGITAL DATA SERVICES AND/OR POWER DISTRIBUTION IN OPTICAL FIBER-BASED DISTRIBUTED COMMUNICATIONS SYSTEMS PROVIDING DIGITAL DATA AND RADIO FREQUENCY (RF) COMMUNICATIONS SERVICES, AND RELATED COMPONENTS AND METHODS

(75) Inventors: Hubert Blair Beamon, Haltom City, TX (US); Chois Alven Blackwell, Jr., North Richland Hills, TX (US); Boyd Grant Brower, Keller, TX (US)

(73) Assignee: Corning Optical Communications LLC, Hickory, NC (US)

( * ) Notice: Subject to any disclaimer, the term of this patent is extended or adjusted under 35 U.S.C. 154(b) by 1348 days.

(21) Appl. No.: 13/025,719

(22) Filed: Feb. 11, 2011

(65) Prior Publication Data

US 2011/0268452 A1  Nov. 3, 2011

Related U.S. Application Data

(60) Provisional application No. 61/330,385, filed on May 2, 2010, provisional application No. 61/330,383, filed (Continued)

(51) Int. Cl.
*H04B 10/2575* (2013.01)
*G02B 6/028* (2006.01)
*G02B 6/036* (2006.01)

(52) U.S. Cl.
CPC ....... *H04B 10/25758* (2013.01); *G02B 6/0288* (2013.01); *G02B 6/0365* (2013.01)

(58) Field of Classification Search
CPC .............. G02B 6/0288; G02B 6/0365; H04B 10/25758
See application file for complete search history.

(56) References Cited

U.S. PATENT DOCUMENTS

| | | |
|---|---|---|
| 4,365,865 A | 12/1982 | Stiles |
| 4,867,527 A | 9/1989 | Dotti et al. |

(Continued)

FOREIGN PATENT DOCUMENTS

| | | |
|---|---|---|
| AU | 645192 B2 | 1/1994 |
| AU | 731180 B2 | 3/2001 |

(Continued)

OTHER PUBLICATIONS

Cooper, A.J., "Fibre/Radio for the Provision of Cordless/Mobile Telephony Services in the Access Network," Electronics Letters, 1990, pp. 2054-2056, vol. 26, No. 24.

(Continued)

*Primary Examiner* — Ajay Cattungal
(74) *Attorney, Agent, or Firm* — C. Keith Montgomery, Esq.

(57) ABSTRACT

Embodiments include distribution in optical fiber-based distributed communications systems configured to provide digital data services and radio frequency (RF) communications services, and related components and methods. Embodiments disclosed include units that can be provided in optical fiber-based distributed communications systems that are configured to support RF communication services and digital data services. The units may also be configured to support providing distribution of power.

39 Claims, 43 Drawing Sheets

Related U.S. Application Data on May 2, 2010, provisional application No. 61/330,386, filed on May 2, 2010, provisional application No. 61/393,177, filed on Oct. 14, 2010, provisional application No. 61/392,660, filed on Oct. 13, 2010, provisional application No. 61/392,687, filed on Oct. 13, 2010.

(56) References Cited

U.S. PATENT DOCUMENTS

| | | |
|---|---|---|
| 4,889,977 A | 12/1989 | Haydon |
| 4,896,939 A | 1/1990 | O'Brien |
| 4,916,460 A | 4/1990 | Powell |
| 4,972,505 A | 11/1990 | Isberg |
| 5,039,195 A | 8/1991 | Jenkins et al. |
| 5,042,086 A | 8/1991 | Cole et al. |
| 5,125,060 A | 6/1992 | Edmundson |
| 5,189,718 A | 2/1993 | Barrett et al. |
| 5,189,719 A | 2/1993 | Coleman et al. |
| 5,206,655 A | 4/1993 | Caille et al. |
| 5,210,812 A | 5/1993 | Nilsson et al. |
| 5,260,957 A | 11/1993 | Hakimi et al. |
| 5,263,108 A | 11/1993 | Kurokawa et al. |
| 5,267,122 A | 11/1993 | Glover et al. |
| 5,268,971 A | 12/1993 | Nilsson et al. |
| 5,280,472 A | 1/1994 | Gilhousen et al. |
| 5,295,154 A | 3/1994 | Meier et al. |
| 5,299,947 A | 4/1994 | Barnard |
| 5,301,056 A | 4/1994 | O'Neill |
| 5,339,058 A | 8/1994 | Lique |
| 5,339,184 A | 8/1994 | Tang |
| 5,377,035 A | 12/1994 | Wang et al. |
| 5,379,455 A | 1/1995 | Koschek |
| 5,400,391 A | 3/1995 | Emura et al. |
| 5,404,570 A | 4/1995 | Charas et al. |
| 5,424,864 A | 6/1995 | Emura |
| 5,428,636 A | 6/1995 | Meier |
| 5,444,564 A | 8/1995 | Newberg |
| 5,457,557 A | 10/1995 | Zarem et al. |
| 5,459,727 A | 10/1995 | Vannucci |
| 5,469,523 A | 11/1995 | Blew et al. |
| 5,499,241 A | 3/1996 | Thompson et al. |
| 5,504,746 A | 4/1996 | Meier |
| 5,519,691 A | 5/1996 | Darcie et al. |
| 5,543,000 A | 8/1996 | Lique |
| 5,544,161 A | 8/1996 | Bigham et al. |
| 5,546,443 A | 8/1996 | Raith |
| 5,553,064 A | 9/1996 | Paff et al. |
| 5,557,698 A | 9/1996 | Gareis et al. |
| 5,574,815 A | 11/1996 | Kneeland |
| 5,598,288 A | 1/1997 | Collar |
| 5,603,080 A | 2/1997 | Kallander et al. |
| 5,615,034 A | 3/1997 | Hori |
| 5,621,786 A | 4/1997 | Fischer et al. |
| 5,627,879 A | 5/1997 | Russell et al. |
| 5,640,678 A | 6/1997 | Ishikawa et al. |
| 5,642,405 A | 6/1997 | Fischer et al. |
| 5,644,622 A | 7/1997 | Russell et al. |
| 5,648,961 A | 7/1997 | Ebihara |
| 5,651,081 A | 7/1997 | Blew et al. |
| 5,657,374 A | 8/1997 | Russell et al. |
| 5,668,562 A | 9/1997 | Cutrer et al. |
| 5,677,974 A | 10/1997 | Elms et al. |
| 5,682,256 A | 10/1997 | Motley et al. |
| 5,684,799 A | 11/1997 | Bigham et al. |
| 5,689,355 A | 11/1997 | Okubo et al. |
| 5,703,602 A | 12/1997 | Casebolt |
| 5,726,984 A | 3/1998 | Kubler et al. |
| 5,774,789 A | 6/1998 | van der Kaay et al. |
| 5,790,536 A | 8/1998 | Mahany et al. |
| 5,790,606 A | 8/1998 | Dent |
| 5,802,173 A | 9/1998 | Hamilton-Piercy et al. |
| 5,802,473 A | 9/1998 | Rutledge et al. |
| 5,805,983 A | 9/1998 | Naidu et al. |
| 5,809,422 A | 9/1998 | Raleigh et al. |
| 5,812,296 A | 9/1998 | Tarusawa et al. |
| 5,818,619 A | 10/1998 | Medved et al. |
| 5,821,510 A | 10/1998 | Cohen et al. |
| 5,825,651 A | 10/1998 | Gupta et al. |
| 5,825,829 A | 10/1998 | Borazjani et al. |
| 5,832,364 A | 11/1998 | Gustafson |
| 5,838,474 A | 11/1998 | Stilling |
| 5,852,651 A | 12/1998 | Fischer et al. |
| 5,854,986 A | 12/1998 | Dorren et al. |
| 5,867,485 A | 2/1999 | Chambers et al. |
| 5,880,863 A | 3/1999 | Rideout et al. |
| 5,881,200 A | 3/1999 | Burt |
| 5,883,882 A | 3/1999 | Schwartz |
| 5,890,055 A | 3/1999 | Chu et al. |
| 5,896,568 A | 4/1999 | Tseng et al. |
| 5,903,834 A | 5/1999 | Wallstedt et al. |
| 5,910,776 A | 6/1999 | Black |
| 5,913,003 A | 6/1999 | Arroyo et al. |
| 5,917,636 A | 6/1999 | Wake et al. |
| 5,930,682 A | 7/1999 | Schwartz et al. |
| 5,936,754 A | 8/1999 | Ariyavisitakul et al. |
| 5,943,372 A | 8/1999 | Gans et al. |
| 5,946,622 A | 8/1999 | Bojeryd |
| 5,949,564 A | 9/1999 | Wake |
| 5,959,531 A | 9/1999 | Gallagher, III et al. |
| 5,960,344 A | 9/1999 | Mahany |
| 5,969,837 A | 10/1999 | Farber et al. |
| 5,982,413 A | 11/1999 | Irie et al. |
| 5,983,070 A | 11/1999 | Georges et al. |
| 5,987,303 A | 11/1999 | Dutta et al. |
| 6,005,884 A | 12/1999 | Cook et al. |
| 6,006,105 A | 12/1999 | Rostoker et al. |
| 6,014,546 A | 1/2000 | Georges et al. |
| 6,016,426 A | 1/2000 | Bodell |
| 6,023,625 A | 2/2000 | Myers, Jr. |
| 6,046,992 A | 4/2000 | Meier et al. |
| 6,078,622 A | 6/2000 | Boytim et al. |
| 6,088,381 A | 7/2000 | Myers, Jr. |
| 6,112,086 A | 8/2000 | Wala |
| 6,124,957 A | 9/2000 | Goel et al. |
| 6,127,917 A | 10/2000 | Tuttle |
| 6,128,470 A | 10/2000 | Naidu et al. |
| 6,148,041 A | 11/2000 | Dent |
| 6,150,921 A | 11/2000 | Werb et al. |
| 6,157,810 A | 12/2000 | Georges et al. |
| 6,219,553 B1 | 4/2001 | Panasik |
| 6,222,503 B1 | 4/2001 | Gietema et al. |
| 6,232,870 B1 | 5/2001 | Garber et al. |
| 6,236,789 B1 | 5/2001 | Fitz |
| 6,240,274 B1 | 5/2001 | Izadpanah |
| 6,268,946 B1 | 7/2001 | Larkin et al. |
| 6,292,673 B1 | 9/2001 | Maeda et al. |
| 6,301,240 B1 | 10/2001 | Slabinski et al. |
| 6,314,163 B1 | 11/2001 | Acampora |
| 6,317,599 B1 | 11/2001 | Rappaport et al. |
| 6,323,980 B1 | 11/2001 | Bloom |
| 6,324,391 B1 | 11/2001 | Bodell |
| 6,330,244 B1 | 12/2001 | Swartz et al. |
| 6,334,219 B1 | 12/2001 | Hill et al. |
| 6,337,754 B1 | 1/2002 | Imajo |
| 6,353,406 B1 | 3/2002 | Lanzl et al. |
| 6,353,600 B1 | 3/2002 | Schwartz et al. |
| 6,356,374 B1 | 3/2002 | Farhan |
| 6,359,714 B1 | 3/2002 | Imajo |
| 6,373,611 B1 | 4/2002 | Farhan et al. |
| 6,374,078 B1 | 4/2002 | Williams et al. |
| 6,374,124 B1 | 4/2002 | Slabinski |
| 6,374,311 B1 | 4/2002 | Mahany et al. |
| 6,389,010 B1 | 5/2002 | Kubler et al. |
| 6,392,770 B1 | 5/2002 | Sasai et al. |
| 6,405,018 B1 | 6/2002 | Reudink et al. |
| 6,405,058 B2 | 6/2002 | Bobier |
| 6,405,308 B1 | 6/2002 | Gupta et al. |
| 6,438,301 B1 | 8/2002 | Johnson et al. |
| 6,438,371 B1 | 8/2002 | Fujise et al. |
| 6,452,915 B1 | 9/2002 | Jorgensen |
| 6,477,154 B1 | 11/2002 | Cheong et al. |
| 6,480,702 B1 | 11/2002 | Sabat, Jr. |
| 6,486,907 B1 | 11/2002 | Farber et al. |

(56) References Cited

U.S. PATENT DOCUMENTS

| | | |
|---|---|---|
| 6,496,290 B1 | 12/2002 | Lee |
| 6,501,768 B2 | 12/2002 | Marin et al. |
| 6,501,942 B1 | 12/2002 | Weissman et al. |
| 6,501,965 B1 | 12/2002 | Lucidarme |
| 6,504,636 B1 | 1/2003 | Seto et al. |
| 6,512,478 B1 | 1/2003 | Chien |
| 6,519,395 B1 | 2/2003 | Bevan et al. |
| 6,523,177 B1 | 2/2003 | Brown |
| 6,525,855 B1 | 2/2003 | Westbrook et al. |
| 6,526,264 B2 | 2/2003 | Sugar et al. |
| 6,549,772 B1 | 4/2003 | Chavez et al. |
| 6,556,551 B1 | 4/2003 | Schwartz |
| 6,560,441 B1 | 5/2003 | Sabat, Jr. et al. |
| 6,577,794 B1 | 6/2003 | Currie et al. |
| 6,577,801 B2 | 6/2003 | Broderick et al. |
| 6,580,402 B2 | 6/2003 | Navarro et al. |
| 6,580,905 B1 | 6/2003 | Naidu et al. |
| 6,580,918 B1 | 6/2003 | Leickel et al. |
| 6,583,763 B2 | 6/2003 | Judd |
| 6,594,496 B2 | 7/2003 | Schwartz |
| 6,597,325 B2 | 7/2003 | Judd et al. |
| 6,606,430 B2 | 8/2003 | Bartur et al. |
| 6,615,074 B2 | 9/2003 | Mickle et al. |
| 6,634,811 B1 | 10/2003 | Gertel et al. |
| 6,636,747 B2 | 10/2003 | Harada et al. |
| 6,640,103 B1 | 10/2003 | Inman et al. |
| 6,643,437 B1 | 11/2003 | Park |
| 6,652,158 B2 | 11/2003 | Bartur et al. |
| 6,654,616 B1 | 11/2003 | Pope, Jr. et al. |
| 6,657,535 B1 | 12/2003 | Magbie et al. |
| 6,658,269 B1 | 12/2003 | Golemon et al. |
| 6,670,930 B2 | 12/2003 | Navarro |
| 6,675,294 B1 | 1/2004 | Gupta et al. |
| 6,687,437 B1 | 2/2004 | Starnes et al. |
| 6,690,328 B2 | 2/2004 | Judd |
| 6,697,603 B1 | 2/2004 | Lovinggood et al. |
| 6,704,298 B1 | 3/2004 | Matsumiya et al. |
| 6,704,545 B1 | 3/2004 | Wala |
| 6,704,579 B2 | 3/2004 | Woodhead et al. |
| 6,710,366 B1 | 3/2004 | Lee et al. |
| 6,731,880 B2 | 5/2004 | Westbrook et al. |
| 6,758,913 B1 | 7/2004 | Tunney et al. |
| 6,763,226 B1 | 7/2004 | McZeal, Jr. |
| 6,771,862 B2 | 8/2004 | Karnik et al. |
| 6,771,933 B1 | 8/2004 | Eng et al. |
| 6,784,802 B1 | 8/2004 | Stanescu |
| 6,785,558 B1 | 8/2004 | Stratford et al. |
| 6,788,666 B1 | 9/2004 | Linebarger et al. |
| 6,801,767 B1 | 10/2004 | Schwartz et al. |
| 6,807,374 B1 | 10/2004 | Imajo et al. |
| 6,812,824 B1 | 11/2004 | Goldinger et al. |
| 6,812,905 B2 | 11/2004 | Thomas et al. |
| 6,826,164 B2 | 11/2004 | Mani et al. |
| 6,826,165 B1 | 11/2004 | Meier et al. |
| 6,826,337 B2 | 11/2004 | Linnell |
| 6,831,901 B2 | 12/2004 | Millar |
| 6,842,433 B2 | 1/2005 | West et al. |
| 6,842,459 B1 | 1/2005 | Binder |
| 6,847,856 B1 | 1/2005 | Bohannon |
| 6,850,510 B2 | 2/2005 | Kubler et al. |
| 6,865,390 B2 | 3/2005 | Goss et al. |
| 6,873,823 B2 | 3/2005 | Hasarchi et al. |
| 6,876,056 B2 | 4/2005 | Tilmans et al. |
| 6,876,852 B1 | 4/2005 | Li et al. |
| 6,879,290 B1 | 4/2005 | Toutain et al. |
| 6,882,833 B2 | 4/2005 | Nguyen |
| 6,883,710 B2 | 4/2005 | Chung |
| 6,885,846 B1 | 4/2005 | Panasik et al. |
| 6,889,060 B2 | 5/2005 | Fernando et al. |
| 6,895,253 B1 | 5/2005 | Carloni et al. |
| 6,909,399 B1 | 6/2005 | Zegelin et al. |
| 6,915,058 B2 | 7/2005 | Pons |
| 6,919,858 B2 | 7/2005 | Rofougaran |
| 6,920,330 B2 | 7/2005 | Caronni et al. |
| 6,924,997 B2 | 8/2005 | Chen et al. |
| 6,930,987 B1 | 8/2005 | Fukuda et al. |
| 6,931,183 B2 | 8/2005 | Panak et al. |
| 6,933,849 B2 | 8/2005 | Sawyer |
| 6,961,312 B2 | 11/2005 | Kubler et al. |
| 6,963,289 B2 | 11/2005 | Aljadeff et al. |
| 6,963,552 B2 | 11/2005 | Sabat, Jr. et al. |
| 6,965,718 B2 | 11/2005 | Koertel |
| 6,968,107 B2 | 11/2005 | Belardi et al. |
| 6,970,652 B2 | 11/2005 | Zhang et al. |
| 6,973,243 B2 | 12/2005 | Koyasu et al. |
| 6,974,262 B1 | 12/2005 | Rickenbach |
| 7,006,465 B2 | 2/2006 | Toshimitsu et al. |
| 7,013,087 B2 | 3/2006 | Suzuki et al. |
| 7,015,826 B1 | 3/2006 | Chan et al. |
| 7,016,308 B1 | 3/2006 | Gallagher |
| 7,020,451 B2 | 3/2006 | Sugar et al. |
| 7,020,473 B2 | 3/2006 | Splett |
| 7,024,166 B2 | 4/2006 | Wallace et al. |
| 7,035,512 B2 | 4/2006 | Van Bijsterveld |
| 7,035,671 B2 | 4/2006 | Solum |
| 7,039,399 B2 | 5/2006 | Fischer |
| 7,047,028 B2 | 5/2006 | Cagenius |
| 7,050,017 B2 | 5/2006 | King et al. |
| 7,053,838 B2 | 5/2006 | Judd |
| 7,054,513 B2 | 5/2006 | Herz et al. |
| 7,072,586 B2 | 7/2006 | Aburakawa et al. |
| 7,082,320 B2 | 7/2006 | Kattukaran et al. |
| 7,084,769 B2 | 8/2006 | Bauer et al. |
| 7,092,710 B1 | 8/2006 | Stoter et al. |
| 7,093,985 B2 | 8/2006 | Lord et al. |
| 7,103,312 B2 | 9/2006 | Judd et al. |
| 7,103,377 B2 | 9/2006 | Bauman et al. |
| 7,106,931 B2 | 9/2006 | Sutehall et al. |
| 7,110,381 B1 | 9/2006 | O'Sullivan et al. |
| 7,114,859 B1 | 10/2006 | Tuohimaa et al. |
| 7,127,175 B2 | 10/2006 | Mani et al. |
| 7,127,176 B2 | 10/2006 | Sasaki |
| 7,133,697 B2 | 11/2006 | Judd et al. |
| 7,142,503 B1 | 11/2006 | Grant et al. |
| 7,142,535 B2 | 11/2006 | Kubler et al. |
| 7,160,032 B2 | 1/2007 | Nagashima et al. |
| 7,181,206 B2 | 2/2007 | Pedersen |
| 7,199,443 B2 | 4/2007 | Elsharawy |
| 7,200,305 B2 | 4/2007 | Dion et al. |
| 7,200,391 B2 | 4/2007 | Chung et al. |
| 7,228,072 B2 | 6/2007 | Mickelsson et al. |
| 7,245,603 B1 | 7/2007 | Lucidarme et al. |
| 7,257,328 B2 | 8/2007 | Levinson et al. |
| 7,263,293 B2 | 8/2007 | Ommodt et al. |
| 7,269,311 B2 | 9/2007 | Kim et al. |
| 7,286,843 B2 | 10/2007 | Scheck |
| 7,286,854 B2 | 10/2007 | Ferrato et al. |
| 7,295,119 B2 | 11/2007 | Rappaport et al. |
| 7,310,430 B1 | 12/2007 | Mallya et al. |
| 7,313,415 B2 | 12/2007 | Wake et al. |
| 7,315,735 B2 | 1/2008 | Graham |
| 7,324,730 B2 | 1/2008 | Varkey et al. |
| 7,343,164 B2 | 3/2008 | Kallstenius |
| 7,349,633 B2 | 3/2008 | Lee et al. |
| 7,359,408 B2 | 4/2008 | Kim |
| 7,359,674 B2 | 4/2008 | Markki et al. |
| 7,366,150 B2 | 4/2008 | Lee et al. |
| 7,366,151 B2 | 4/2008 | Kubler et al. |
| 7,369,526 B2 | 5/2008 | Lechleider et al. |
| 7,379,669 B2 | 5/2008 | Kim |
| 7,392,029 B2 | 6/2008 | Pronkine |
| 7,394,883 B2 | 7/2008 | Funakubo et al. |
| 7,403,156 B2 | 7/2008 | Coppi et al. |
| 7,409,159 B2 | 8/2008 | Izadpanah |
| 7,412,224 B2 | 8/2008 | Kotola et al. |
| 7,424,228 B1 | 9/2008 | Williams et al. |
| 7,442,679 B2 | 10/2008 | Stolte et al. |
| 7,444,051 B2 | 10/2008 | Tatat et al. |
| 7,450,853 B2 | 11/2008 | Kim et al. |
| 7,450,854 B2 | 11/2008 | Lee et al. |
| 7,451,365 B2 | 11/2008 | Wang et al. |
| 7,457,646 B2 | 11/2008 | Mahany et al. |
| 7,460,507 B2 | 12/2008 | Kubler et al. |
| 7,460,829 B2 | 12/2008 | Utsumi et al. |

(56) References Cited

U.S. PATENT DOCUMENTS

| | | | |
|---|---|---|---|
| 7,460,831 B2 | 12/2008 | Hasarchi | |
| 7,466,925 B2 | 12/2008 | Iannelli | |
| 7,469,105 B2* | 12/2008 | Wake et al. | 398/171 |
| 7,477,597 B2 | 1/2009 | Segel | |
| 7,483,504 B2 | 1/2009 | Shapira et al. | |
| 7,493,129 B1* | 2/2009 | Mostafa | H04W 56/0045 455/502 |
| 7,496,070 B2 | 2/2009 | Vesuna | |
| 7,496,384 B2 | 2/2009 | Seto et al. | |
| 7,522,552 B2 | 4/2009 | Fein et al. | |
| 7,542,452 B2 | 6/2009 | Penumetsa | |
| 7,548,695 B2 | 6/2009 | Wake | |
| 7,551,641 B2 | 6/2009 | Pirzada et al. | |
| 7,552,246 B2 | 6/2009 | Mahany et al. | |
| 7,557,758 B2 | 7/2009 | Rofougaran | |
| 7,580,384 B2 | 8/2009 | Kubler et al. | |
| 7,586,861 B2 | 9/2009 | Kubler et al. | |
| 7,590,354 B2 | 9/2009 | Sauer et al. | |
| 7,599,420 B2 | 10/2009 | Forenza et al. | |
| 7,606,594 B2 | 10/2009 | Jesse et al. | |
| 7,627,250 B2 | 12/2009 | George et al. | |
| 7,630,690 B2 | 12/2009 | Kaewell, Jr. et al. | |
| 7,633,934 B2 | 12/2009 | Kubler et al. | |
| 7,646,743 B2 | 1/2010 | Kubler et al. | |
| 7,646,777 B2 | 1/2010 | Hicks, III et al. | |
| 7,653,397 B2 | 1/2010 | Pernu et al. | |
| 7,668,153 B2 | 2/2010 | Zavadsky | |
| 7,668,565 B2 | 2/2010 | Ylänen et al. | |
| 7,684,709 B2* | 3/2010 | Ray et al. | 398/115 |
| 7,688,811 B2 | 3/2010 | Kubler et al. | |
| 7,693,486 B2 | 4/2010 | Kasslin et al. | |
| 7,697,467 B2 | 4/2010 | Kubler et al. | |
| 7,715,375 B2 | 5/2010 | Kubler et al. | |
| 7,715,466 B1 | 5/2010 | Oh et al. | |
| 7,751,374 B2 | 7/2010 | Donovan | |
| 7,751,838 B2 | 7/2010 | Ramesh et al. | |
| 7,760,703 B2 | 7/2010 | Kubler et al. | |
| 7,761,093 B2 | 7/2010 | Sabat, Jr. et al. | |
| 7,764,978 B1 | 7/2010 | West | |
| 7,768,951 B2 | 8/2010 | Kubler et al. | |
| 7,773,573 B2 | 8/2010 | Chung et al. | |
| 7,778,603 B2 | 8/2010 | Palin et al. | |
| 7,783,263 B2 | 8/2010 | Sperlich et al. | |
| 7,787,854 B2 | 8/2010 | Conyers et al. | |
| 7,805,073 B2 | 9/2010 | Sabat, Jr. et al. | |
| 7,809,012 B2 | 10/2010 | Ruuska et al. | |
| 7,817,958 B2 | 10/2010 | Scheinert et al. | |
| 7,817,969 B2 | 10/2010 | Castaneda et al. | |
| 7,835,328 B2 | 11/2010 | Stephens et al. | |
| 7,844,273 B2 | 11/2010 | Scheinert | |
| 7,848,316 B2 | 12/2010 | Kubler et al. | |
| 7,848,731 B1* | 12/2010 | Dianda et al. | 455/402 |
| 7,853,234 B2 | 12/2010 | Afsahi | |
| 7,870,321 B2 | 1/2011 | Rofougaran | |
| 7,881,755 B1 | 2/2011 | Mishra et al. | |
| 7,894,423 B2 | 2/2011 | Kubler et al. | |
| 7,899,007 B2 | 3/2011 | Kubler et al. | |
| 7,907,972 B2 | 3/2011 | Walton et al. | |
| 7,912,043 B2 | 3/2011 | Kubler et al. | |
| 7,916,706 B2 | 3/2011 | Kubler et al. | |
| 7,917,145 B2 | 3/2011 | Mahany et al. | |
| 7,920,553 B2 | 4/2011 | Kubler et al. | |
| 7,920,858 B2 | 4/2011 | Sabat, Jr. et al. | |
| 7,924,783 B1 | 4/2011 | Mahany et al. | |
| 7,929,940 B1 | 4/2011 | Dianda et al. | |
| 7,936,713 B2 | 5/2011 | Kubler et al. | |
| 7,948,897 B2 | 5/2011 | Stuart et al. | |
| 7,949,364 B2 | 5/2011 | Kasslin et al. | |
| 7,957,777 B1 | 6/2011 | Vu et al. | |
| 7,962,042 B2* | 6/2011 | Deas | 398/115 |
| 7,962,176 B2 | 6/2011 | Li et al. | |
| 7,969,009 B2 | 6/2011 | Chandrasekaran | |
| 7,969,911 B2 | 6/2011 | Mahany et al. | |
| 7,990,925 B2 | 8/2011 | Tinnakornsrisuphap et al. | |
| 7,996,020 B1 | 8/2011 | Chhabra | |
| 8,005,152 B2 | 8/2011 | Wegener | |
| 8,010,116 B2 | 8/2011 | Scheinert | |
| 8,018,907 B2 | 9/2011 | Kubler et al. | |
| 8,036,308 B2 | 10/2011 | Rofougaran | |
| 8,082,353 B2 | 12/2011 | Huber et al. | |
| 8,086,192 B2 | 12/2011 | Rofougaran et al. | |
| 8,107,464 B2 | 1/2012 | Schmidt et al. | |
| 8,135,102 B2 | 3/2012 | Wiwel et al. | |
| 8,155,525 B2 | 4/2012 | Cox | |
| 8,174,428 B2 | 5/2012 | Wegener | |
| 8,213,401 B2 | 7/2012 | Fischer et al. | |
| 8,270,387 B2 | 9/2012 | Cannon et al. | |
| 8,274,929 B2 | 9/2012 | Schmidt et al. | |
| 8,279,800 B2 | 10/2012 | Schmidt et al. | |
| 8,290,483 B2 | 10/2012 | Sabat, Jr. et al. | |
| 8,306,563 B2 | 11/2012 | Zavadsky et al. | |
| 8,346,091 B2 | 1/2013 | Kummetz et al. | |
| 8,346,278 B2 | 1/2013 | Wala et al. | |
| 8,422,884 B2 | 4/2013 | Mao | |
| 8,428,510 B2 | 4/2013 | Stratford et al. | |
| 8,457,562 B2 | 6/2013 | Zavadsky et al. | |
| 8,462,683 B2 | 6/2013 | Uyehara et al. | |
| 8,467,823 B2 | 6/2013 | Seki et al. | |
| 8,472,579 B2 | 6/2013 | Uyehara et al. | |
| 8,509,215 B2 | 8/2013 | Stuart | |
| 8,509,850 B2 | 8/2013 | Zavadsky et al. | |
| 8,526,970 B2 | 9/2013 | Wala et al. | |
| 8,532,242 B2 | 9/2013 | Fischer et al. | |
| 8,548,526 B2 | 10/2013 | Schmidt et al. | |
| 8,583,100 B2 | 11/2013 | Koziy et al. | |
| 8,626,245 B2 | 1/2014 | Zavadsky et al. | |
| 8,634,766 B2 | 1/2014 | Hobbs et al. | |
| 8,681,917 B2 | 3/2014 | McAllister et al. | |
| 8,682,338 B2 | 3/2014 | Lemson et al. | |
| 8,693,342 B2 | 4/2014 | Uyehara et al. | |
| 8,694,034 B2 | 4/2014 | Notargiacomo | |
| 8,699,982 B2 | 4/2014 | Singh | |
| 8,737,300 B2 | 5/2014 | Stapleton et al. | |
| 8,737,454 B2 | 5/2014 | Wala et al. | |
| 8,743,718 B2 | 6/2014 | Grenier et al. | |
| 8,743,756 B2 | 6/2014 | Uyehara et al. | |
| 8,792,933 B2 | 7/2014 | Chen | |
| 8,837,659 B2 | 9/2014 | Uyehara et al. | |
| 8,837,940 B2 | 9/2014 | Smith et al. | |
| 8,908,607 B2 | 12/2014 | Kummetz et al. | |
| 8,929,288 B2 | 1/2015 | Stewart et al. | |
| 8,948,816 B2 | 2/2015 | Fischer et al. | |
| 8,958,789 B2 | 2/2015 | Bauman et al. | |
| 8,976,067 B2 | 3/2015 | Fischer | |
| 9,001,811 B2 | 4/2015 | Wala et al. | |
| 9,042,732 B2 | 5/2015 | Cune et al. | |
| 2001/0000621 A1 | 5/2001 | Mitsuda et al. | |
| 2001/0036163 A1 | 11/2001 | Sabat, Jr. et al. | |
| 2001/0053011 A1 | 12/2001 | Imajo | |
| 2002/0003645 A1 | 1/2002 | Kim et al. | |
| 2002/0012336 A1 | 1/2002 | Hughes et al. | |
| 2002/0012495 A1 | 1/2002 | Sasai et al. | |
| 2002/0031113 A1 | 3/2002 | Dodds et al. | |
| 2002/0048071 A1 | 4/2002 | Suzuki et al. | |
| 2002/0055371 A1 | 5/2002 | Arnon et al. | |
| 2002/0075906 A1 | 6/2002 | Cole et al. | |
| 2002/0090915 A1 | 7/2002 | Komara et al. | |
| 2002/0092347 A1 | 7/2002 | Niekerk et al. | |
| 2002/0111149 A1 | 8/2002 | Shoki | |
| 2002/0111192 A1 | 8/2002 | Thomas et al. | |
| 2002/0114038 A1 | 8/2002 | Arnon et al. | |
| 2002/0123365 A1 | 9/2002 | Thorson et al. | |
| 2002/0126967 A1 | 9/2002 | Panak et al. | |
| 2002/0130778 A1 | 9/2002 | Nicholson | |
| 2002/0181668 A1 | 12/2002 | Masoian et al. | |
| 2002/0190845 A1 | 12/2002 | Moore | |
| 2003/0007214 A1 | 1/2003 | Aburakawa et al. | |
| 2003/0016418 A1 | 1/2003 | Westbrook et al. | |
| 2003/0045284 A1 | 3/2003 | Copley et al. | |
| 2003/0078052 A1 | 4/2003 | Atias et al. | |
| 2003/0078074 A1 | 4/2003 | Sesay et al. | |
| 2003/0141962 A1 | 7/2003 | Barink | |
| 2003/0161637 A1 | 8/2003 | Yamamoto et al. | |
| 2003/0165287 A1 | 9/2003 | Krill et al. | |

(56) References Cited

U.S. PATENT DOCUMENTS

| | | |
|---|---|---|
| 2003/0174099 A1 | 9/2003 | Bauer et al. |
| 2003/0209601 A1 | 11/2003 | Chung |
| 2004/0001719 A1 | 1/2004 | Sasaki |
| 2004/0008114 A1 | 1/2004 | Sawyer |
| 2004/0017785 A1 | 1/2004 | Zelst |
| 2004/0037300 A1 | 2/2004 | Lehr et al. |
| 2004/0041714 A1 | 3/2004 | Forster |
| 2004/0043764 A1 | 3/2004 | Bigham et al. |
| 2004/0047313 A1* | 3/2004 | Rumpf et al. ............... 370/335 |
| 2004/0078151 A1 | 4/2004 | Aljadeff et al. |
| 2004/0100930 A1 | 5/2004 | Shapira et al. |
| 2004/0105435 A1 | 6/2004 | Morioka |
| 2004/0106435 A1 | 6/2004 | Bauman et al. |
| 2004/0110469 A1 | 6/2004 | Judd et al. |
| 2004/0126068 A1 | 7/2004 | Van Bijsterveld |
| 2004/0146020 A1 | 7/2004 | Kubler et al. |
| 2004/0149736 A1 | 8/2004 | Clothier |
| 2004/0151164 A1 | 8/2004 | Kubler et al. |
| 2004/0151503 A1 | 8/2004 | Kashima et al. |
| 2004/0157623 A1 | 8/2004 | Splett |
| 2004/0160912 A1 | 8/2004 | Kubler et al. |
| 2004/0160913 A1 | 8/2004 | Kubler et al. |
| 2004/0162115 A1 | 8/2004 | Smith et al. |
| 2004/0162116 A1 | 8/2004 | Han et al. |
| 2004/0165573 A1 | 8/2004 | Kubler et al. |
| 2004/0175173 A1 | 9/2004 | Deas |
| 2004/0198451 A1 | 10/2004 | Varghese |
| 2004/0202257 A1 | 10/2004 | Mehta et al. |
| 2004/0203704 A1 | 10/2004 | Ommodt et al. |
| 2004/0203846 A1 | 10/2004 | Caronni et al. |
| 2004/0204109 A1 | 10/2004 | Hoppenstein |
| 2004/0208526 A1 | 10/2004 | Mibu |
| 2004/0218873 A1 | 11/2004 | Nagashima et al. |
| 2004/0230846 A1 | 11/2004 | Mancey et al. |
| 2004/0233877 A1 | 11/2004 | Lee et al. |
| 2004/0258105 A1 | 12/2004 | Spathas et al. |
| 2005/0052287 A1 | 3/2005 | Whitesmith et al. |
| 2005/0058451 A1 | 3/2005 | Ross |
| 2005/0068179 A1 | 3/2005 | Roesner |
| 2005/0076982 A1 | 4/2005 | Metcalf et al. |
| 2005/0078006 A1 | 4/2005 | Hutchins et al. |
| 2005/0093679 A1 | 5/2005 | Zai et al. |
| 2005/0099343 A1 | 5/2005 | Asrani et al. |
| 2005/0116821 A1 | 6/2005 | Wilsey et al. |
| 2005/0141545 A1 | 6/2005 | Fein et al. |
| 2005/0143077 A1 | 6/2005 | Charbonneau |
| 2005/0147071 A1 | 7/2005 | Karaoguz et al. |
| 2005/0148306 A1 | 7/2005 | Hiddink |
| 2005/0159108 A1 | 7/2005 | Fletcher et al. |
| 2005/0174236 A1 | 8/2005 | Brookner |
| 2005/0201761 A1 | 9/2005 | Bartur et al. |
| 2005/0219050 A1 | 10/2005 | Martin |
| 2005/0220458 A1* | 10/2005 | Kupershmidt ........... H01S 5/141 398/196 |
| 2005/0224585 A1 | 10/2005 | Durrant et al. |
| 2005/0226625 A1 | 10/2005 | Wake et al. |
| 2005/0232636 A1 | 10/2005 | Durrant et al. |
| 2005/0242188 A1 | 11/2005 | Vesuna |
| 2005/0252971 A1 | 11/2005 | Howarth et al. |
| 2005/0266797 A1 | 12/2005 | Utsumi et al. |
| 2005/0266854 A1 | 12/2005 | Niiho et al. |
| 2005/0269930 A1 | 12/2005 | Shimizu et al. |
| 2005/0271396 A1 | 12/2005 | Iannelli |
| 2006/0002326 A1 | 1/2006 | Vesuna |
| 2006/0014548 A1 | 1/2006 | Bolin et al. |
| 2006/0017633 A1 | 1/2006 | Pronkine |
| 2006/0019604 A1* | 1/2006 | Hasarchi ................ H04B 1/71 455/15 |
| 2006/0045054 A1 | 3/2006 | Utsumi et al. |
| 2006/0053324 A1 | 3/2006 | Giat et al. |
| 2006/0062579 A1 | 3/2006 | Kim et al. |
| 2006/0079290 A1 | 4/2006 | Seto et al. |
| 2006/0094470 A1 | 5/2006 | Wake et al. |
| 2006/0104643 A1* | 5/2006 | Lee et al. ................... 398/115 |
| 2006/0159388 A1 | 7/2006 | Kawase et al. |
| 2006/0182446 A1 | 8/2006 | Kim et al. |
| 2006/0182449 A1 | 8/2006 | Iannelli et al. |
| 2006/0189354 A1 | 8/2006 | Lee et al. |
| 2006/0233506 A1 | 10/2006 | Noonan et al. |
| 2006/0239630 A1 | 10/2006 | Hase et al. |
| 2006/0274704 A1 | 12/2006 | Desai et al. |
| 2007/0008939 A1 | 1/2007 | Fischer |
| 2007/0009266 A1 | 1/2007 | Bothwell et al. |
| 2007/0058978 A1 | 3/2007 | Lee et al. |
| 2007/0060045 A1 | 3/2007 | Prautzsch |
| 2007/0060055 A1 | 3/2007 | Desai et al. |
| 2007/0071128 A1 | 3/2007 | Meir et al. |
| 2007/0076649 A1 | 4/2007 | Lin et al. |
| 2007/0093273 A1 | 4/2007 | Cai |
| 2007/0149250 A1 | 6/2007 | Crozzoli et al. |
| 2007/0157251 A1* | 7/2007 | Shrivastava ...... G06F 17/30058 725/60 |
| 2007/0166042 A1 | 7/2007 | Seeds et al. |
| 2007/0208961 A1 | 9/2007 | Ghoshal et al. |
| 2007/0224954 A1 | 9/2007 | Gopi |
| 2007/0248358 A1* | 10/2007 | Sauer .................... G02B 6/4416 398/115 |
| 2007/0253714 A1 | 11/2007 | Seeds et al. |
| 2007/0257796 A1 | 11/2007 | Easton et al. |
| 2007/0264009 A1 | 11/2007 | Sabat, Jr. et al. |
| 2007/0274279 A1* | 11/2007 | Wood .................... H04W 88/10 370/343 |
| 2007/0285239 A1* | 12/2007 | Easton ................. G06K 7/0008 340/572.1 |
| 2007/0286599 A1* | 12/2007 | Sauer ............... H04B 10/25754 398/28 |
| 2007/0297005 A1 | 12/2007 | Montierth et al. |
| 2008/0007453 A1* | 1/2008 | Vassilakis ............. H01Q 1/246 342/368 |
| 2008/0013909 A1 | 1/2008 | Kostet et al. |
| 2008/0013956 A1 | 1/2008 | Ware et al. |
| 2008/0013957 A1 | 1/2008 | Akers et al. |
| 2008/0014948 A1 | 1/2008 | Scheinert |
| 2008/0026765 A1 | 1/2008 | Charbonneau |
| 2008/0031628 A1 | 2/2008 | Dragas et al. |
| 2008/0043714 A1 | 2/2008 | Pernu |
| 2008/0043784 A1* | 2/2008 | Wilcox ................. H01S 3/1394 372/18 |
| 2008/0056167 A1 | 3/2008 | Kim et al. |
| 2008/0058018 A1 | 3/2008 | Scheinert |
| 2008/0063387 A1 | 3/2008 | Yahata et al. |
| 2008/0080863 A1 | 4/2008 | Sauer et al. |
| 2008/0098203 A1 | 4/2008 | Master et al. |
| 2008/0118014 A1 | 5/2008 | Reunamaki et al. |
| 2008/0119198 A1 | 5/2008 | Hettstedt et al. |
| 2008/0124086 A1 | 5/2008 | Matthews |
| 2008/0124087 A1 | 5/2008 | Hartmann et al. |
| 2008/0129634 A1 | 6/2008 | Pera et al. |
| 2008/0134194 A1 | 6/2008 | Liu |
| 2008/0145061 A1 | 6/2008 | Lee et al. |
| 2008/0150514 A1 | 6/2008 | Codreanu et al. |
| 2008/0159226 A1 | 7/2008 | He et al. |
| 2008/0159744 A1 | 7/2008 | Soto et al. |
| 2008/0166094 A1 | 7/2008 | Bookbinder et al. |
| 2008/0168283 A1 | 7/2008 | Penning |
| 2008/0181282 A1 | 7/2008 | Wala et al. |
| 2008/0194226 A1 | 8/2008 | Rivas et al. |
| 2008/0207253 A1 | 8/2008 | Jaakkola et al. |
| 2008/0212969 A1 | 9/2008 | Fasshauer et al. |
| 2008/0219670 A1 | 9/2008 | Kim et al. |
| 2008/0232799 A1 | 9/2008 | Kim |
| 2008/0247716 A1 | 10/2008 | Thomas et al. |
| 2008/0253351 A1 | 10/2008 | Pernu et al. |
| 2008/0253773 A1 | 10/2008 | Zheng |
| 2008/0260388 A1 | 10/2008 | Kim et al. |
| 2008/0261656 A1 | 10/2008 | Bella et al. |
| 2008/0268833 A1 | 10/2008 | Huang et al. |
| 2008/0273844 A1 | 11/2008 | Kewitsch |
| 2008/0279137 A1 | 11/2008 | Pernu et al. |
| 2008/0280569 A1 | 11/2008 | Hazani et al. |
| 2008/0291830 A1 | 11/2008 | Pernu et al. |
| 2008/0292322 A1 | 11/2008 | Daghighian et al. |
| 2008/0298813 A1 | 12/2008 | Song et al. |
| 2008/0304831 A1 | 12/2008 | Miller, II et al. |

(56) References Cited

U.S. PATENT DOCUMENTS

| | | |
|---|---|---|
| 2008/0310848 A1 | 12/2008 | Yasuda et al. |
| 2008/0311944 A1 | 12/2008 | Hansen et al. |
| 2009/0022304 A1 | 1/2009 | Kubler et al. |
| 2009/0028087 A1 | 1/2009 | Nguyen et al. |
| 2009/0028317 A1 | 1/2009 | Ling et al. |
| 2009/0041413 A1 | 2/2009 | Hurley |
| 2009/0047023 A1 | 2/2009 | Pescod et al. |
| 2009/0059903 A1 | 3/2009 | Kubler et al. |
| 2009/0061796 A1 | 3/2009 | Arkko et al. |
| 2009/0061939 A1 | 3/2009 | Andersson et al. |
| 2009/0073916 A1 | 3/2009 | Zhang et al. |
| 2009/0081985 A1 | 3/2009 | Rofougaran et al. |
| 2009/0086693 A1 | 4/2009 | Kennedy |
| 2009/0087181 A1 | 4/2009 | Gray |
| 2009/0088072 A1 | 4/2009 | Rofougaran et al. |
| 2009/0092394 A1 | 4/2009 | Wei et al. |
| 2009/0097855 A1 | 4/2009 | Thelen et al. |
| 2009/0135078 A1 | 5/2009 | Lindmark et al. |
| 2009/0149221 A1 | 6/2009 | Liu et al. |
| 2009/0154621 A1 | 6/2009 | Shapira et al. |
| 2009/0169163 A1 | 7/2009 | Abbott, III et al. |
| 2009/0175214 A1 | 7/2009 | Sfar et al. |
| 2009/0180407 A1* | 7/2009 | Sabat ............... H04B 10/25754 370/280 |
| 2009/0180426 A1* | 7/2009 | Sabat ................. H04W 88/085 370/328 |
| 2009/0218407 A1 | 9/2009 | Rofougaran |
| 2009/0218657 A1 | 9/2009 | Rofougaran |
| 2009/0245084 A1 | 10/2009 | Moffatt et al. |
| 2009/0245153 A1 | 10/2009 | Li et al. |
| 2009/0245221 A1 | 10/2009 | Piipponen |
| 2009/0252136 A1 | 10/2009 | Mahany et al. |
| 2009/0252204 A1 | 10/2009 | Shatara et al. |
| 2009/0252205 A1 | 10/2009 | Rheinfelder et al. |
| 2009/0258652 A1* | 10/2009 | Lambert ............... H04W 88/04 455/446 |
| 2009/0285147 A1 | 11/2009 | Subasic et al. |
| 2009/0290632 A1 | 11/2009 | Wegener |
| 2010/0002626 A1 | 1/2010 | Schmidt et al. |
| 2010/0002661 A1 | 1/2010 | Schmidt et al. |
| 2010/0009394 A1 | 1/2010 | Guo |
| 2010/0027443 A1 | 2/2010 | LoGalbo et al. |
| 2010/0054227 A1 | 3/2010 | Hettstedt et al. |
| 2010/0056200 A1 | 3/2010 | Tolonen |
| 2010/0067426 A1* | 3/2010 | Voschina ............. H04W 88/08 370/313 |
| 2010/0067906 A1* | 3/2010 | Adhikari ................. H01Q 1/246 398/48 |
| 2010/0080154 A1 | 4/2010 | Noh et al. |
| 2010/0080182 A1 | 4/2010 | Kubler et al. |
| 2010/0083330 A1* | 4/2010 | Bernstein ........... H04N 7/17309 725/111 |
| 2010/0087227 A1 | 4/2010 | Francos et al. |
| 2010/0091475 A1 | 4/2010 | Toms et al. |
| 2010/0118864 A1 | 5/2010 | Kubler et al. |
| 2010/0127937 A1 | 5/2010 | Chandrasekaran et al. |
| 2010/0134257 A1 | 6/2010 | Puleston et al. |
| 2010/0144337 A1 | 6/2010 | Dean |
| 2010/0148373 A1 | 6/2010 | Chandrasekaran |
| 2010/0156721 A1 | 6/2010 | Alamouti et al. |
| 2010/0177759 A1 | 7/2010 | Fischer et al. |
| 2010/0177760 A1 | 7/2010 | Cannon et al. |
| 2010/0188998 A1 | 7/2010 | Pernu et al. |
| 2010/0189439 A1 | 7/2010 | Novak et al. |
| 2010/0190509 A1 | 7/2010 | Davis |
| 2010/0196013 A1* | 8/2010 | Franklin ............. H04B 10/5165 398/115 |
| 2010/0202326 A1 | 8/2010 | Rofougaran et al. |
| 2010/0202356 A1 | 8/2010 | Fischer et al. |
| 2010/0208777 A1 | 8/2010 | Ogaz |
| 2010/0215028 A1 | 8/2010 | Fischer |
| 2010/0225413 A1 | 9/2010 | Rofougaran et al. |
| 2010/0225556 A1 | 9/2010 | Rofougaran et al. |
| 2010/0225557 A1 | 9/2010 | Rofougaran et al. |
| 2010/0232323 A1 | 9/2010 | Kubler et al. |
| 2010/0246558 A1 | 9/2010 | Harel |
| 2010/0255774 A1 | 10/2010 | Kenington |
| 2010/0258949 A1 | 10/2010 | Henderson et al. |
| 2010/0260063 A1 | 10/2010 | Kubler et al. |
| 2010/0278530 A1 | 11/2010 | Kummetz et al. |
| 2010/0290355 A1 | 11/2010 | Roy et al. |
| 2010/0290787 A1 | 11/2010 | Cox |
| 2010/0291949 A1 | 11/2010 | Shapira et al. |
| 2010/0296458 A1 | 11/2010 | Wala et al. |
| 2010/0296816 A1 | 11/2010 | Larsen |
| 2010/0309049 A1 | 12/2010 | Reunamäki et al. |
| 2010/0311472 A1 | 12/2010 | Rofougaran et al. |
| 2010/0311480 A1 | 12/2010 | Raines et al. |
| 2010/0329161 A1 | 12/2010 | Ylanen et al. |
| 2010/0329166 A1 | 12/2010 | Mahany et al. |
| 2011/0007724 A1 | 1/2011 | Mahany et al. |
| 2011/0007733 A1 | 1/2011 | Kubler et al. |
| 2011/0008042 A1 | 1/2011 | Stewart |
| 2011/0021146 A1 | 1/2011 | Pernu |
| 2011/0021224 A1 | 1/2011 | Koskinen et al. |
| 2011/0045767 A1 | 2/2011 | Rofougaran et al. |
| 2011/0055875 A1 | 3/2011 | Zussman |
| 2011/0065450 A1 | 3/2011 | Kazmi |
| 2011/0069668 A1 | 3/2011 | Chion et al. |
| 2011/0071734 A1 | 3/2011 | Van Wiemeersch et al. |
| 2011/0086614 A1 | 4/2011 | Brisebois et al. |
| 2011/0116393 A1 | 5/2011 | Hong et al. |
| 2011/0116572 A1 | 5/2011 | Lee et al. |
| 2011/0126071 A1 | 5/2011 | Han et al. |
| 2011/0141895 A1 | 6/2011 | Zhang |
| 2011/0149879 A1 | 6/2011 | Noriega et al. |
| 2011/0158298 A1 | 6/2011 | Djadi et al. |
| 2011/0170577 A1 | 7/2011 | Anvari |
| 2011/0170619 A1 | 7/2011 | Anvari |
| 2011/0182230 A1 | 7/2011 | Ohm et al. |
| 2011/0182255 A1 | 7/2011 | Kim et al. |
| 2011/0194475 A1 | 8/2011 | Kim et al. |
| 2011/0201368 A1 | 8/2011 | Faccin et al. |
| 2011/0204504 A1 | 8/2011 | Henderson et al. |
| 2011/0211439 A1 | 9/2011 | Manpuria et al. |
| 2011/0215901 A1 | 9/2011 | Van Wiemeersch et al. |
| 2011/0222415 A1 | 9/2011 | Ramamurthi et al. |
| 2011/0222434 A1 | 9/2011 | Chen |
| 2011/0222619 A1 | 9/2011 | Ramamurthi et al. |
| 2011/0223958 A1 | 9/2011 | Chen et al. |
| 2011/0223959 A1 | 9/2011 | Chen |
| 2011/0223960 A1 | 9/2011 | Chen et al. |
| 2011/0223961 A1 | 9/2011 | Chen et al. |
| 2011/0227795 A1 | 9/2011 | Lopez et al. |
| 2011/0236024 A1 | 9/2011 | Mao |
| 2011/0237178 A1 | 9/2011 | Seki et al. |
| 2011/0241881 A1 | 10/2011 | Badinelli |
| 2011/0243201 A1 | 10/2011 | Phillips et al. |
| 2011/0244887 A1 | 10/2011 | Dupray et al. |
| 2011/0256878 A1 | 10/2011 | Zhu et al. |
| 2011/0268033 A1 | 11/2011 | Boldi et al. |
| 2011/0268452 A1 | 11/2011 | Beamon et al. |
| 2011/0274021 A1 | 11/2011 | He et al. |
| 2011/0281536 A1 | 11/2011 | Lee et al. |
| 2012/0314797 A1 | 12/2012 | Kummetz et al. |
| 2013/0012195 A1 | 1/2013 | Sabat, Jr. et al. |
| 2013/0017863 A1 | 1/2013 | Kummetz et al. |
| 2013/0150063 A1 | 6/2013 | Berlin et al. |
| 2013/0188959 A1 | 7/2013 | Cune et al. |
| 2013/0210490 A1 | 8/2013 | Fischer et al. |
| 2013/0330086 A1 | 12/2013 | Berlin et al. |
| 2014/0016583 A1 | 1/2014 | Smith |
| 2014/0057627 A1 | 2/2014 | Hejazi et al. |
| 2014/0140225 A1 | 5/2014 | Wala |
| 2014/0146797 A1 | 5/2014 | Zavadsky et al. |
| 2014/0146905 A1 | 5/2014 | Zavadsky et al. |
| 2014/0146906 A1 | 5/2014 | Zavadsky et al. |
| 2014/0219140 A1 | 8/2014 | Uyehara et al. |
| 2014/0269859 A1 | 9/2014 | Hanson et al. |
| 2014/0314061 A1 | 10/2014 | Trajkovic et al. |
| 2015/0098351 A1 | 4/2015 | Zavadsky et al. |
| 2015/0098372 A1 | 4/2015 | Zavadsky et al. |
| 2015/0098419 A1 | 4/2015 | Zavadsky et al. |

(56) References Cited

U.S. PATENT DOCUMENTS

FOREIGN PATENT DOCUMENTS

| | | |
|---|---|---|
| CA | 2065090 C | 2/1998 |
| CA | 2242707 C | 9/2002 |
| CN | 1745560 A | 3/2006 |
| CN | 101151811 A | 3/2008 |
| CN | 101496306 A | 7/2009 |
| CN | 101542928 A | 9/2009 |
| DE | 19705253 A1 | 8/1998 |
| DE | 20104862 U1 | 9/2001 |
| DE | 10249414 A1 | 5/2004 |
| EP | 0391597 A2 | 10/1990 |
| EP | 0461583 A1 | 12/1991 |
| EP | 0477952 A2 | 4/1992 |
| EP | 0477952 A3 | 4/1992 |
| EP | 0714218 A1 | 5/1996 |
| EP | 0687400 B1 | 11/1998 |
| EP | 0993124 A2 | 4/2000 |
| EP | 1056226 A2 | 11/2000 |
| EP | 1173034 A1 | 1/2002 |
| EP | 1202475 A2 | 5/2002 |
| EP | 1227605 A2 | 7/2002 |
| EP | 1267447 A1 | 12/2002 |
| EP | 1347584 A2 | 9/2003 |
| EP | 1356783 A2 | 10/2003 |
| EP | 1363352 A1 | 11/2003 |
| EP | 1391897 A1 | 2/2004 |
| EP | 1443687 A1 | 8/2004 |
| EP | 1455550 A2 | 9/2004 |
| EP | 1501206 A1 | 1/2005 |
| EP | 1503451 A1 | 2/2005 |
| EP | 1511203 A1 | 3/2005 |
| EP | 1530316 A1 | 5/2005 |
| EP | 1267447 B1 | 8/2006 |
| EP | 1693974 A1 | 8/2006 |
| EP | 1742388 A1 | 1/2007 |
| EP | 1173034 B1 | 7/2007 |
| EP | 1954019 A1 | 8/2008 |
| EP | 1968250 A1 | 9/2008 |
| EP | 2110955 A1 | 10/2009 |
| EP | 2253980 A1 | 11/2010 |
| EP | 1570626 B1 | 11/2013 |
| GB | 2323252 A | 9/1998 |
| GB | 2366131 A | 2/2002 |
| GB | 2370170 A | 6/2002 |
| GB | 2399963 A | 9/2004 |
| GB | 2428149 A | 1/2007 |
| JP | 05260018 A | 10/1993 |
| JP | 08181661 A | 7/1996 |
| JP | 09083450 A | 3/1997 |
| JP | 09162810 A | 6/1997 |
| JP | 09200840 A | 7/1997 |
| JP | 11068675 A | 3/1999 |
| JP | 11088265 A | 3/1999 |
| JP | 2000152300 A | 5/2000 |
| JP | 2000341744 A | 12/2000 |
| JP | 2002264617 A | 9/2002 |
| JP | 2003148653 A | 5/2003 |
| JP | 2003172827 A | 6/2003 |
| JP | 2004172734 A | 6/2004 |
| JP | 2004245963 A | 9/2004 |
| JP | 2004247090 A | 9/2004 |
| JP | 2004264901 A | 9/2004 |
| JP | 2004265624 A | 9/2004 |
| JP | 2004317737 A | 11/2004 |
| JP | 2004349184 A | 12/2004 |
| JP | 2005018175 A | 1/2005 |
| JP | 2005087135 A | 4/2005 |
| JP | 2005134125 A | 5/2005 |
| JP | 2007228603 A | 9/2007 |
| JP | 2008172597 A | 7/2008 |
| KR | 20040053467 A | 6/2004 |
| KR | 20110087949 A | 8/2011 |
| WO | 9603823 A1 | 2/1996 |
| WO | 9748197 A2 | 12/1997 |
| WO | 9935788 A2 | 7/1999 |
| WO | 0042721 A1 | 7/2000 |
| WO | 0178434 A1 | 10/2001 |
| WO | 0184760 A1 | 11/2001 |
| WO | 0221183 A1 | 3/2002 |
| WO | 0230141 A1 | 4/2002 |
| WO | 02102102 A1 | 12/2002 |
| WO | 03024027 A1 | 3/2003 |
| WO | 03098175 A1 | 11/2003 |
| WO | 2004030154 A2 | 4/2004 |
| WO | 2004047472 A1 | 6/2004 |
| WO | 2004056019 A1 | 7/2004 |
| WO | 2004059934 A1 | 7/2004 |
| WO | 2004086795 A2 | 10/2004 |
| WO | 2004093471 A2 | 10/2004 |
| WO | 2005062505 A1 | 7/2005 |
| WO | 2005069203 A2 | 7/2005 |
| WO | 2005069203 A3 | 7/2005 |
| WO | 2005073897 A1 | 8/2005 |
| WO | 2005079386 A2 | 9/2005 |
| WO | 2005101701 A2 | 10/2005 |
| WO | 2005111959 A2 | 11/2005 |
| WO | 2005117337 A1 | 12/2005 |
| WO | 2006011778 A1 | 2/2006 |
| WO | 2006018592 A1 | 2/2006 |
| WO | 2006019392 A1 | 2/2006 |
| WO | 2006039941 A1 | 4/2006 |
| WO | 2006046088 A1 | 5/2006 |
| WO | 2006051262 A1 | 5/2006 |
| WO | 2006077569 A1 | 7/2006 |
| WO | 2006094441 A1 | 9/2006 |
| WO | 2006133609 A1 | 12/2006 |
| WO | 2006136811 A1 | 12/2006 |
| WO | 2007048427 A1 | 5/2007 |
| WO | 2007075579 A2 | 7/2007 |
| WO | 2007077451 A1 | 7/2007 |
| WO | 2007088561 A1 | 8/2007 |
| WO | 2007091026 A1 | 8/2007 |
| WO | 2008008249 A2 | 1/2008 |
| WO | 2008027213 A2 | 3/2008 |
| WO | 2008033298 A2 | 3/2008 |
| WO | 2008039830 A2 | 4/2008 |
| WO | 2009014710 A1 | 1/2009 |
| WO | 2009100395 A1 | 8/2009 |
| WO | 2009100396 A1 | 8/2009 |
| WO | 2009100397 A2 | 8/2009 |
| WO | 2009100398 A2 | 8/2009 |
| WO | 2009145789 A1 | 12/2009 |
| WO | 2010087919 A2 | 8/2010 |
| WO | 2010090999 A1 | 8/2010 |
| WO | 2011043172 A1 | 4/2011 |
| WO | 2011112373 A1 | 9/2011 |
| WO | 2011139937 A1 | 11/2011 |
| WO | 2011139939 A1 | 11/2011 |
| WO | 2011139942 A1 | 11/2011 |
| WO | 2011160117 A1 | 12/2011 |
| WO | 2012024345 A2 | 2/2012 |
| WO | 2012051227 A2 | 4/2012 |
| WO | 2012051230 A1 | 4/2012 |
| WO | 2012054553 A1 | 4/2012 |
| WO | 2012170865 A2 | 12/2012 |
| WO | 2013009835 A1 | 1/2013 |
| WO | 2013122915 A1 | 8/2013 |
| WO | 2014022211 A2 | 2/2014 |
| WO | 2014070236 A1 | 5/2014 |
| WO | 2014082070 A1 | 5/2014 |
| WO | 2014082072 A1 | 5/2014 |
| WO | 2014082075 A1 | 5/2014 |
| WO | 2014144314 A1 | 9/2014 |
| WO | 2015054162 A1 | 4/2015 |
| WO | 2015054164 A1 | 4/2015 |
| WO | 2015054165 A1 | 4/2015 |

OTHER PUBLICATIONS

Bakaul, M., et al., "Efficient Multiplexing Scheme for Wavelength-Interleaved DWDM Millimeter-Wave Fiber-Radio Systems," IEEE Photonics Technology Letters, Dec. 2005, vol. 17, No. 12.

(56) References Cited

OTHER PUBLICATIONS

Huang, C., et al., "A WLAN-Used Helical Antenna Fully Integrated with the PCMCIA Carrier," IEEE Transactions on Antennas and Propagation, Dec. 2005, vol. 53, No. 12, pp. 4164-4168.

Gibson, B.C., et al., "Evanescent Field Analysis of Air-Silica Microstructure Waveguides," The 14th Annual Meeting of the IEEE Lasers and Electro-Optics Society, 1-7803-7104-4/01, Nov. 12-13, 2001, vol. 2, pp. 709-710.

International Search Report for PCT/US07/21041 mailed Mar. 7, 2008, 3 pages.

No Author, "ITU-T G.652, Telecommunication Standardization Sector of ITU, Series G: Transmission Systems and Media, Digital Systems and Networks, Transmission Media Characteristics—Optical Fibre Cables, Characteristics of a Single-Mode Optical Fiber and Cable," ITU-T Recommendation G.652, International Telecommunication Union, Jun. 2005, 20 pages.

No Author, "ITU-T G.657, Telecommunication Standardization Sector of ITU, Dec. 2006, Series G: Transmission Systems and Media, Digital Systems and Networks, Transmission Media and Optical Systems Characteristics—Optical Fibre Cables, Characteristics of a Bending Loss Insensitive Single Mode Optical Fibre and Cable for the Access Network," ITU-T Recommendation G.657, International Telecommunication Union, 19 pages.

Kojucharow, K., et al., "Millimeter-Wave Signal Properties Resulting from Electrooptical Upconversion," IEEE Transactions on Microwave Theory and Techniques, Oct. 2001, vol. 49, No. 10, pp. 1977-1985.

Monro, T.M., et al., "Holey Fibers with Random Cladding Distributions," Optics Letters, Feb. 15, 2000, vol. 25, No. 4, pp. 206-208.

Moreira, J.D., et al., "Diversity Techniques for OFDM Based WLAN Systems," The 13th IEEE International Symposium on Personal, Indoor and Mobile Radio Communications, Sep. 15-18, 2002, vol. 3, pp. 1008-1011.

Niiho, T., et al., "Multi-Channel Wireless LAN Distributed Antenna System Based on Radio-Over-Fiber Techniques," The 17th Annual Meeting of the IEEE Lasers and Electro-Optics Society, Nov. 2004, vol. 1, pp. 57-58.

Paulraj, A.J., et al., "An Overview of MIMO Communications—A Key to Gigabit Wireless," Proceedings of the IEEE, Feb. 2004, vol. 92, No. 2, 34 pages.

Pickrell, G.R., et al., "Novel Techniques for the Fabrication of Holey Optical Fibers," Proceedings of SPIE, Oct. 28-Nov. 2, 2001, vol. 4578, 2002, pp. 271-282.

No Author, RFID Technology Overview, 11 pages.

Roh, W., et al., "MIMO Channel Capacity for the Distributed Antenna Systems," Proceedings of the 56th IEEE Vehicular Technology Conference, Sep. 2002, vol. 2, pp. 706-709.

Seto, I., et al., "Antenna-Selective Transmit Diversity Technique for OFDM-Based WLANs with Dual-Band Printed Antennas," 2005 IEEE Wireless Communications and Networking Conference, Mar. 13-17, 2005, vol. 1, pp. 51-56.

Shen, C., et al., "Comparison of Channel Capacity for MIMO-DAS versus MIMO-CAS," The 9th Asia-Pacific Conference on Communications, Sep. 21-24, 2003, vol. 1, pp. 113-118.

Wake, D. et al., "Passive Picocell: A New Concept in Wireless Network Infrastructure," Electronics Letters, Feb. 27, 1997, vol. 33, No. 5, pp. 404-406.

Winters, J., et al., "The Impact of Antenna Diversity on the Capacity of Wireless Communication Systems," IEEE Transactions on Communications, vol. 42, No. 2/3/4, Feb./Mar./Apr. 1994, pp. 1740-1751.

Opatic, D., "Radio over Fiber Technology for Wireless Access," Ericsson, Oct. 17, 2009, 6 pages.

Author Unknown, "ADC Has 3rd Generation Services Covered at CeBIT 2001," Business Wire, Mar. 20, 2001, 3 pages.

Author Unknown, "Andrew Unveils the InCell Fiber Optic Antenna System for In-Building Wireless Communications," Fiber Optics Weekly Update, Dec. 1, 2000, Information Gatekeepers Inc., pp. 3-4.

Arredondo, Albedo et al., "Techniques for Improving In-Building Radio Coverage Using Fiber-Fed Distributed Antenna Networks," IEEE 46th Vehicular Technology Conference, Atlanta, Georgia, Apr. 28-May 1, 1996, pp. 1540-1543, vol. 3.

Fitzmaurice, M. et al., "Distributed Antenna System for Mass Transit Communications," Vehicular Technology Conference, Boston, Massachusetts, Sep. 2000, IEEE, pp. 2011-2018.

Ghafouri-Shiraz, et al., "Radio on Fibre Communication Systems Based on Integrated Circuit-Antenna Modules," Microwave and Millimeter Wave Technology Proceedings, Beijing, China, Aug. 1998, IEEE, pp. 159-169.

Griffin, R.A. et al., "Radio-Over-Fiber Distribution Using an Optical Millimeter-Wave/DWDM Overlay," Optical Fiber Communication Conference, San Diego, California, Feb. 1999, IEEE, pp. 70-72.

Juntunen, J. et al., "Antenna Diversity Array Design for Mobile Communication Systems," Proceedings of the 2000 IEEE International Conference on Phased Array Systems and Technology, Dana Point, California, May 2000, IEEE, pp. 65-67.

Lee, D. et al., "Ricocheting Bluetooth," 2nd International Conference on Microwave and Millimeter Wave Technology Proceedings, Beijing, China, Sep. 2000, IEEE, pp. 432-435.

Lee, T., "A Digital Multiplexed Fiber Optic Transmission System for Analog Audio Signals," IEEE Western Canada Conference on Computer, Power, and Communications Systems in a Rural Environment, Regina, Saskatchewan, May 1991, pp. 146-149.

Schuh et al., "Hybrid Fibre Radio Access: A Network Operators Approach and Requirements," Proceedings of the 10th Microcoll Conference, Mar. 21-24, 1999, Budapest, Hungary, pp. 211-214.

Schweber, Bill, "Maintaining cellular connectivity indoors demands sophisticated design," EDN Network, Dec. 21, 2000, 2 pages, http://www.edn.com/design/integrated-circuit-design/4362776/Maintaining-cellular-connectivity-indoors-demands-sophisticated-design.

Margotte, B. et al., "Fibre Optic Distributed Antenna System for Cellular and PCN/PCS Indoor Coverage," Microwave Engineering Europe, Jun. 1998, 6 pages.

Matsunaka et al., "Point-to-multipoint Digital Local Distribution Radio System in the 21 GHz Band," KDD Technical Journal, Mar. 1991, No. 145, p. 43-54.

Parker et al., "Radio-over-fibre technologies arising from the Building the future Optical Network in Europe (BONE) project," IET Optoelectron., 2010, vol. 4, Issue 6, pp. 247-259.

Singh et al., "Distributed coordination with deaf neighbors: efficient medium access for 60 GHz mesh networks," IEEE INFOCOM 2010 proceedings, 9 pages.

Notification of Grant for Chinese patent application 201190000473.1 issued Aug. 28, 2013, 4 pages.

International Search Report for PCT/US2011/034725 mailed Aug. 5, 2011, 4 pages.

Non-final Office Action for U.S. Appl. No. 12/892,424 mailed Nov. 5, 2012, 22 pages.

International Search Report and Written Opinion for PCT/US2011/034738 mailed Jul. 27, 2011, 13 pages.

International Search Report for PCT/US2011/047821 mailed Oct. 25, 2011, 4 pages.

International Preliminary Report on Patentability for PCT/US2011/047821 mailed Feb. 19, 2013, 10 pages.

Advisory Action for U.S. Appl. No. 13/785,603 mailed Jun. 30, 2014, 3 pages.

Non-final Office Action for U.S. Appl. No. 13/785,603 mailed Sep. 9, 2014, 10 pages.

Non-final Office Action for U.S. Appl. No. 13/762,432 mailed Aug. 20, 2014, 4 pages.

Final Office Action for U.S. Appl. No. 13/785,603 mailed Apr. 14, 2014, 17 pages.

Translation of the Second Office Action for Chinese patent application 201180024499.4 issued Aug. 17, 2015, 3 pages.

Advisory Action for U.S. Appl. No. 14/711,306 mailed Oct. 8, 2015, 3 pages.

Chowdhury et al., "Multi-service Multi-carrier Broadband MIMO Distributed Antenna Systems for In-building Optical Wireless Access," Presented at the 2010 Conference on Optical Fiber Com-

(56) References Cited

OTHER PUBLICATIONS munication and National Fiber Optic Engineers Conference, Mar. 21-25, 2010, San Diego, California, IEEE, pp. 1-3.
Translation of the First Office Action for Chinese patent application 201180039569.3 issued Jan. 16, 2015, 7 pages.
Examination Report for European patent application 11754570.7 mailed Jan. 13, 2015, 5 pages.
International Search Report for PCT/US2012/025337 mailed May 16, 2012, 4 pages.
International Search Report for PCT/US2011/055861 mailed Feb. 7, 2012, 4 pages.
International Preliminary Report on Patentability for PCT/US2011/055861 mailed Apr. 25, 2013, 9 pages.
International Search Report for PCT/US2011/055858 mailed Feb. 7, 2012, 4 pages.
International Preliminary Report on Patentability for PCT/US2011/055858 mailed Apr. 25, 2013, 8 pages.
International Search Report for PCT/US2011/034733 mailed Aug. 1, 2011, 5 pages.
International Preliminary Report on Patentability for PCT/US2011/034733 mailed Nov. 15, 2012, 8 pages.
Final Office Action for U.S. Appl. No. 13/785,603 mailed Dec. 4, 2014, 8 pages.
First Office Action for Chinese patent application 201180024499.4 mailed Dec. 1, 2014, 13 pages.
Notice of Allowance for U.S. Appl. No. 13/762,432 mailed Dec. 24, 2014, 7 pages.
Non-final Office Action for U.S. Appl. No. 13/967,426 mailed Dec. 26, 2014, 15 pages.
Patent Cooperation Treaty, International Preliminary Report on Patentability for PCT/US2011/034725, Mail date Nov. 15, 2012.
Final Office Action for U.S. Appl. No. 14/711,306 mailed Jul. 9, 2015, 16 pages.
Advisory Action for U.S. Appl. No. 13/967,426 mailed Jul. 6, 2015, 3 pages.
Final Office Action for U.S. Appl. No. 13/967,426 mailed Apr. 29, 2015, 22 pages.
Non-final Office Action for U.S. Appl. No. 13/967,426 mailed Sep. 17, 2015, 27 pages.
Examination Report for European patent application 11721160.7 mailed Oct. 21, 2015, 7 pages.
Non-final Office Action for U.S. Appl. No. 14/664,305 mailed Jul. 7, 2016, 45 pages.
Non-final Office Action for U.S. Appl. No. 15/049,913 mailed Jun. 16, 2016, 20 pages.

\* cited by examiner

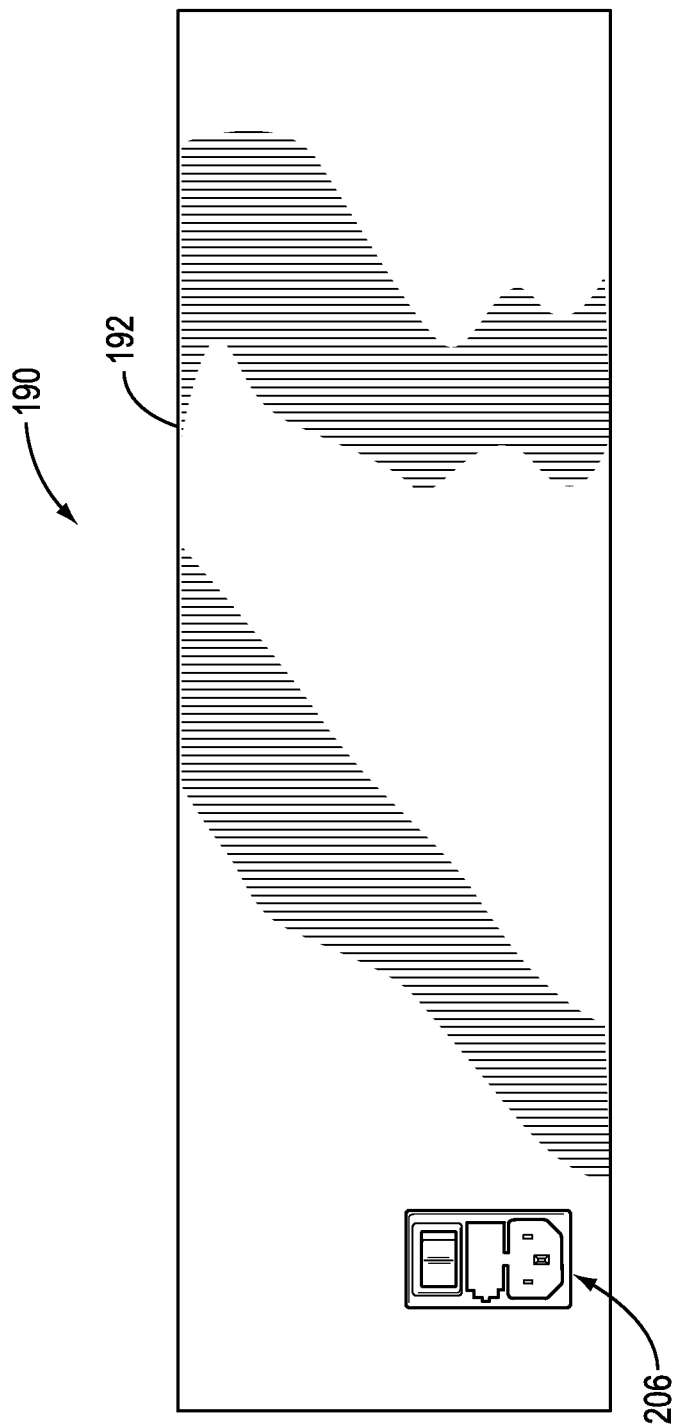

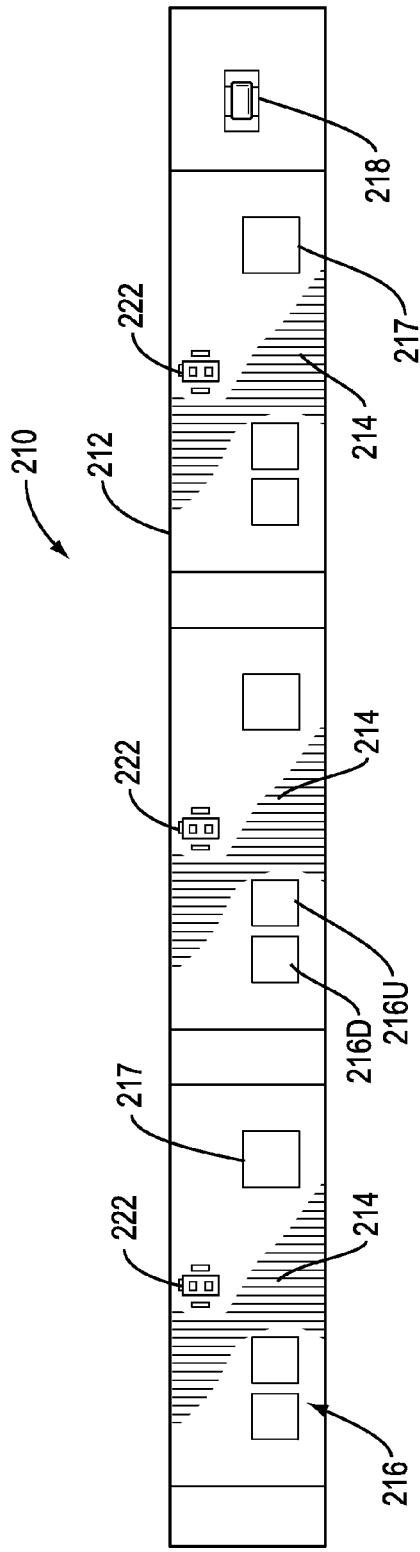
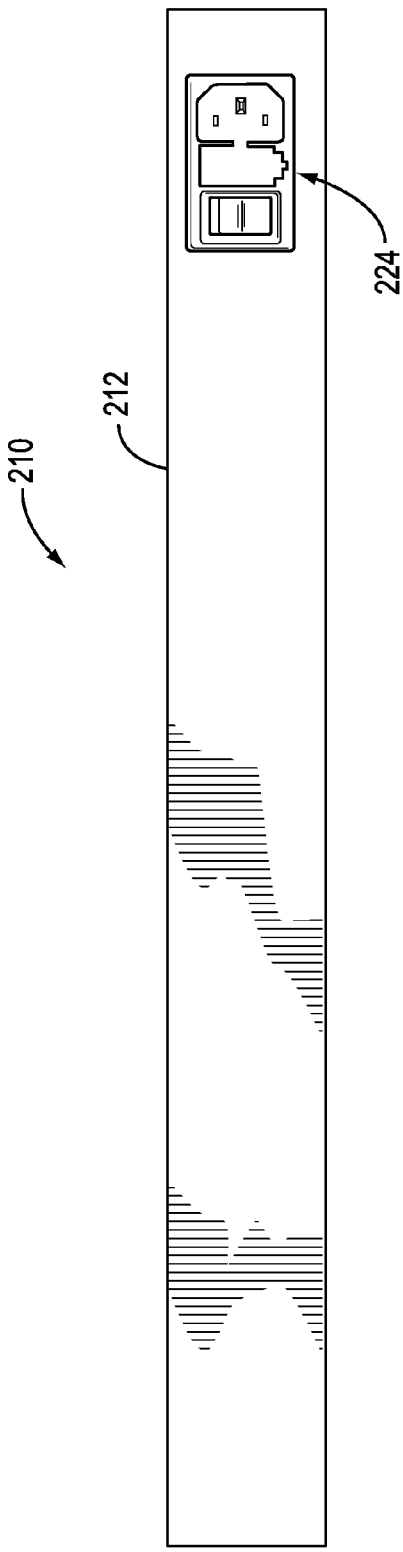
FIG. 16C
FIG. 16D

DIGITAL DATA SERVICES AND/OR POWER DISTRIBUTION IN OPTICAL FIBER-BASED DISTRIBUTED COMMUNICATIONS SYSTEMS PROVIDING DIGITAL DATA AND RADIO FREQUENCY (RF) COMMUNICATIONS SERVICES, AND RELATED COMPONENTS AND METHODS

RELATED APPLICATIONS

The present application claims the benefit of U.S. Prov. App. No. 61/330,385 filed on May 2, 2010 and entitled, "Power Distribution in Optical Fiber-Based Distributed Communications Systems Providing Digital Data and Radio Frequency (RF) Communications Services, and Related Components and Methods," which is incorporated herein by reference in its entirety.

The present application is related to the following applications: U.S. Prov. App. No. 61/330,383 filed on May 2, 2010 and entitled, "Optical Fiber-based Distributed Communications Systems, And Related Components and Methods"; U.S. Prov. App. No. 61/330,386 filed on May 2, 2010 and entitled, "Providing Digital Data Services in Optical Fiber-based Distributed Radio Frequency (RF) Communication Services, and Related Components and Methods"; U.S. patent application Ser. No. 12/892,424 filed on Sep. 28, 2010 entitled, "Providing Digital Data Services in Optical Fiber-based Distributed Radio Frequency (RF) Communications Systems, and Related Components and Methods"; U.S. Prov. App. No. 61/393,177 filed on Oct. 14, 2010 entitled, "Providing Digital Data Services in Optical Fiber-based Distributed Radio Frequency (RF) Communications Systems, and Related Components and Methods"; U.S. Prov. App. No. 61/392,660 filed on Oct. 13, 2010 entitled, "Local Power Management For Remote Antenna Units In Distributed Antenna Systems"; U.S. App. No. 61/392,687 filed on Oct. 13, 2010 entitled, "Remote Power Management For Remote Antenna Units In Distributed Antenna Systems." These applications are incorporated herein by reference in their entireties.

BACKGROUND

1. Field of the Disclosure

The technology of the disclosure relates to providing power to components in optical fiber-based distributed communications systems distributing radio frequency (RF) signals over optical fiber.

2. Technical Background

Wireless communication is rapidly growing, with ever-increasing demands for high-speed mobile data communication. As an example, so-called "wireless fidelity" or "WiFi" systems and wireless local area networks (WLANs) are being deployed in many different types of areas (e.g., coffee shops, airports, libraries, etc.). Distributed communications systems communicate with wireless devices called "clients," which must reside within the wireless range or "cell coverage area" in order to communicate with an access point device.

One approach to deploying a distributed communications system involves the use of radio frequency (RF) antenna coverage areas, also referred to as "antenna coverage areas." Antenna coverage areas can have a radius in the range from a few meters up to twenty meters as an example. Combining a number of access point devices creates an array of antenna coverage areas. Because the antenna coverage areas each cover small areas, there are typically only a few users (clients) per antenna coverage area. This allows for minimizing the amount of RF bandwidth shared among the wireless system users. It may be desirable to provide antenna coverage areas in a building or other facility to provide distributed communications system access to clients within the building or facility. However, it may be desirable to employ optical fiber to distribute communication signals. Benefits of optical fiber include increased bandwidth.

One type of distributed communications system for creating antenna coverage areas, called "Radio-over-Fiber" or "RoF," utilizes RF signals sent over optical fibers. Such systems can include a head-end station optically coupled to a plurality of remote antenna units that each provides antenna coverage areas. The remote antenna units can each include RF transceivers coupled to an antenna to transmit RF signals wirelessly, wherein the remote antenna units are coupled to the head-end station via optical fiber links. The RF transceivers in the remote antenna units are transparent to the RF signals. The remote antenna units convert incoming optical RF signals from an optical fiber downlink to electrical RF signals via optical-to-electrical (O/E) converters, which are then passed to the RF transceiver. The RF transceiver converts the electrical RF signals to electromagnetic signals via antennas coupled to the RF transceiver provided in the remote antenna units. The antennas also receive electromagnetic signals (i.e., electromagnetic radiation) from clients in the antenna coverage area and convert them to electrical RF signals (i.e., electrical RF signals in wire). The remote antenna units then convert the electrical RF signals to optical RF signals via electrical-to-optical (E/O) converters. The optical RF signals are then sent over an optical fiber uplink to the head-end station.

SUMMARY OF THE DETAILED DESCRIPTION

Embodiments disclosed in the detailed description can include power distribution in optical fiber-based distributed communications systems configured to provide digital data services and radio frequency (RF) communications services. Related components and methods are also disclosed. In this regard, embodiments disclosed in the detailed description include units that can be provided in optical fiber-based distributed communications systems that are configured to support RF communication services and digital data services. The units may also be configured to support providing distribution of power. The units may be interconnect units (ICUs). Further, embodiments disclosed in the detailed description also include optical fiber-based distributed communications systems that provide and support both RF communication services and digital data services. The RF communication services and digital data services can be distributed over optical fiber to client devices, such as remote antenna units for example. Digital data services can be distributed over optical fiber separate from optical fiber distributing RF communication services. Alternatively, digital data services can be distributed over a common optical fiber with RF communication services.

The embodiments disclosed herein do not have to include power distribution. Any combination of RF communication services, digital data services, and power distribution can be provide, including in the ICU examples described herein. For example, the ICU could be equipped to distribute RF communication services and digital data services. The ICU could also be equipped to distribute digital data services and power as another example.

In this regard, in one embodiment, a distribution unit for an optical-fiber based distributed communications system is provided. The distribution unit comprises at least one digital data services input configured to receive electrical digital data signals. The distribution unit also comprises at least one digital data services output configured to distribute digital data signals representing the electrical digital data signals over at least one digital data services line to at least one remote antenna unit (RAU). The distribution unit also comprises at least one RF communications services input configured to receive optical RF communications signals. The distribution unit also comprises at least one RF communications services output configured to distribute the optical RF communications signals over at least one RF communications services optical fiber to the at least one RAU.

In another embodiment, an optical-fiber based distributed communications system is provided. The system includes head-end equipment. The head-end equipment is configured to receive downlink electrical RF communications services signals. The head-end equipment is also configured to convert the downlink electrical RF communications services signals into downlink optical RF communications services signals to be communicated over at least one optical RF communications services downlink. The system also includes a controller. The controller is configured to receive downlink digital data services signals containing at least one digital data service. The controller is also configured to provide the downlink digital data services signals over at least one digital data services downlink. The system also comprises a distribution unit. The distribution unit comprises at least one RF communications services input configured to receive the downlink optical RF communications services signals from the at least one optical RF communication services downlink. The distribution unit also comprises at least one RF communications services output configured to distribute the downlink optical RF communications signals over at least one RF communications services optical fiber to at least one RAU. The distribution unit also comprises at least one digital data services input configured to receive the downlink digital data signals from the at least one digital data services downlink. The distribution unit also comprises at least one digital data services output configured to distribute the digital data signals over at least one digital data services line to the at least one RAU.

Additional features and advantages will be set forth in the detailed description which follows, and in part will be readily apparent to those skilled in the art from that description or recognized by practicing the embodiments as described herein, including the detailed description that follows, the claims, as well as the appended drawings.

The drawings illustrate various embodiments, and together with the description serve to explain the principles and operation of the concepts disclosed.

BRIEF DESCRIPTION OF THE FIGURES

FIGS. 14A-14E illustrate front perspective, rear perspective, front, rear, and side views of another exemplary ICU comprised of an ICU housing containing a single power source for distribution modules supporting the distribution of RF communication services, digital data services, and power to RAUs in an optical fiber-based distributed communications system;

FIGS. 16A-16E illustrate front perspective, rear perspective, front, rear, and side views of another exemplary ICU comprised of an ICU housing containing distribution modules supporting the distribution of RF communication services, digital data services, and power to RAUs in an optical fiber-based distributed communications system;

DETAILED DESCRIPTION

Reference will now be made in detail to the embodiments, examples of which are illustrated in the accompanying drawings, in which some, but not all embodiments are shown. Indeed, the concepts may be embodied in many different forms and should not be construed as limiting herein; rather, these embodiments are provided so that this disclosure will satisfy applicable legal requirements. Whenever possible, like reference numbers will be used to refer to like components or parts.

Embodiments disclosed in the detailed description can include power distribution in optical fiber-based distributed communications systems configured to provide digital data services and radio Frequency (RF) communications services. Related components and method are also disclosed. In this regard, embodiments disclosed in the detailed description include units that can be provided in optical fiber-based distributed communication systems that are configured to support RF communication services and digital data services. The units may also be configured to support providing distribution of power. The units may be interconnect units (ICUs). Further, embodiments disclosed in the detailed description also include optical fiber-based distributed communications systems that provide and support both RF communication services and digital data services. The RF communication services and digital data services can be distributed over optical fiber to client devices, such as remote antenna units for example. Digital data services can be distributed over separate optical fiber from optical fiber distributing RF communication services. Alternatively, digital data services can be distributed over common optical fiber with RF communication services.

The embodiments disclosed herein do not have to include power distribution. Any combination of RF communication services, digital data services, and power distribution can be provide, including in the ICU examples described herein. For example, the ICU could be equipped to distribute RF communication services and digital data services. The ICU could also be equipped to distribute digital data services and power as another example.

Figure 1:
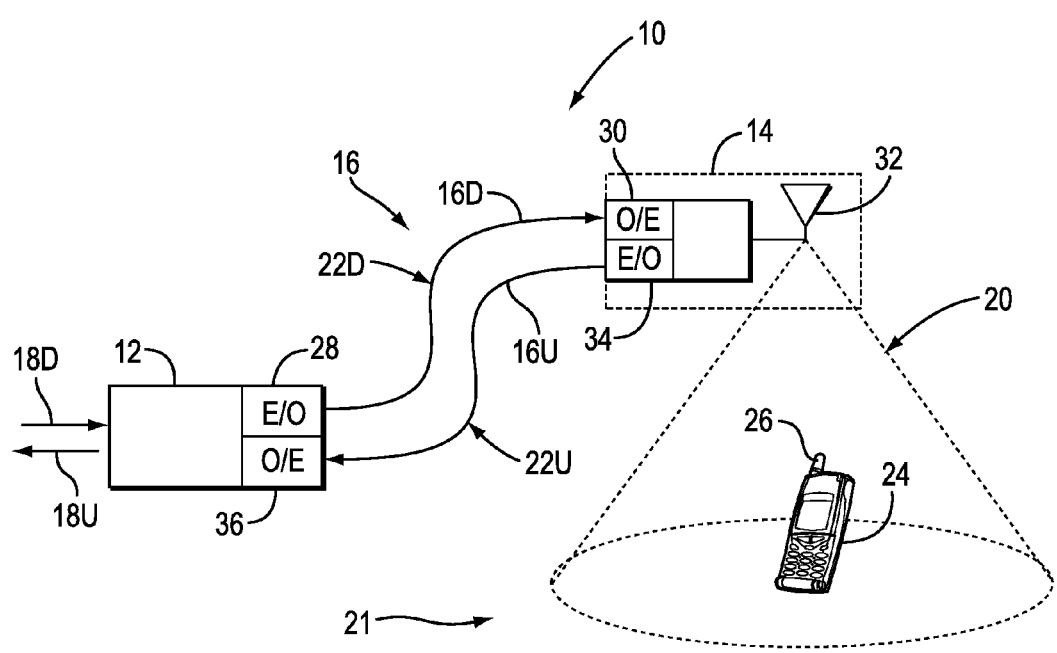
FIG. 1 is a schematic diagram of an exemplary optical fiber-based distributed communications system.

In this regard, FIG. 1 is a schematic diagram of an embodiment of an optical fiber-based distributed communications system. In this embodiment, the system is an optical fiber-based distributed communications system 10 that is configured to create one or more antenna coverage areas for establishing communications with wireless client devices located in the radio frequency (RF) range of the antenna coverage areas. The optical-fiber based distributed communications system 10 provides RF communications service (e.g., cellular services). In this embodiment, the optical fiber-based distributed communications system 10 includes head-end equipment in the form of a head-end unit (HEU) 12, one or more remote antenna units (RAUs) 14, and an optical fiber 16 that optically couples the HEU 12 to the RAU 14 in this example. The HEU 12 is configured to receive communications over downlink electrical RF signals 18D from a source or sources, such as a network or carrier as examples, and provide such communications to the RAU 14. The HEU 12 is also configured to return communications received from the RAU 14, via uplink electrical RF signals 18U, back to the source or sources. In this regard in this embodiment, the optical fiber 16 includes at least one downlink optical fiber 16D to carry signals communicated from the HEU 12 to the RAU 14 and at least one uplink optical fiber 16U to carry signals communicated from the RAU 14 back to the HEU 12. One downlink optical fiber 16D and one uplink optical fiber 16U could be provided to support multiple channels each using wave-division multiplexing (WDM), as discussed in U.S. patent application Ser. No. 12/892,424 entitled "Providing Digital Data Services in Optical Fiber-based Distributed Radio Frequency (RF) Communications Systems, And Related Components and Methods," incorporated herein by reference in its entirety. Other options for WDM and frequency-division multiplexing (FDM) are disclosed in U.S. patent application Ser. No. 12/892,424 any of which can be employed in any of the embodiments disclosed herein.

The optical fiber-based distributed communications system 10 has an antenna coverage area 20 that can be substantially centered about the RAU 14. The antenna coverage area 20 of the RAU 14 forms an RF coverage area 21. The HEU 12 is adapted to perform or to facilitate any one of a number of wireless applications, including but not limited to Radio-over-Fiber (RoF), radio frequency (RF) identification (RFID), wireless local-area network (WLAN) communication, or cellular phone service. Shown within the antenna coverage area 20 is a client device 24 in the form of a mobile device as an example, which may be a cellular telephone as an example. The client device 24 can be any device that is capable of receiving RF communication signals. The client device 24 includes an antenna 26 (e.g., a wireless card) adapted to receive and/or send electromagnetic RF signals.

With continuing reference to FIG. 1, to communicate the electrical RF signals over the downlink optical fiber 16D to the RAU 14, to in turn be communicated to the client device 24 in the antenna coverage area 20 formed by the RAU 14, the HEU 12 includes an electrical-to-optical (E/O) converter 28. The E/O converter 28 converts the downlink electrical RF signals 18D to downlink optical RF signals 22D to be communicated over the downlink optical fiber 16D. The RAU 14 includes an optical-to-electrical (O/E) converter 30 to convert received downlink optical RF signals 22D back to electrical RF signals to be communicated wirelessly through an antenna 32 of the RAU 14 to client devices 24 located in the antenna coverage area 20.

Similarly, the antenna 32 is also configured to receive wireless RF communications from client devices 24 in the antenna coverage area 20. In this regard, the antenna 32 receives wireless RF communications from client devices 24 and communicates electrical RF signals representing the wireless RF communications to an E/O converter 34 in the RAU 14. The E/O converter 34 converts the electrical RF signals into uplink optical RF signals 22U to be communicated over the uplink optical fiber 16U. An O/E converter 36 provided in the HEU 12 converts the uplink optical RF signals 22U into uplink electrical RF signals, which can then be communicated as uplink electrical RF signals 18U back to a network or other source. The HEU 12 in this embodiment is not able to distinguish the location of the client devices 24 in this embodiment. The client device 24 could be in the range of any antenna coverage area 20 formed by an RAU 14.

Figure 2:
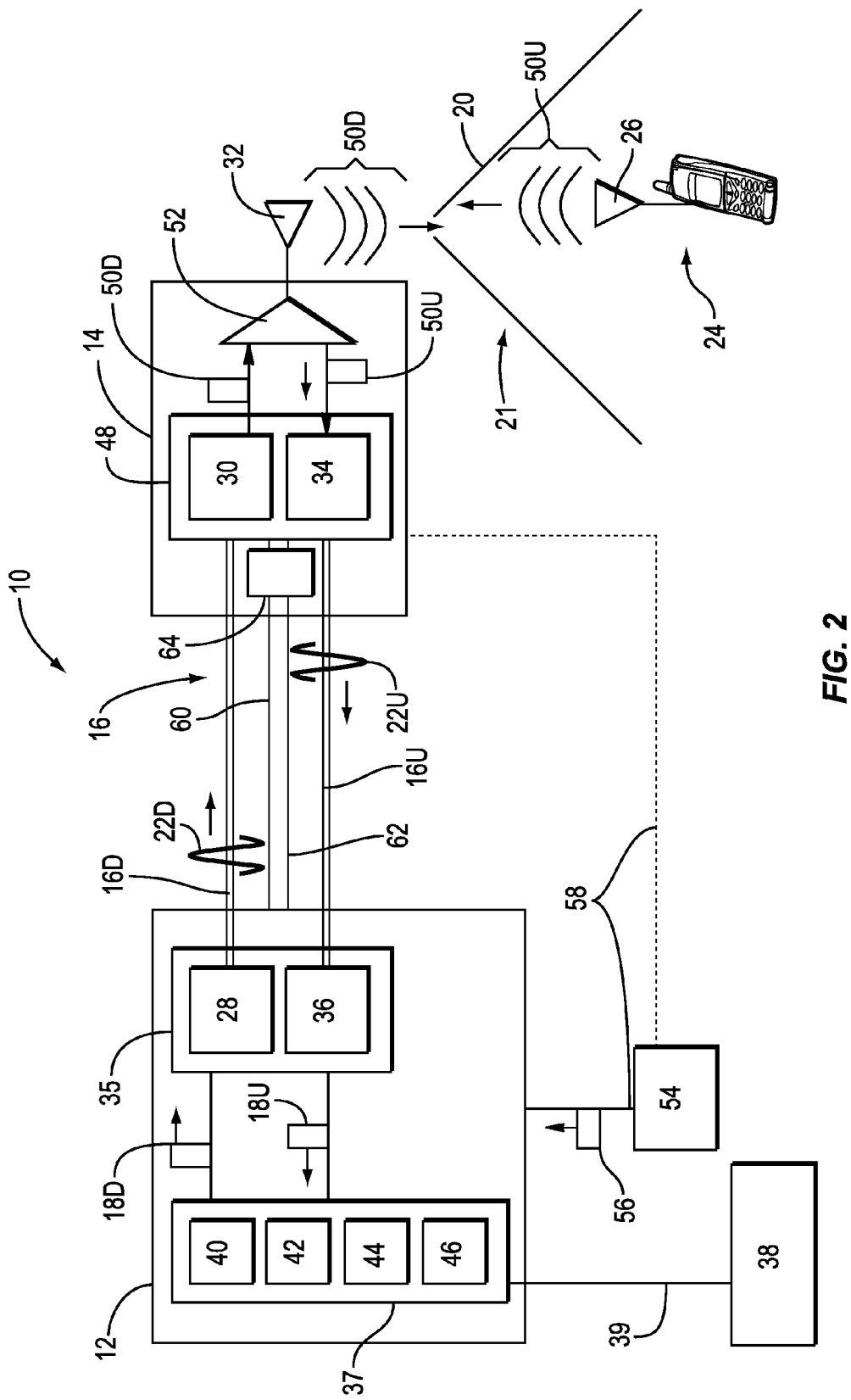
FIG. 2 is a more detailed schematic diagram of exemplary head-end equipment in the form of a head-end unit (HEU) and a remote antenna unit (RAU) that can be deployed in the optical fiber-based distributed communications system of FIG. 1.

FIG. 2 is a more detailed schematic diagram of the exemplary optical fiber-based distributed communications system of FIG. 1 that provides electrical RF service signals for a particular RF service or application. In an exemplary embodiment, the HEU 12 includes a service unit 37 that provides electrical RF service signals by passing (or conditioning and then passing) such signals from one or more outside networks 38 via a network link 39. In a particular example embodiment, this includes providing WLAN signal distribution as specified in the Institute of Electrical and Electronics Engineers (IEEE) 802.11 standard, i.e., in the frequency range from 2.4 to 2.5 GigaHertz (GHz) and from 5.0 to 6.0 GHz. Any other electrical RF signal frequencies are possible. In another exemplary embodiment, the service unit 37 provides electrical RF service signals by generating the signals directly. In another exemplary embodiment, the service unit 37 coordinates the delivery of the electrical RF service signals between client devices 24 within the antenna coverage area 20.

With continuing reference to FIG. 2, the service unit 37 is electrically coupled to the E/O converter 28 that receives the downlink electrical RF signals 18D from the service unit 37 and converts them to corresponding downlink optical RF signals 22D. In an exemplary embodiment, the E/O converter 28 includes a laser suitable for delivering sufficient dynamic range for the RoF applications described herein, and optionally includes a laser driver/amplifier electrically coupled to the laser. Examples of suitable lasers for the E/O converter 28 include, but are not limited to, laser diodes, distributed feedback (DFB) lasers, Fabry-Perot (FP) lasers, and vertical cavity surface emitting lasers (VCSELs).

With continuing reference to FIG. 2, the HEU 12 also includes the O/E converter 36, which is electrically coupled to the service unit 37. The O/E converter 36 receives the uplink optical RF signals 22U and converts them to corresponding uplink electrical RF signals 18U. In an example embodiment, the O/E converter 36 is a photodetector, or a photodetector electrically coupled to a linear amplifier. The E/O converter 28 and the O/E converter 36 constitute a "converter pair" 35, as illustrated in FIG. 2.

In accordance with an exemplary embodiment, the service unit 37 in the HEU 12 can include an RF signal conditioning unit 40 for conditioning the downlink electrical RF signals 18D and the uplink electrical RF signals 18U, respectively. The service unit 37 can include a digital signal processing unit ("digital signal processor") 42 for providing to the RF signal conditioning unit 40 an electrical signal that is modulated onto an RF carrier to generate a desired downlink electrical RF signal 18D. The digital signal processor 42 is also configured to process a demodulation signal provided by the demodulation of the uplink electrical RF signal 18U by the RF signal conditioning unit 40. The HEU 12 can also include an optional central processing unit (CPU) 44 for processing data and otherwise performing logic and computing operations, and a memory unit 46 for storing data, such as data to be transmitted over a WLAN or other network for example.

With continuing reference to FIG. 2, the RAU 14 also includes a converter pair 48 comprising the O/E converter 30 and the E/O converter 34. The O/E converter 30 converts the received downlink optical RF signals 22D from the HEU 12 back into downlink electrical RF signals 50D. The E/O converter 34 converts uplink electrical RF signals 50U received from the client device 24 into the uplink optical RF signals 22U to be communicated to the HEU 12. The O/E converter 30 and the E/O converter 34 are electrically coupled to the antenna 32 via an RF signal-directing element 52, such as a circulator for example. The RF signal-directing element 52 serves to direct the downlink electrical RF signals 50D and the uplink electrical RF signals 50U, as discussed below. In accordance with an exemplary embodiment, the antenna 32 can include any type of antenna, including but not limited to one or more patch antennas, such as disclosed in U.S. patent application Ser. No. 11/504,999, filed Aug. 16, 2006 entitled "Radio-over-Fiber Transponder With A Dual-Band Patch Antenna System," and U.S. patent application Ser. No. 11/451,553, filed Jun. 12, 2006 entitled "Centralized Optical Fiber-based Wireless Picocellular Systems and Methods," both of which are incorporated herein by reference in their entireties.

With continuing reference to FIG. 2, the optical fiber-based distributed communications system 10 also includes a power supply 54 that provides an electrical power signal 56. The power supply 54 is electrically coupled to the HEU 12 for powering the power-consuming elements therein. In an exemplary embodiment, an electrical power line 58 runs through the HEU 12 and over to the RAU 14 to power the O/E converter 30 and the E/O converter 34 in the converter pair 48, the optional RF signal-directing element 52 (unless the RF signal-directing element 52 is a passive device such as a circulator for example), and any other power-consuming elements provided. In an exemplary embodiment, the electrical power line 58 includes two wires 60 and 62 that carry a single voltage and that are electrically coupled to a DC power converter 64 at the RAU 14. The DC power converter 64 is electrically coupled to the O/E converter 30 and the E/O converter 34 in the converter pair 48, and changes the voltage or levels of the electrical power signal 56 to the power level(s) required by the power-consuming components in the RAU 14. In an exemplary embodiment, the DC power converter 64 is either a DC/DC power converter or an AC/DC power converter, depending on the type of electrical power signal 56 carried by the electrical power line 58. In another example embodiment, the electrical power line 58 (dashed line) runs directly from the power supply 54 to the RAU 14 rather than from or through the HEU 12. In another example embodiment, the electrical power line 58 includes more than two wires and may carry multiple voltages.

Figure 3:
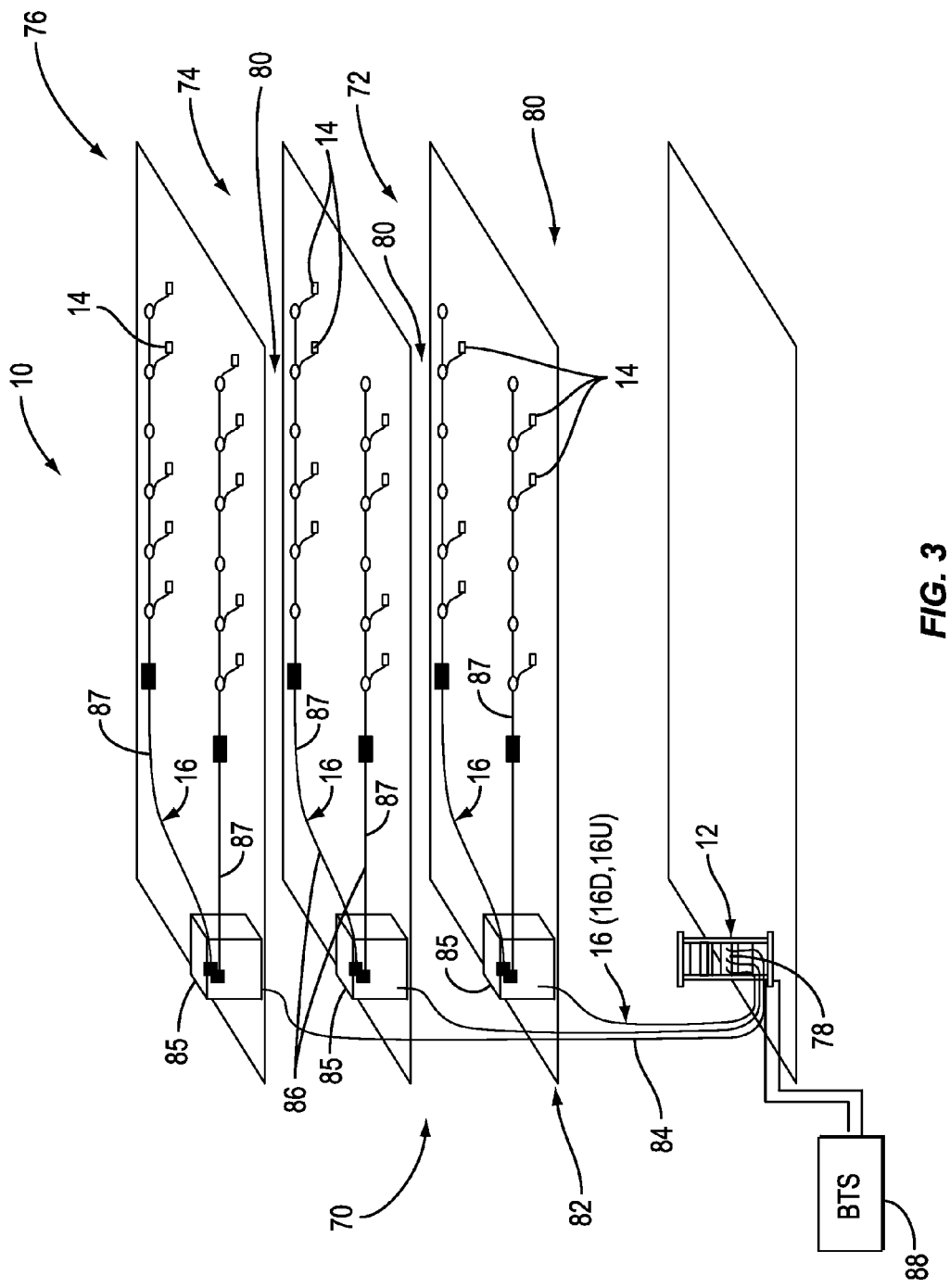
FIG. 3 is a partially schematic cut-away diagram of an exemplary building infrastructure in which the optical fiber-based distributed communications system in FIG. 1 can be employed.

To provide further exemplary illustration of how an optical fiber-based distributed communications system can be deployed indoors, FIG. 3 is provided. FIG. 3 is a partially schematic cut-away diagram of a building infrastructure 70 employing an optical fiber-based distributed communications system. The system may be the optical fiber-based distributed communications system 10 of FIGS. 1 and 2. The building infrastructure 70 generally represents any type of building in which the optical fiber-based distributed communications system 10 can be deployed. As previously discussed with regard to FIGS. 1 and 2, the optical fiber-based distributed communications system 10 incorporates the HEU 12 to provide various types of communication services to coverage areas within the building infrastructure 70, as an example. For example, as discussed in more detail below, the optical fiber-based distributed communications system 10 in this embodiment is configured to receive wireless RF signals and convert the RF signals into RoF signals to be communicated over the optical fiber 16 to multiple RAUs 14. The optical fiber-based distributed communications system 10 in this embodiment can be, for example, an indoor distributed antenna system (IDAS) to provide wireless service inside the building infrastructure 70. These wireless signals can include, but are not limited to, cellular service, wireless services such as RFID tracking, Wireless Fidelity (WiFi), local area network (LAN), WLAN, and combinations thereof, as examples.

With continuing reference to FIG. 3, the building infrastructure 70 in this embodiment includes a first (ground) floor 72, a second floor 74, and a third floor 76. The floors 72, 74, 76 are serviced by the HEU 12 through a main distribution frame 78 to provide antenna coverage areas 80 in the building infrastructure 70. Only the ceilings of the floors 72, 74, 76 are shown in FIG. 3 for simplicity of illustration. In the example embodiment, a main cable 82 has a number of different sections that facilitate the placement of a large number of RAUs 14 in the building infrastructure 70. Each RAU 14 in turn services its own coverage area in the antenna coverage areas 80. The main cable 82 can include, for example, a riser cable 84 that carries all of the downlink and uplink optical fibers 16D, 16U to and from the HEU 12. The riser cable 84 may be routed through an interconnect unit (ICU) 85. The ICU 85 may be provided as part of or separate from the power supply 54 in FIG. 2. The ICU 85 may also be configured to provide power to the RAUs 14 via the electrical power line 58, as illustrated in FIG. 2 and discussed above, provided inside an array cable 87, or tail cable or home-run tether cable as other examples, and distributed with the downlink and uplink optical fibers 16D, 16U to the RAUs 14. The main cable 82 can include one or more multi-cable (MC) connectors adapted to connect select downlink and uplink optical fibers 16D, 16U, along with an electrical power line, to a number of optical fiber cables 86.

The main cable 82 enables multiple optical fiber cables 86 to be distributed throughout the building infrastructure 70 (e.g., fixed to the ceilings or other support surfaces of each floor 72, 74, 76) to provide the antenna coverage areas 80 for the first, second and third floors 72, 74 and 76. In an example embodiment, the HEU 12 is located within the building infrastructure 70 (e.g., in a closet or control room), while in another example embodiment the HEU 12 may be located outside of the building infrastructure 70 at a remote location. A base transceiver station (BTS) 88, which may be provided by a second party such as a cellular service provider, is connected to the HEU 12, and can be co-located or located remotely from the HEU 12. A BTS is any station or source that provides an input signal to the HEU 12 and can receive a return signal from the HEU 12. In a typical cellular system, for example, a plurality of BTSs are deployed at a plurality of remote locations to provide wireless telephone coverage. Each BTS serves a corresponding cell and when a mobile client device enters the cell, the BTS communicates with the mobile client device. Each BTS can include at least one radio transceiver for enabling communication with one or more subscriber units operating within the associated cell. As another example, wireless repeaters or bi-directional amplifiers could also be used to serve a corresponding cell in lieu of a BTS. Alternatively, radio input could be provided by a repeater or picocell as other examples.

The optical fiber-based distributed communications system 10 in FIGS. 1-3 and described above provides point-to-point communications between the HEU 12 and the RAU 14. Each RAU 14 communicates with the HEU 12 over a distinct downlink and uplink optical fiber pair to provide the point-to-point communications. Whenever an RAU 14 is installed in the optical fiber-based distributed communications system 10, the RAU 14 is connected to a distinct downlink and uplink optical fiber pair connected to the HEU 12. The downlink and uplink optical fibers 16D, 16U may be provided in a fiber optic cable. Multiple downlink and uplink optical fiber pairs can be provided in a fiber optic cable to service multiple RAUs 14 from a common fiber optic cable. For example, with reference to FIG. 3, RAUs 14 installed on a given floor 72, 74, or 76 may be serviced from the same optical fiber 16. In this regard, the optical fiber 16 may have multiple nodes where distinct downlink and uplink optical fiber pairs can be connected to a given RAU 14. One downlink optical fiber 16D could be provided to support multiple channels each using wavelength-division multiplexing (WDM), as discussed in U.S. patent application Ser. No. 12/892,424 entitled "Providing Digital Data Services in Optical Fiber-based Distributed Radio Frequency (RF) Communications Systems, And Related Components and Methods," incorporated herein by reference in its entirety. Other options for WDM and frequency-division multiplexing (FDM) are also disclosed in U.S. patent application Ser. No. 12/892,424, any of which can be employed in any of the embodiments disclosed herein.

The HEU 12 may be configured to support any frequencies desired, including but not limited to US FCC and Industry Canada frequencies (824-849 MHz on uplink and 869-894 MHz on downlink), US FCC and Industry Canada frequencies (1850-1915 MHz on uplink and 1930-1995 MHz on downlink), US FCC and Industry Canada frequencies (1710-1755 MHz on uplink and 2110-2155 MHz on downlink), US FCC frequencies (698-716 MHz and 776-787 MHz on uplink and 728-746 MHz on downlink), EU R & TTE frequencies (880-915 MHz on uplink and 925-960 MHz on downlink), EU R & TTE frequencies (1710-1785 MHz on uplink and 1805-1880 MHz on downlink), EU R & TTE frequencies (1920-1980 MHz on uplink and 2110-2170 MHz on downlink), US FCC frequencies (806-824 MHz on uplink and 851-869 MHz on downlink), US FCC frequencies (896-901 MHz on uplink and 929-941 MHz on downlink), US FCC frequencies (793-805 MHz on uplink and 763-775 MHz on downlink), and US FCC frequencies (2495-2690 MHz on uplink and downlink).

It may be desirable to provide both digital data services and RF communication services for client devices. For example, it may be desirable to provide digital data services and RF communication services in the building infrastructure 70 to client devices located therein. Wired and wireless devices may be located in the building infrastructure 70 that are configured to access digital data services. Examples of digital data services include, but are not limited to WLAN, WiMax, WiFi, Digital Subscriber Line (DSL), and LTE, etc. For example, Ethernet standards could be supported, including but not limited to 100 Megabits per second (Mbs) (i.e., fast Ethernet) or Gigabit (Gb) Ethernet, or ten Gigabit (10G) Ethernet. Example of digital data devices include, but are not limited to wired and wireless servers, wireless access points (WAPs), gateways, desktop computers, hubs, switches, remote radio heads (RRHs), battery backup units (BBUs), and femtocells. A separate digital data services network can be provided to provide digital data services to digital data devices.

In this regard, embodiments disclosed herein provide optical fiber-based distributed communications systems that support both RF communication services and digital data services. The RF communication services and digital data services can be distributed over optical fiber to client devices, such as remote antenna units for example. Digital data services can be distributed over separate optical fiber from the optical fiber distributing RF communication services. Alternatively, digital data services can be both distributed over common optical fiber with RF communication services in an optical fiber-based distributed communications system. For example, digital data services can be distributed over common optical fiber with RF communication services at different wavelengths through wavelength-division multiplexing (WDM) and/or at different frequencies through frequency division multiplexing (FDM).

Figure 4:
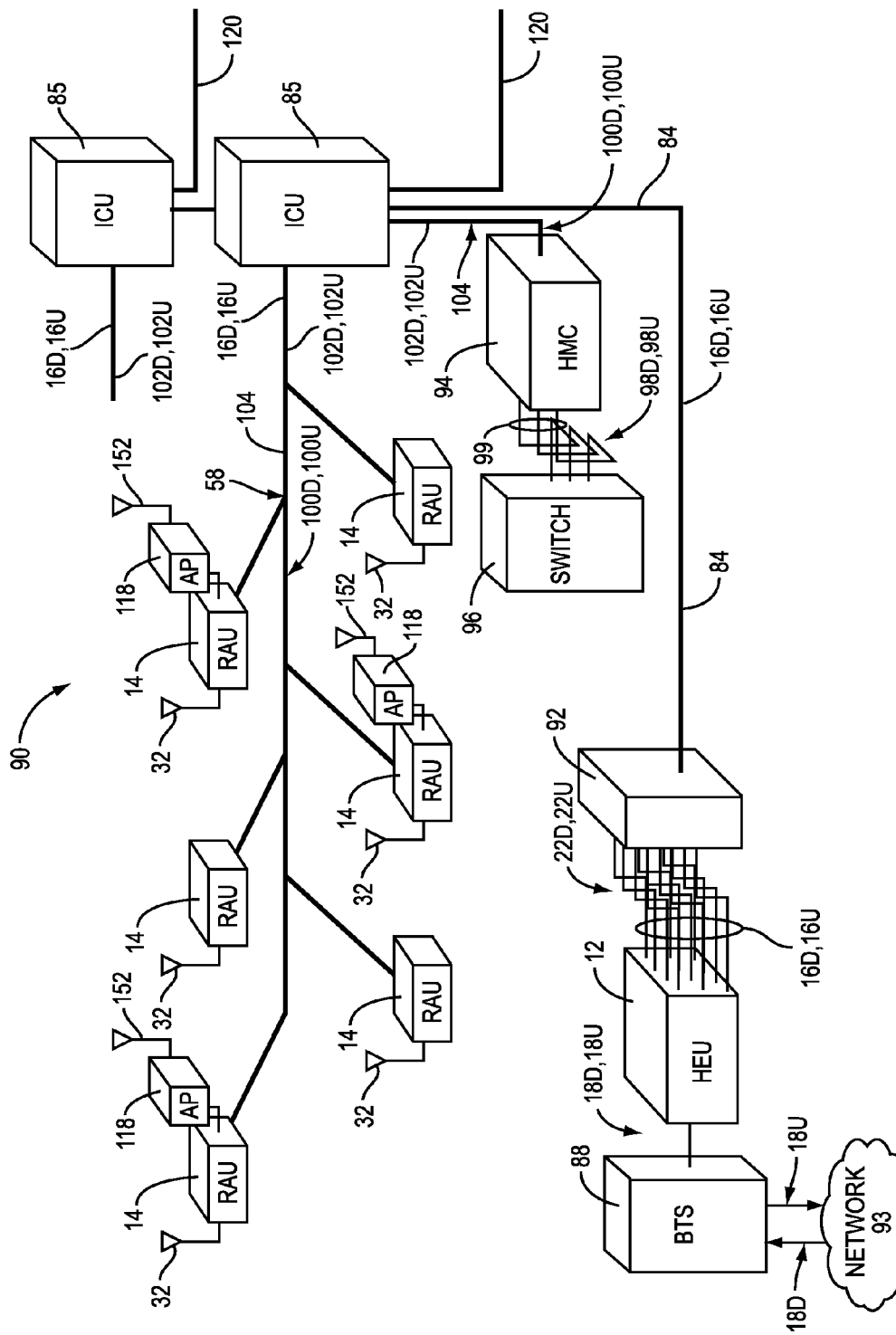
FIG. 4 is a schematic diagram of an exemplary embodiment of providing digital data services over downlink and uplink optical fibers separate from optical fibers providing radio frequency (RF) communication services to RAUs in an optical fiber-based distributed communications system.

FIG. 4 is a schematic diagram of an exemplary embodiment of providing digital data services over separate downlink and uplink optical fibers from radio-frequency (RF) communication services to RAUs in an optical fiber-based distributed communications system 90. The optical fiber-based distributed communications system 90 includes some optical communication components provided in the optical fiber-based distributed communications system 10 of FIGS. 1-3. These common components are illustrated in FIG. 4 with common element numbers with FIGS. 1-3. As illustrated in FIG. 4, the HEU 12 provided. The HEU 12 receives the downlink electrical RF signals 18D from the BTS 88. As previously discussed, the HEU 12 converts the downlink electrical RF signals 18D to downlink optical RF signals 22D to be distributed to the RAUs 14. The HEU 12 is also configured to convert the uplink optical RF signals 22U received from the RAUs 14 into uplink electrical RF signals 18U to be provided to the BTS 88 and on to a network 93 connected to the BTS 88. A patch panel 92 may be provided to receive the downlink and uplink optical fibers 16D, 16U configured to carry the downlink and uplink optical RF signals 22D, 22U. The downlink and uplink optical fibers 16D, 16U may be bundled together in one or more riser cables 84 and provided to one or more ICU 85, as previously discussed and illustrated in FIG. 3.

Figure 5:
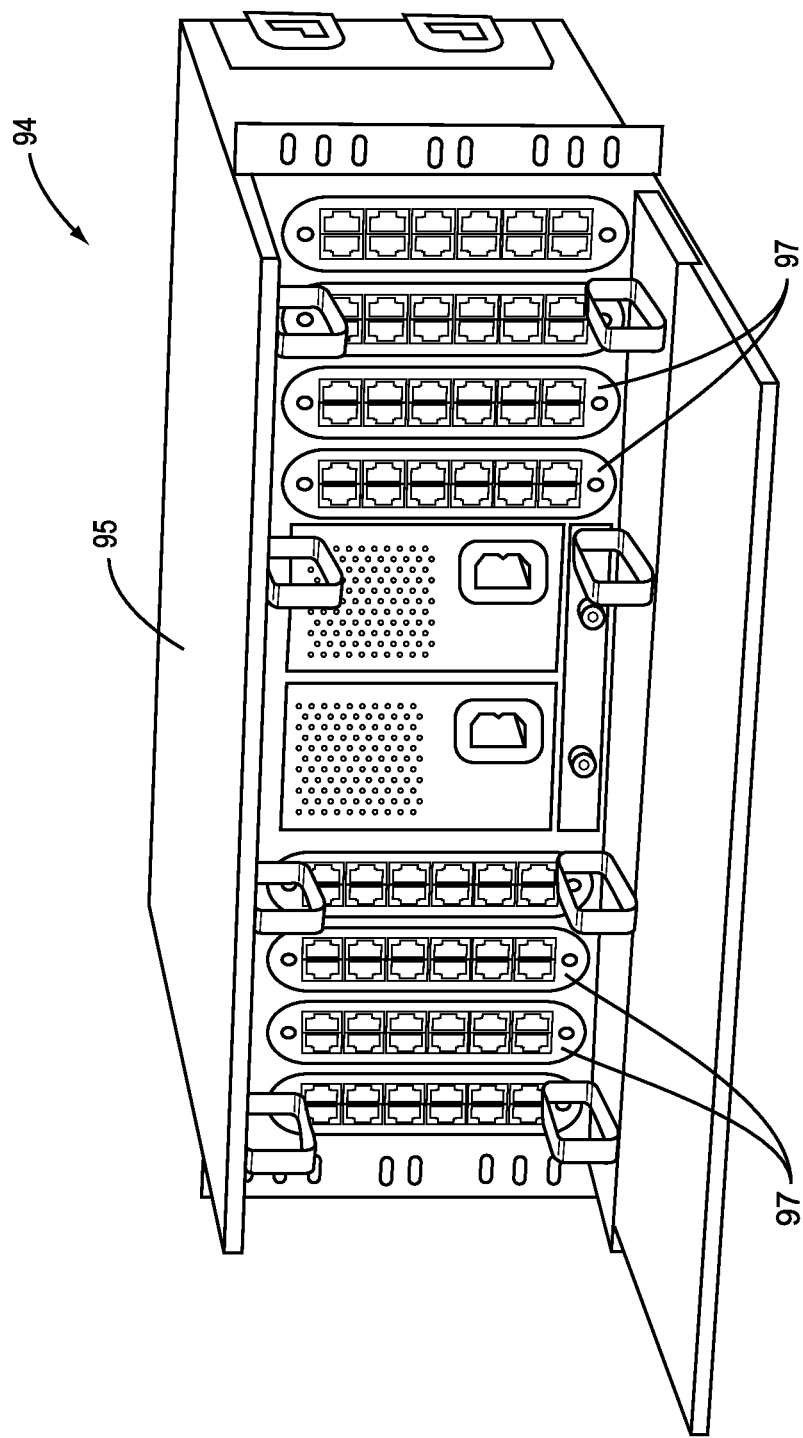
FIG. 5 is a diagram of an exemplary head-end media converter (HMC) employed in the optical fiber-based distributed communications system of FIG. 4 containing digital media converters (DMCs) configured to convert electrical digital signals to optical digital signals and vice versa.
Figure 6:
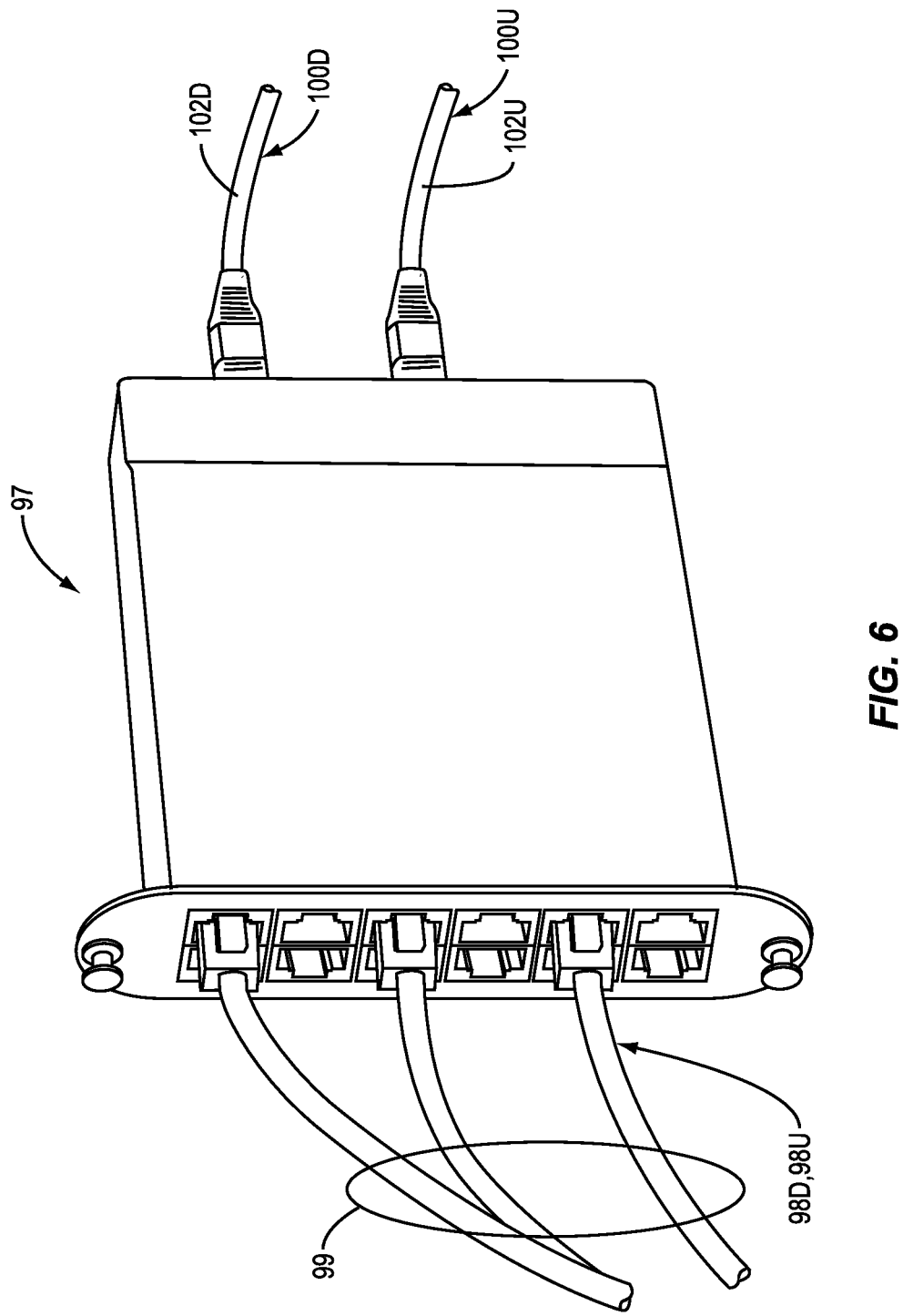
FIG. 6 is a diagram of an exemplary DMCs employed in the HMC of FIG. 5.

To provide digital data services in the optical fiber-based distributed communications system 90 in this embodiment, a head-end media converter (HMC) 94 is provided. FIG. 5 illustrates an example of the HMC 94. The HMC 94 includes a housing 95 configured house digital media converters (DMCs) 97 to interface to a digital data services switch 96 to support and provide digital data services. For example, the digital data services switch 96 could be an Ethernet switch. The digital data services switch 96 may be configured to provide Gigabit (Gb) Ethernet digital data service as an example. The DMCs 97 are configured to convert electrical digital signals to optical digital signals, and vice versa. The DMCs 97 may be configured for plug and play installation into the HMC 94. FIG. 6 illustrates an exemplary DMC 97 that can be disposed in the housing 95 of the HMC 94. For example, the DMC 97 may include Ethernet input connectors or adapters (e.g., RJ-45) and optical fiber output connectors or adapters (e.g., SC, MTP, LC, FC, ST, etc).

Figure 7:
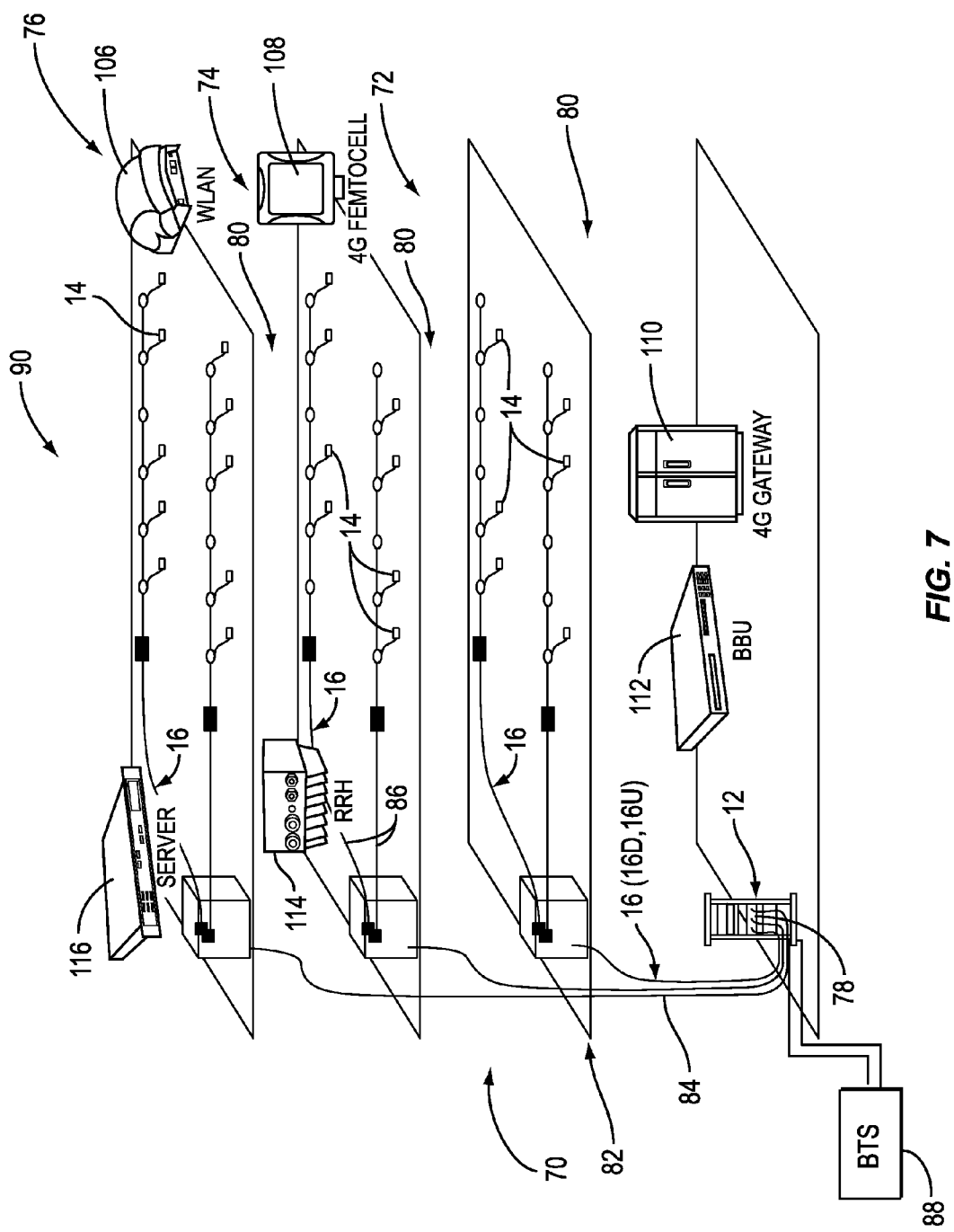
FIG. 7 is a schematic diagram of an exemplary building infrastructure in which digital data services and RF communication services are provided in an optical fiber-based distributed communications system.

With reference to FIG. 4, the HMC 94 (via the DMCs 97) in this embodiment is configured to convert downlink electrical digital signals 98D over digital line cables 99 from the digital data services switch 96 into downlink optical digital signals 100D that can be communicated over downlink optical fiber 102D to RAUs 14. The HMC 94 via the DMCs 97) is also configured to receive uplink optical digital signals 100U from the RAUs 14 via the uplink optical fiber 102U and convert the uplink optical digital signals 100U into uplink electrical digital signals 98U to be communicated to the digital data services switch 96. In this manner, the digital data services can be provided over optical fiber as part of the optical fiber-based distributed communications system 90 to provide digital data services in addition to RF communication services. Client devices located at the RAUs 14 can access these digital data services and/or RF communication services depending on their configuration. For example, FIG. 7 illustrates the building infrastructure 70 of FIG. 3, but with illustrative examples of digital data services and digital client devices that can be provided to client devices in addition to RF communication services in the optical fiber-based distributed communications system 90. As illustrated in FIG. 7, exemplary digital data services include WLAN 106, femtocells 108, gateways 110, battery backup units (BBU) 112, remote radio heads (RRH) 114, and servers 116.

With reference back to FIG. 4, in this embodiment, the downlink and uplink optical fibers 102D, 102U are provided in a fiber optic cable 104 that is interfaced to the ICU 85. The ICU 85 provides a common point in which the downlink and uplink optical fibers 102D, 102U carrying digital optical signals can be bundled with the downlink and uplink optical fibers 16U, 16D carrying RF optical signals. One or more array cables 105 can be provided containing the downlink and uplink optical fibers 16D, 16U for RF communication services and downlink and uplink optical fibers 102D, 102U for digital data services to be routed and provided to the RAUs 14. Any combination of services or types of optical fibers can be provided in the fiber optic cable 104. For example, the fiber optic cable 104 may include single mode and/or multi-mode optical fibers for RF communication services and/or digital data services.

Examples of ICUs that may be provided in the optical fiber-based distributed communications system 90 to distribute both downlink and uplink optical fibers 16D, 16U for RF communication services and downlink and uplink optical fibers 102D, 102U for digital data services are described in U.S. patent application Ser. No. 12/466,514 filed on May 15, 2009 and entitled "Power Distribution Devices, Systems, and Methods For Radio-Over-Fiber (RoF) Distributed Communication," incorporated herein by reference in its entirety, and U.S. Provisional Patent Application Ser. No. 61/330,385 filed on May 2, 2010 and entitled "Power Distribution in Optical Fiber-based Distributed Communication Systems Providing Digital Data and Radio-Frequency (RF) Communication Services, and Related Components and Methods," both of which are incorporated herein by reference in their entireties.

With continuing reference to FIG. 4, some RAUs 14 can be connected to access units (AUs) 118 which may be access points (APs) or other devices supporting digital data services. The AUs 118 can also be connected directly to the HEU 12. AUs 118 are illustrated, but the AUs 118 could be any other device supporting digital data services. In the example of AUs, the AUs 118 provide access to the digital data services provided by the digital data services switch 96. This is because the downlink and uplink optical fibers 102D, 102U carrying downlink and uplink optical digital signals 100D, 100U converted from downlink and uplink electrical digital signal 98D, 98U from the digital data services switch 96 are provided to the AUs 118, via the fiber optic cables 104 and RAUs 14. Digital data client devices can access the AUs 118 to access digital data services provided by the digital data services switch 96.

Digital data service clients, such as AUs, require power to operate and to receive digital data services. By providing digital data services as part of an optical fiber-based distributed communications system, power distributed to the RAUs in the optical fiber-based distributed communications system can also be used to provide access to power for digital data service clients. This may be a convenient method of providing power to digital data service clients as opposed to providing separate power sources for digital data service clients. For example, power distributed to the RAUs 14 in FIG. 4 by or through the ICU 85 can also be used to provide power to the AUs 118 located at RAUs 14 in the optical fiber-based distributed communications system 90. In this regard, the ICUs 85 may be configured to provide power for both RAUs 14 and the AUs 118. A power supply may be located within the ICU 85, but could also be located outside of the ICU 85 and provided over an electrical power line 120, as illustrated in FIG. 4. The ICU 85 may receive either alternating current (AC) or direct current (DC) power. The ICU 85 may receive 110 Volts (V) to 240V AC or DC power. The ICU 85 can be configured to produce any voltage and power level desired. The power level is based on the number of RAUs 14 and the expected loads to be supported by AUs 118 in FIG. 4. It may further be desired to provide additional power management features in the ICU 85. For example, one or more voltage protection circuits may be provided.

Figure 8:
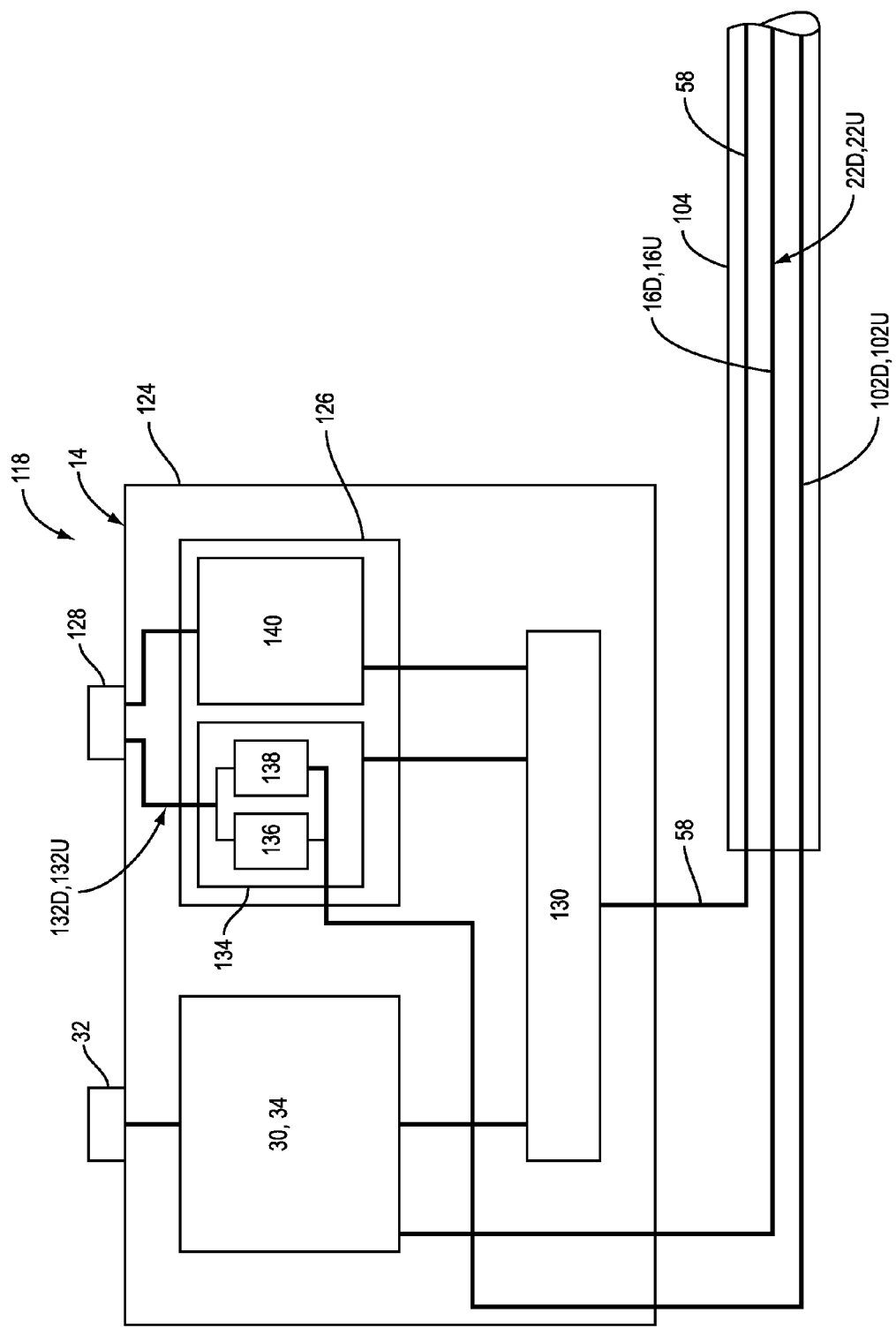
FIG. 8 is a schematic diagram of an exemplary RAU that can be employed in an optical fiber-based distributed communications system providing exemplary digital data services and RF communication services.

FIG. 8 is a schematic diagram of exemplary internal components in the RAU 14 of FIG. 4 to further illustrate how the downlink and uplink optical fibers 16D, 16D for RF communications, the downlink and uplink optical fibers 102D, 102U for digital data services, and electrical power are provided to the RAU 14 can be distributed therein. As illustrated in FIG. 8, the fiber optic cable 104 is illustrated that contains the downlink and uplink optical fibers 16D, 16D for RF communications, the downlink and uplink optical fibers 102D, 102U for digital data services, and the electrical power line 58 (see also, FIG. 2) carrying power from the ICU 85. As previously discussed in regard to FIG. 2, the electrical power line 58 may comprise two wires 60, 62, which may be copper lines for example.

The downlink and uplink optical fibers 16D, 16U for RF communications, the downlink and uplink optical fibers 102D, 102U for digital data services, and the electrical power line 58 come into a housing 124 of the RAU 14. The downlink and uplink optical fibers 16D, 16U for RF communications are routed to the O/E converter 30 and E/O converter 34, respectively, and to the antenna 32, as also illustrated in FIG. 2 and previously discussed. The downlink and uplink optical fibers 102D, 102U for digital data services are routed to a digital data services interface 126 provided as part of the AU 118 to provide access to digital data services via port 128 in this embodiment, which will be described in more detail below. The electrical power line 58 carries power that is configured to provide power to the O/E converter 30 and E/O converter 34 and to the digital data services interface 126. In this regard, the electrical power line 58 is coupled to a voltage controller 130 to that regulates and provides the correct voltage to the O/E converter 30 and E/O converter 34 and the to the digital data services interface 126.

In this embodiment, the digital data services interface 126 is configured to convert downlink optical digital signals 100D on the downlink optical fiber 102D into downlink electrical digital signals 132D that can be accessed via port 128. The digital data services interface 126 is also configured to convert uplink electrical digital signals 132U received through port 128 into uplink optical digital signals 100U to be provided back to the HMC 94 (see FIG. 4). In this regard, a media converter 134 is provided in the digital data services interface 126 to provide these conversions. The media converter 134 contains an O/E digital converter 136 to convert downlink optical digital signals 100D on downlink optical fiber 102D into downlink electrical digital signals 132D. The media converter 134 also contains an E/O digital converter 138 to convert uplink electrical digital signals 132U received through port 128 into uplink optical digital signals 100U to be provided back to the HMC 94. In this regard, power from the electrical power line 58 is provided to the digital data services interface 126 to provide power to the O/E digital converter 136 and E/O digital converter 138.

Because electrical power is provided to the RAU 14 and the digital data services interface 126, this also provides an opportunity to provide power for client devices connected to the AU 118 via port 128. In this regard, a power interface 140 is also provided in the digital data services interface 126, as illustrated in FIG. 8. The power interface 140 is configured to receiver power from the electrical power line 58 via the voltage controller 130 and to also make power accessible through port 128. In this manner, if a client device contains a compatible connector to connect to port 128, not only will digital data services be accessible, but power from the electrical power line 58 can also be accessed through the same port 128. Alternatively, the power interface 140 could be coupled to a separate port from the port 128 for digital data services.

For example, if the digital data services are Ethernet services, the power interface 140 could be provided as a Power-over-Ethernet (PoE) interface. The port 128 could be configured to receive a RJ45 Ethernet connector compatible with PoE as an example. In this manner, an Ethernet connector connected into the port 128 would be able to access both Ethernet digital data services to and from the downlink and uplink optical fibers 102D, 102U to the HMC 94 as well as access power distributed by the ICU 85 over the fiber optic cable 104 provided by the electrical power line 58.

Further, the HEU 12 could include low level control and management of the media converter 134 using RF communication supported by the HEU 12. For example, the media converter 134 could report functionality data (e.g., electrical power on, reception of optical digital data, etc.) to the HEU 12 over the uplink optical fiber 16U that carries RF communication services. The RAU 14 can include a microprocessor that communicates with the media converter 134 to receive this data and communicate this data over the uplink optical fiber 16U to the HEU 12.

Figure 9:
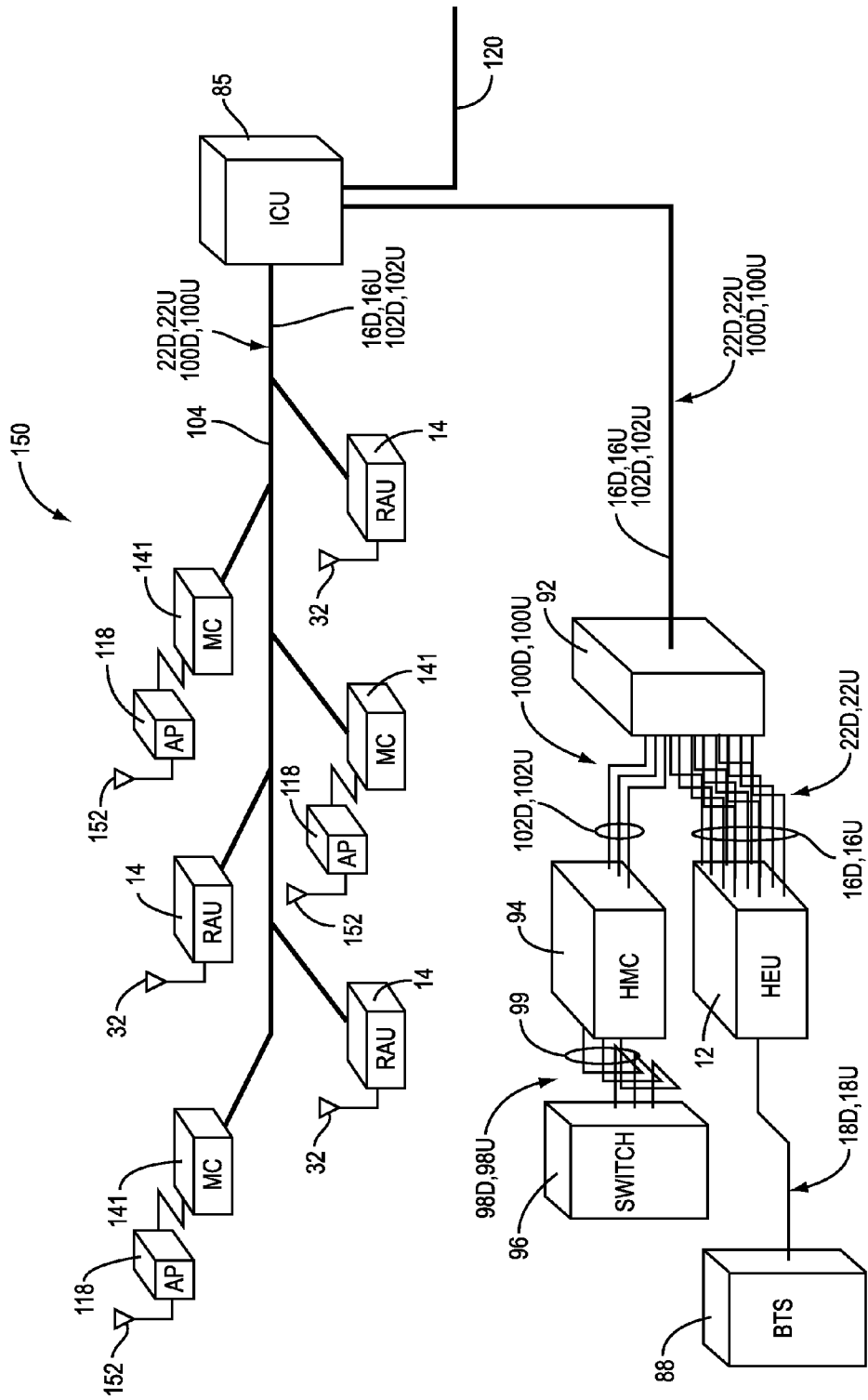
FIG. 9 is a schematic diagram of another exemplary embodiment of providing digital data services over separate downlink and uplink optical fibers from RF communication services to RAUs in an optical fiber-based distributed communications system.
Figure 10A:
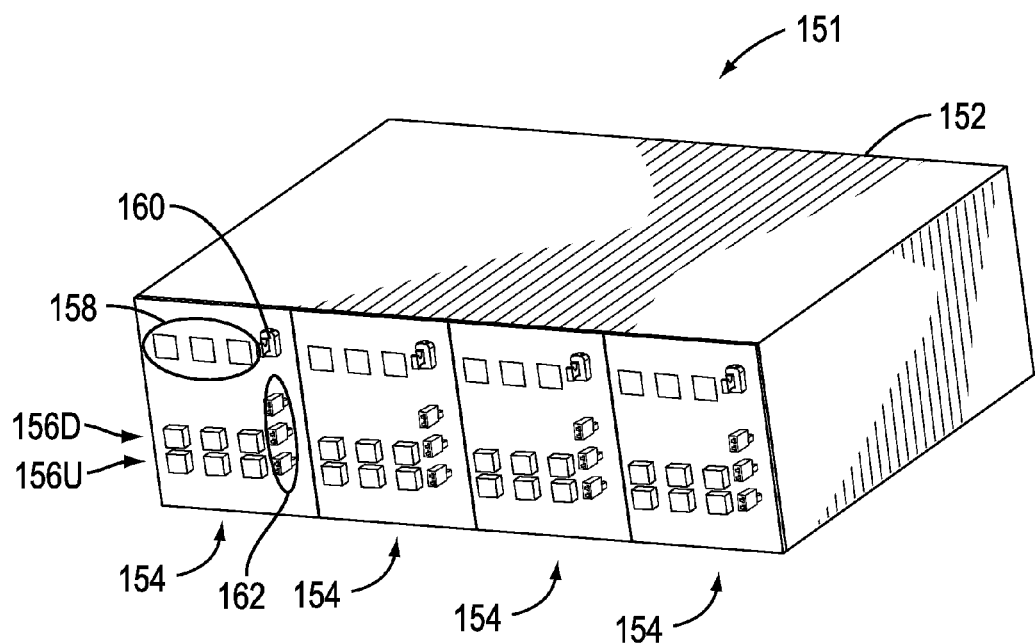
FIGS. 10A-10E illustrate front perspective, rear perspective, front, rear, and side views of an exemplary ICU comprised of an ICU housing containing distribution modules each supporting the distribution of RF communication services, digital data services, and power to a plurality of RAUs connected to an array cable in an optical fiber-based distributed communications system.
Figure 10B:
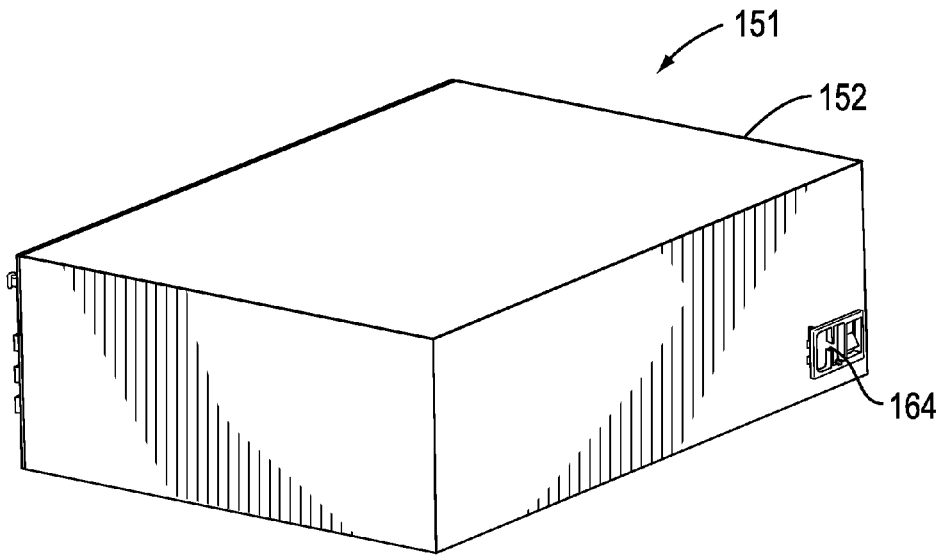
Figure 10C:
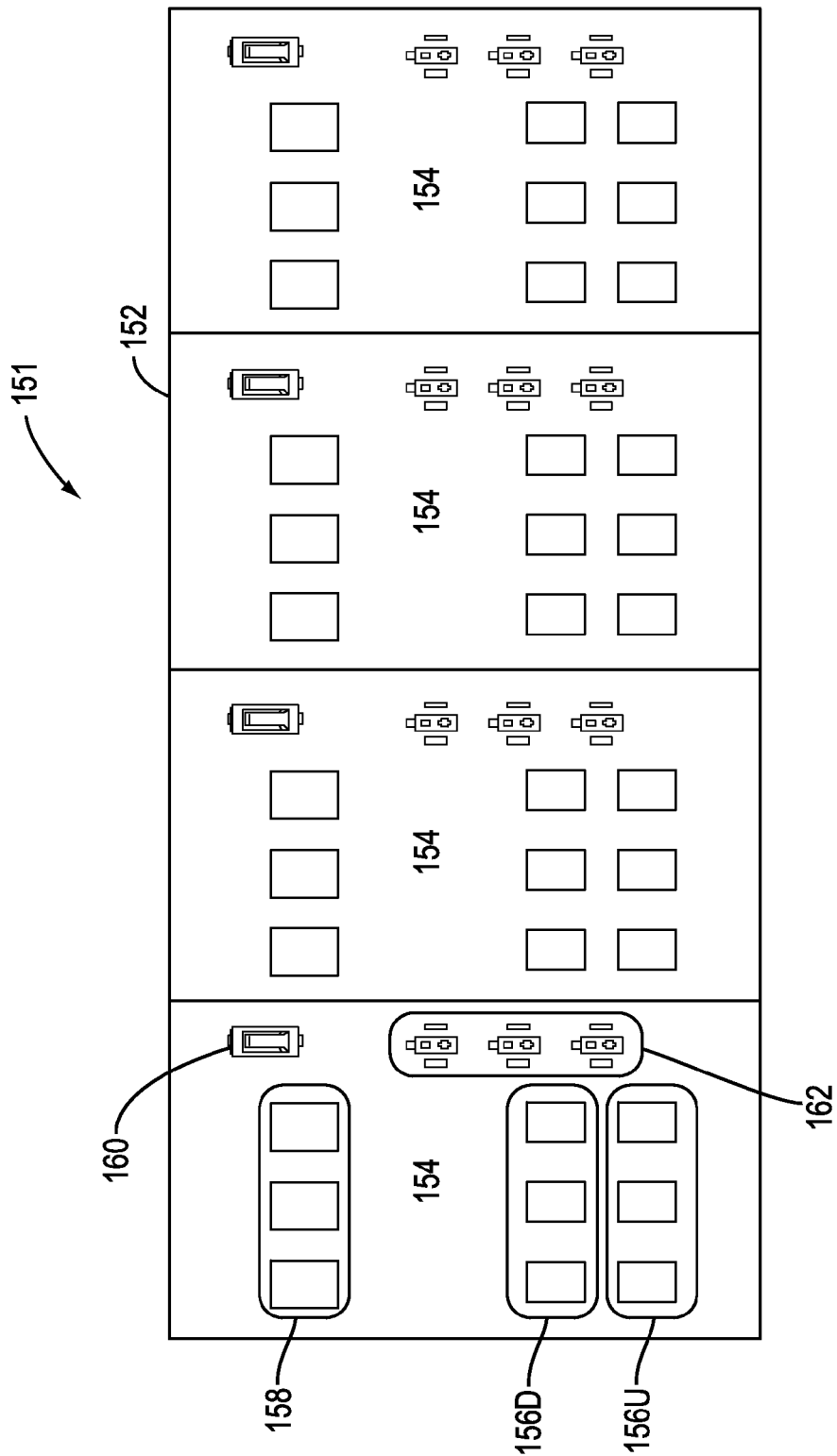
Figure 10D:
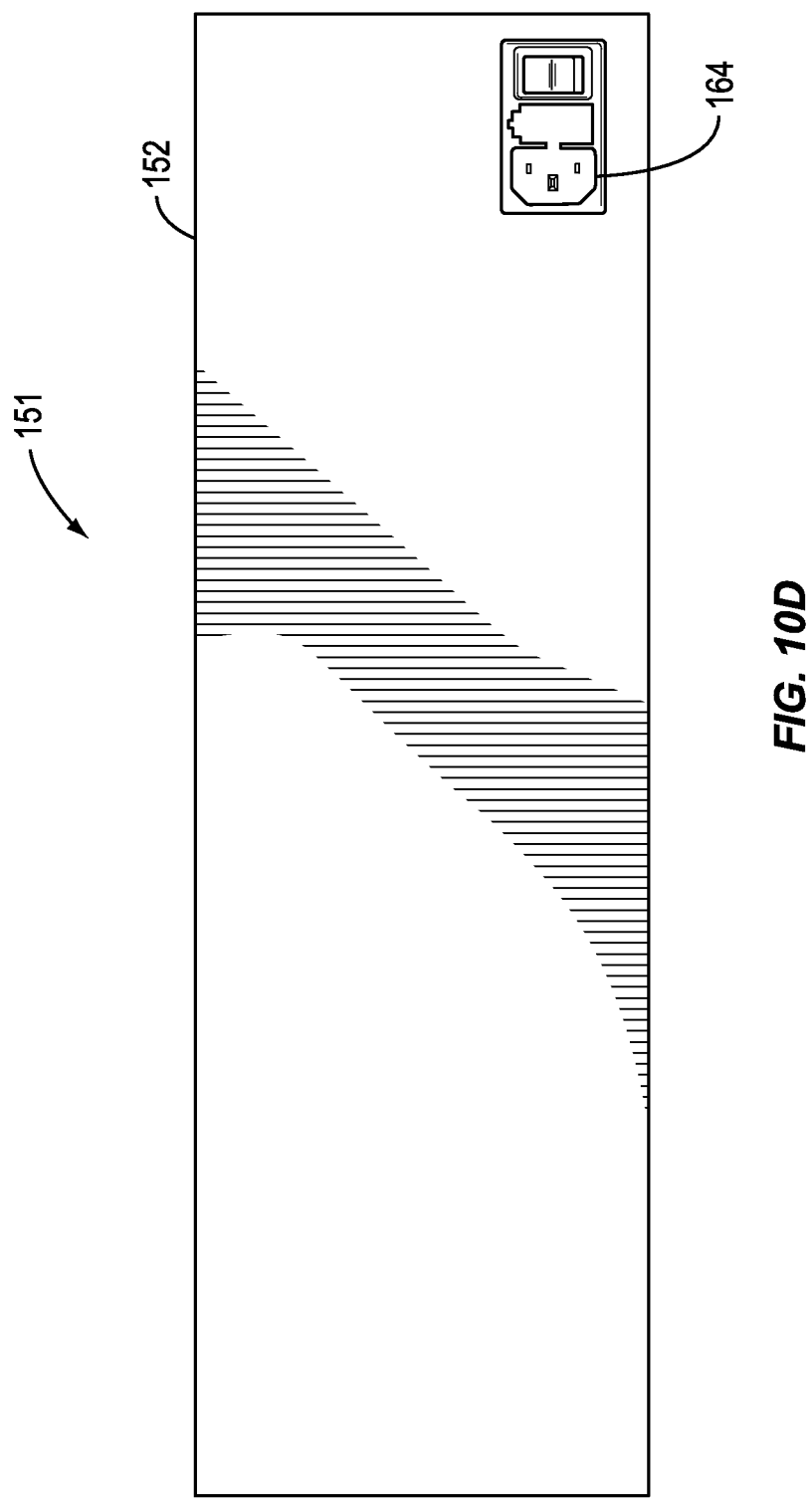
Figure 10E:
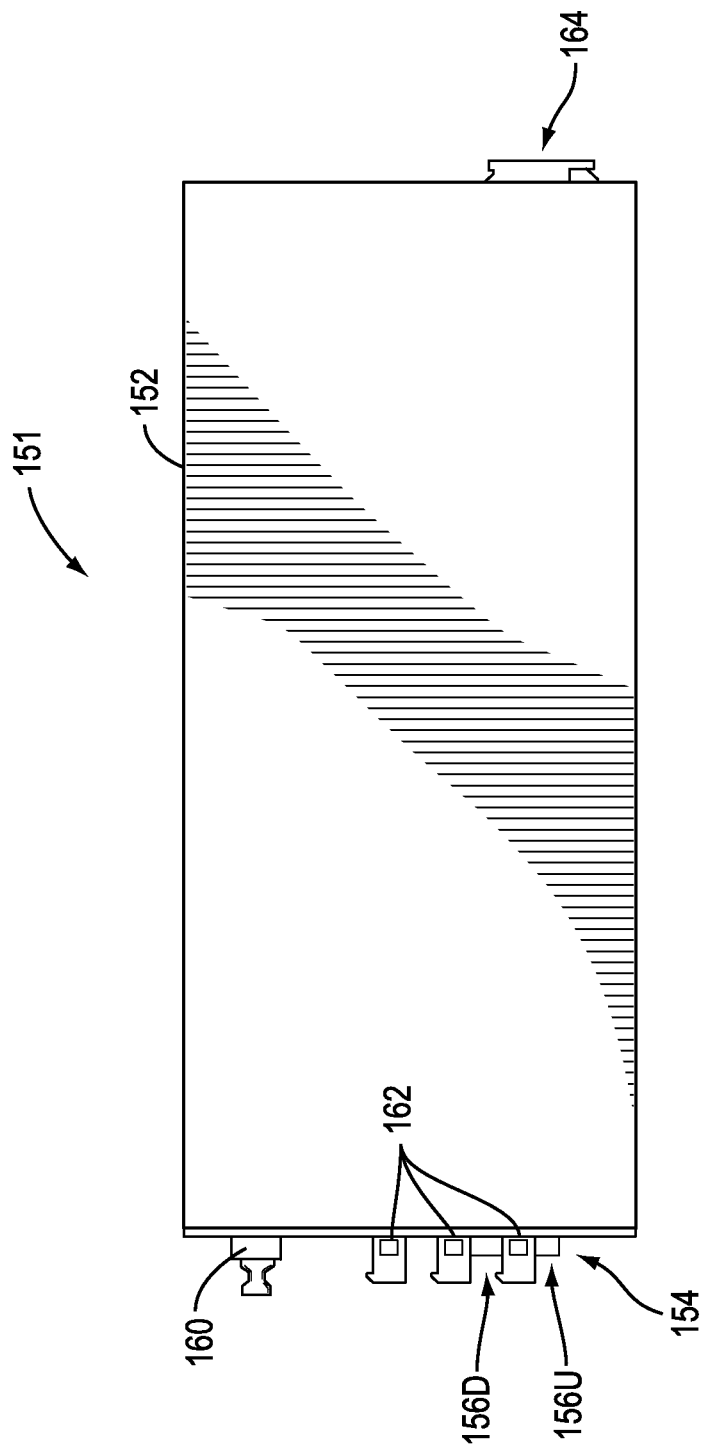
Figure 11A:
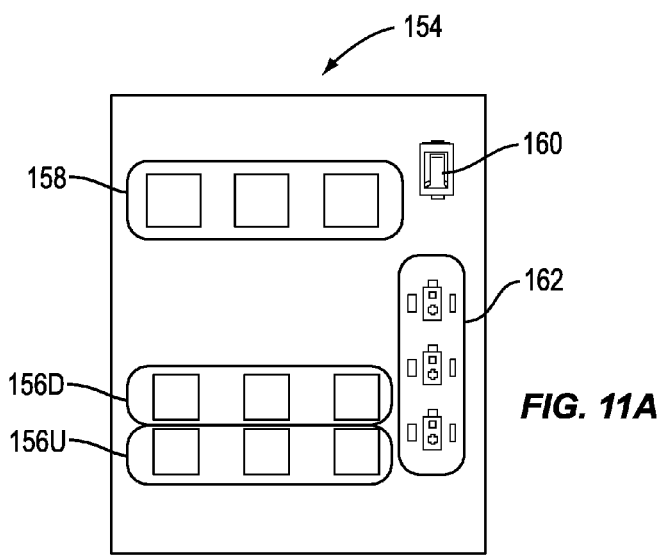
FIGS. 11A-11E illustrate front perspective, rear perspective, front, top, and side views of the distribution modules contained in the ICU housing of FIGS. 10A-10E.
Figure 11B:
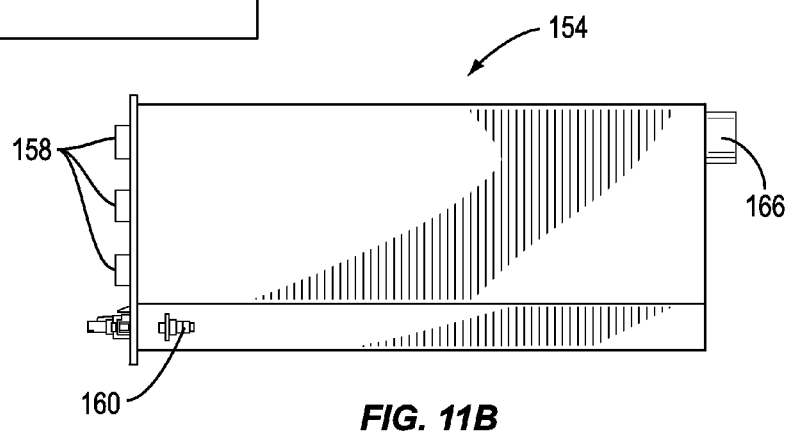
Figure 11C:
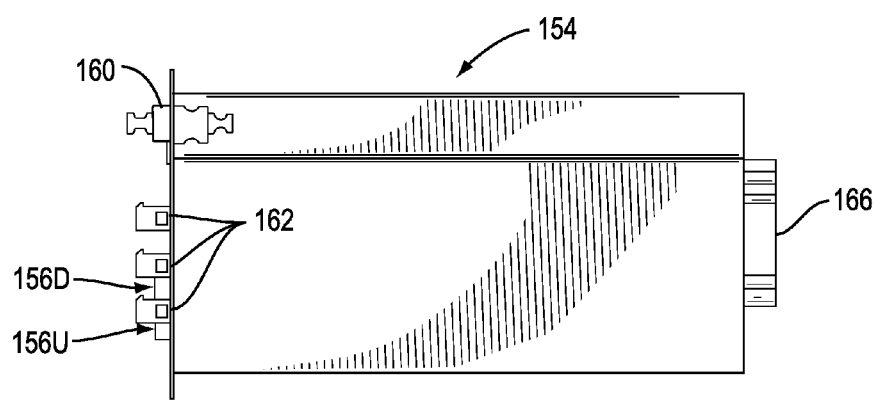
Figure 11D:
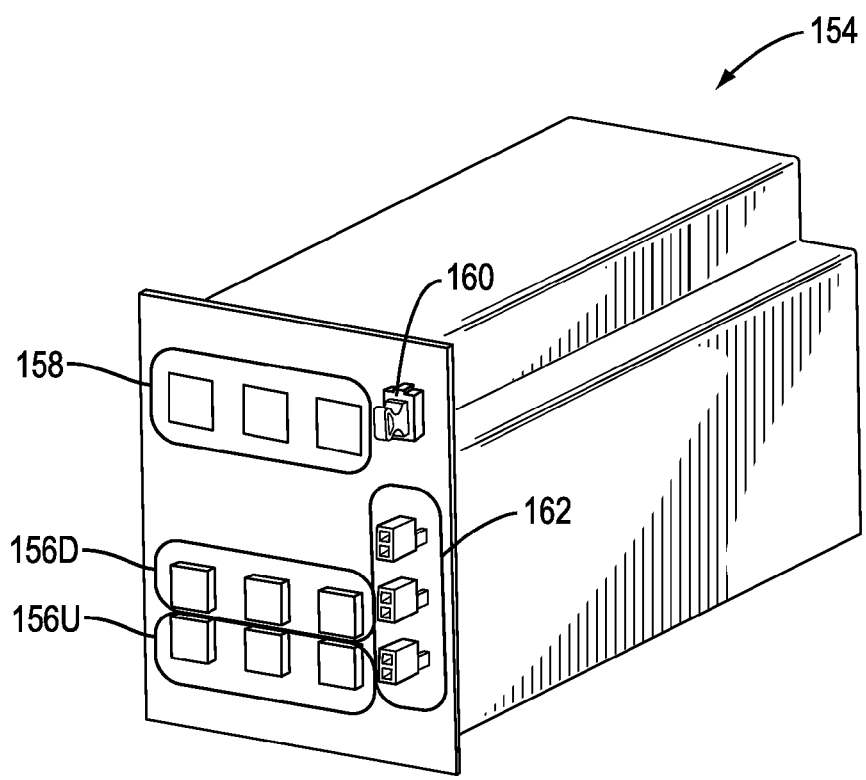
Figure 11E:
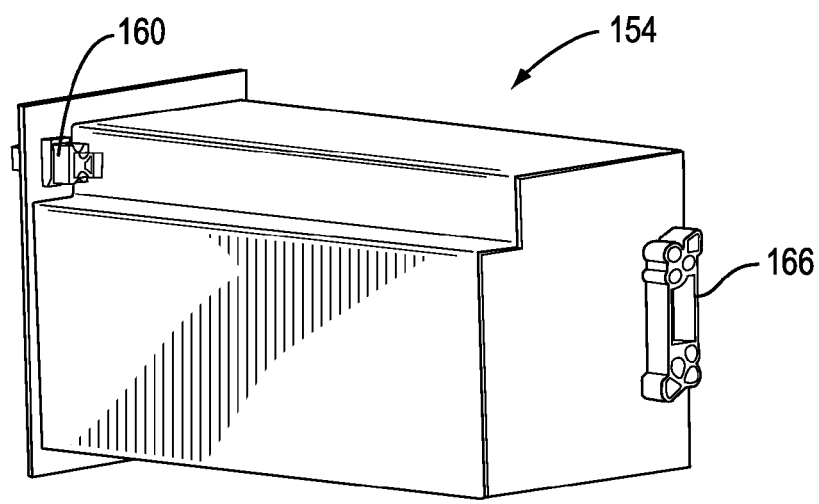
Figure 12A:
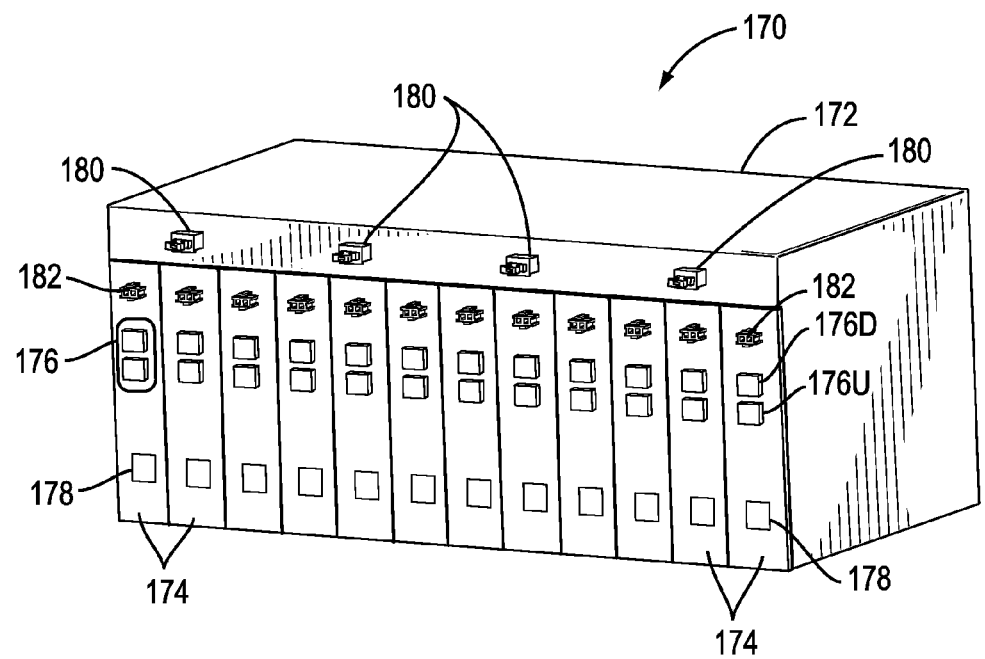
FIGS. 12A-12E illustrate front perspective, rear perspective, front, rear, and side views of another exemplary ICU comprised of an ICU housing containing distribution modules supporting the distribution of RF communication services, digital data services, and power to an individual RAU in an optical fiber-based distributed communications system.
Figure 12B:
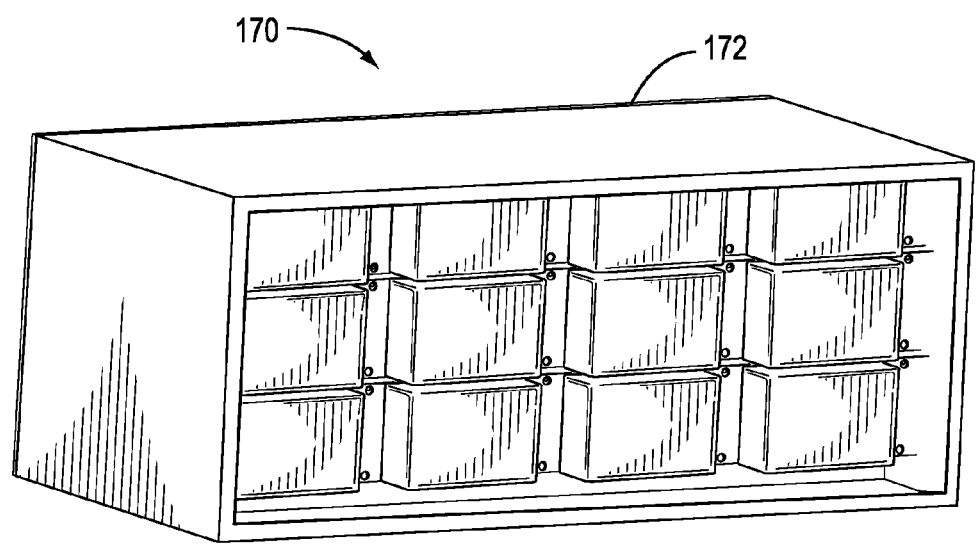
Figure 12C:
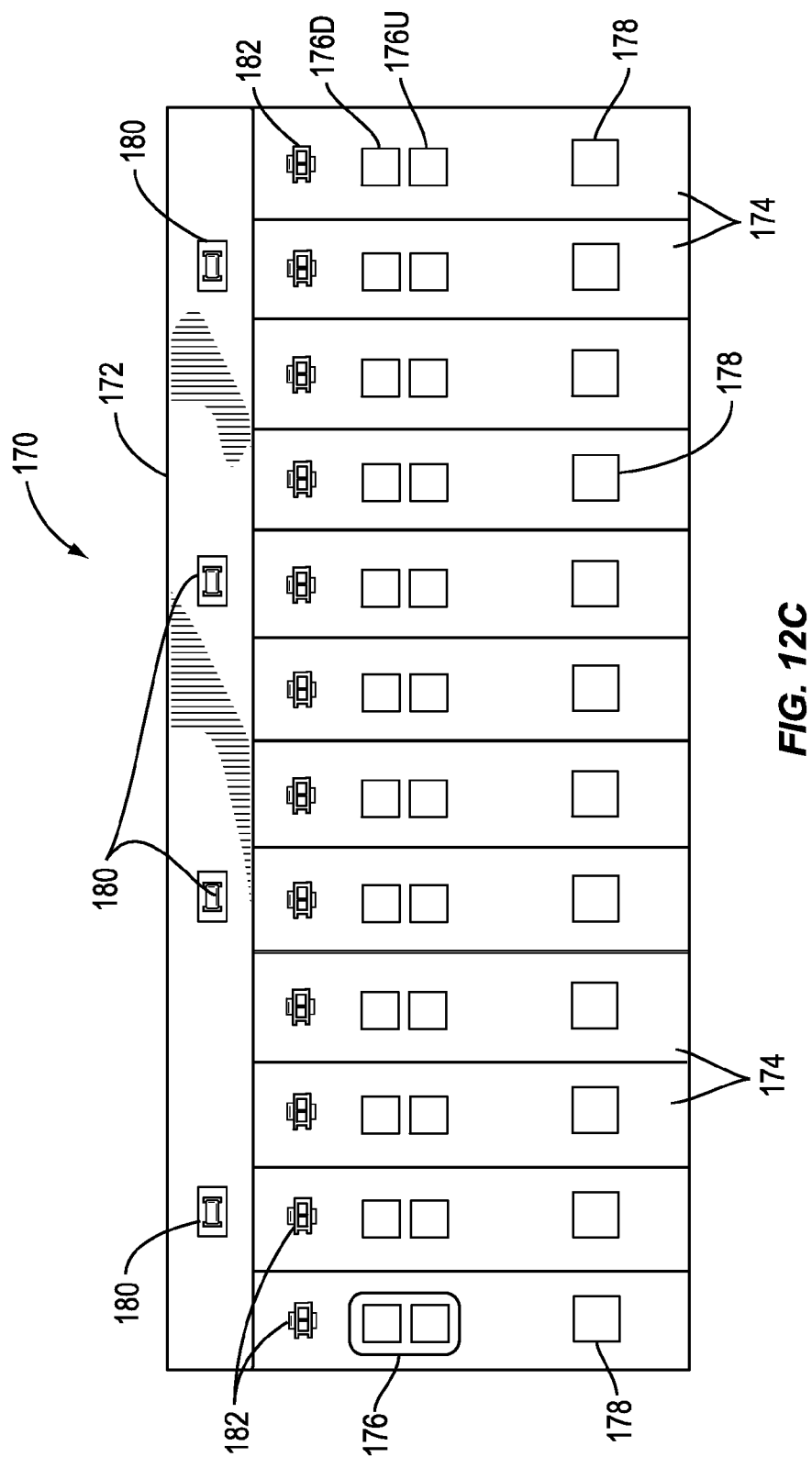
Figure 12D:
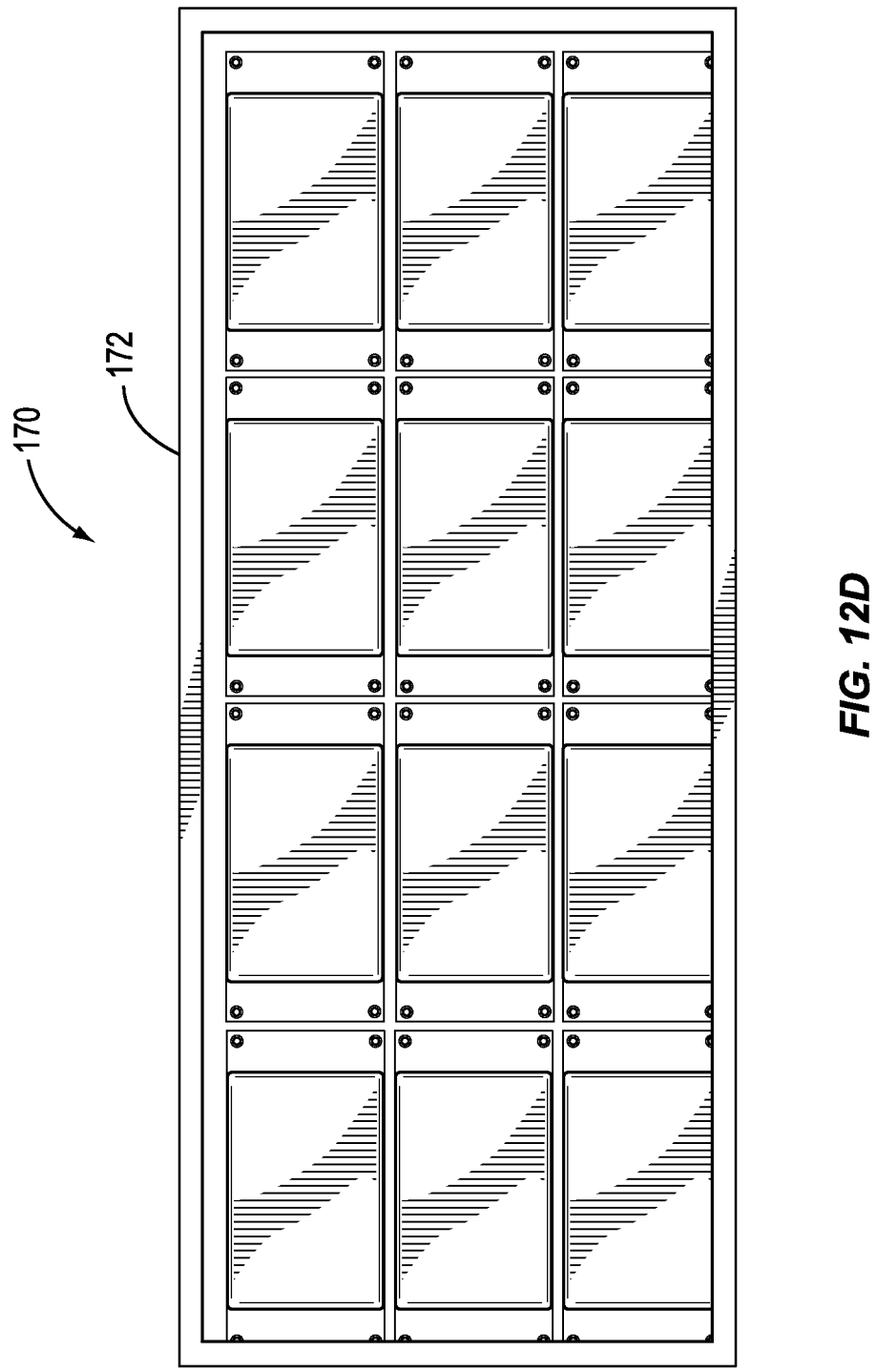
Figure 12E:
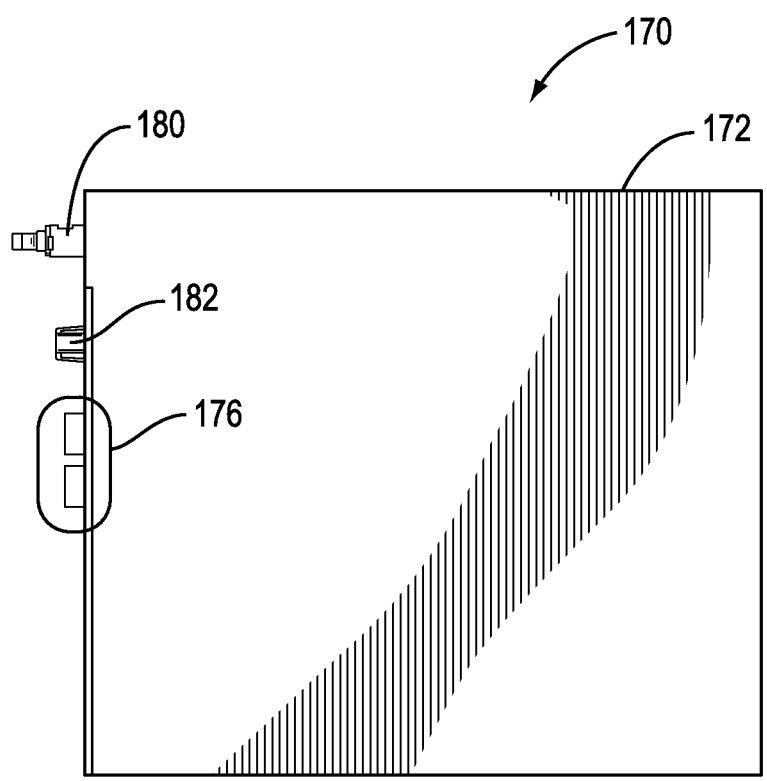
Figure 13A:
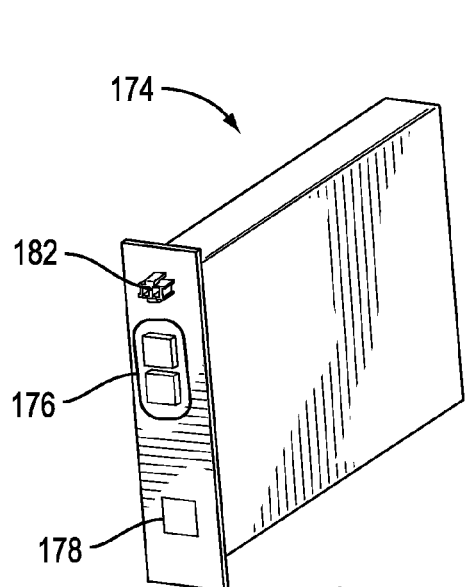
FIGS. 13A-13D illustrate front perspective, front, side, and top views of the distribution modules contained in the ICU housing of FIGS. 12A-12E.
Figure 13B:
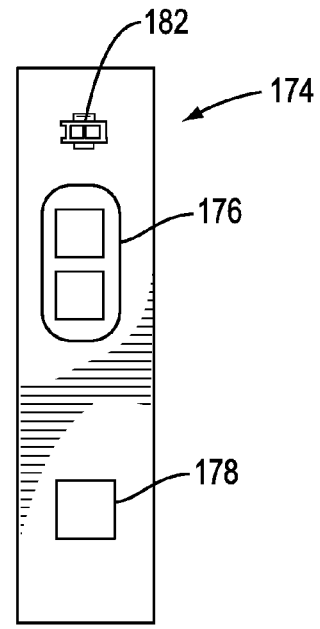
Figure 13C:
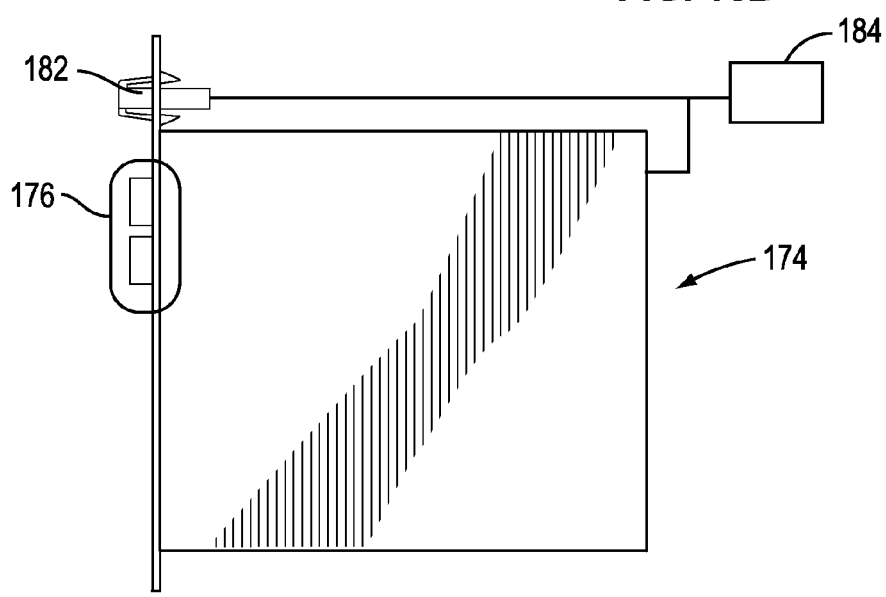
Figure 13D:
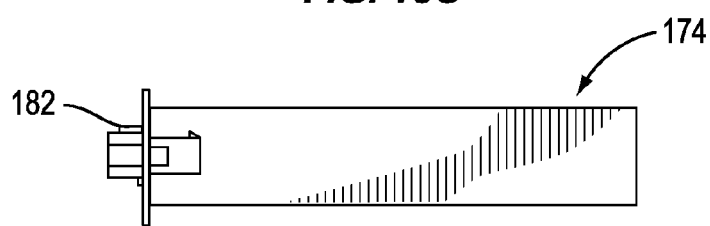
Figure 14A:
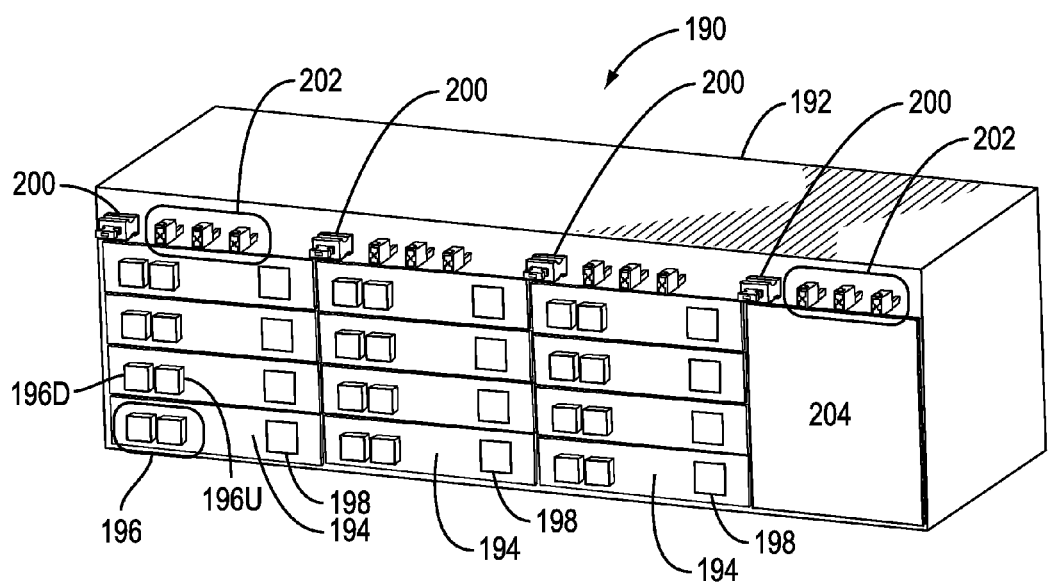
Figure 14B:
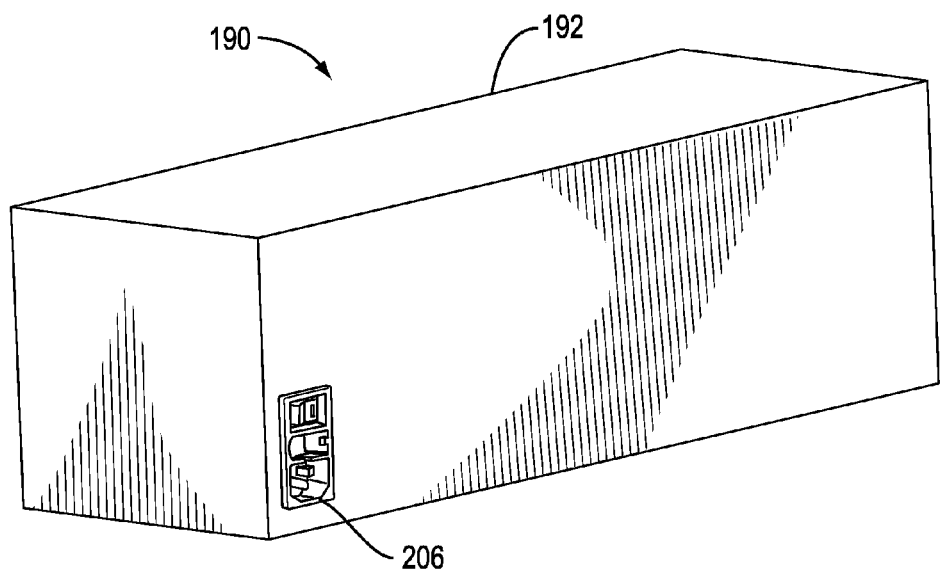
Figure 14C:
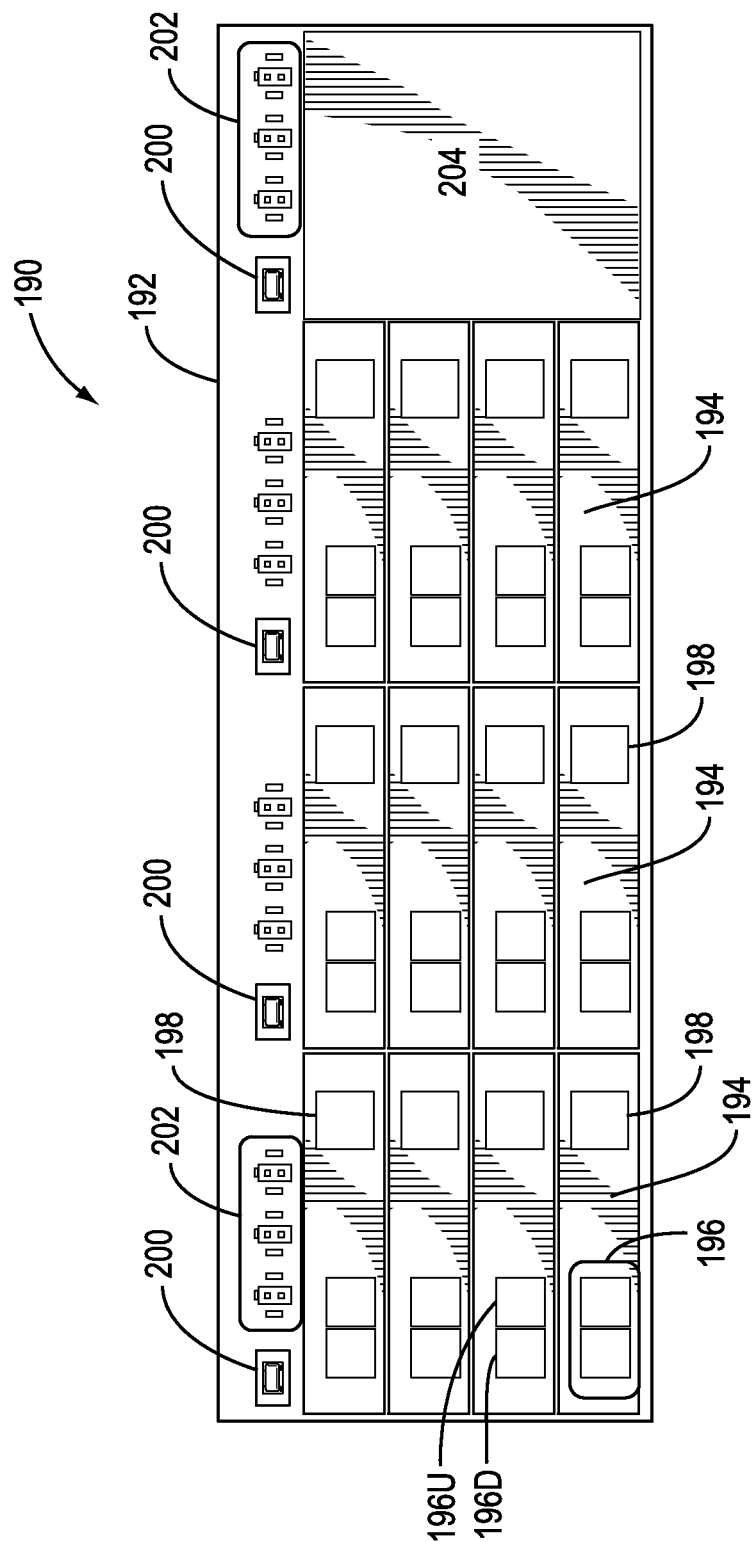
Figure 14E:
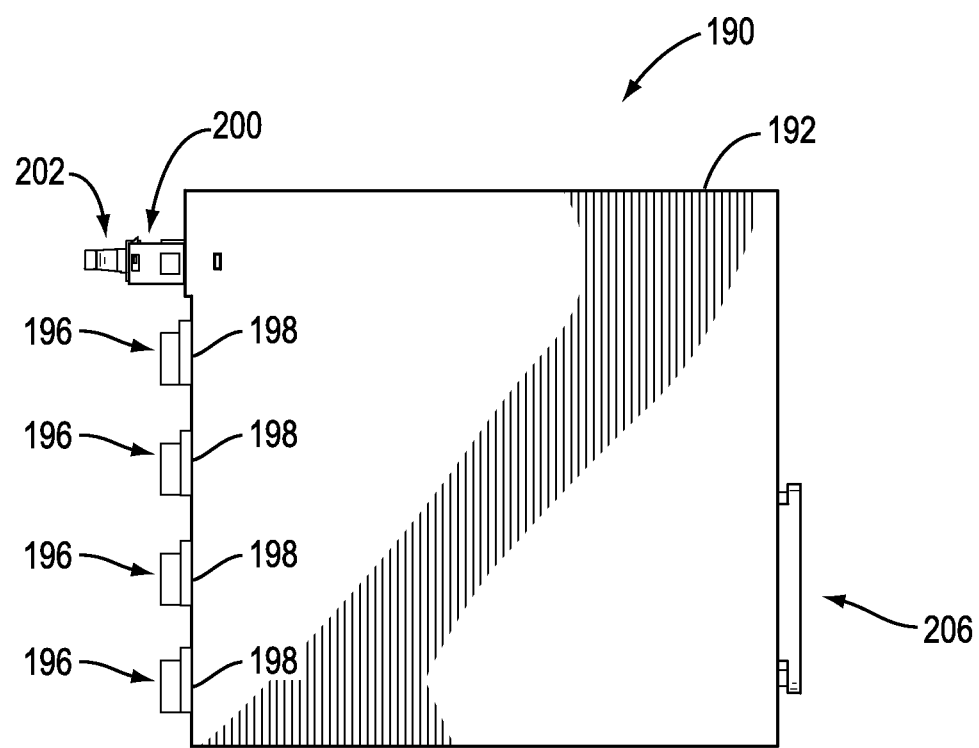
Figure 15A:
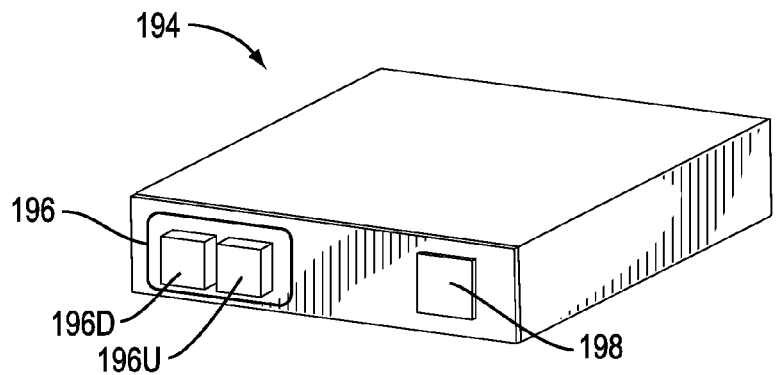
FIGS. 15A-15D illustrate front perspective, top, front, and side views of the distribution modules contained in the ICU housing of FIGS. 14A-14E.
Figure 15B:
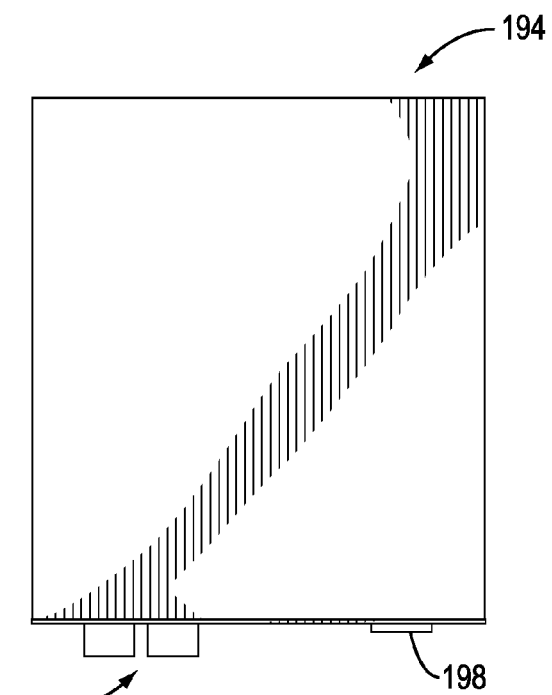
Figure 15C:
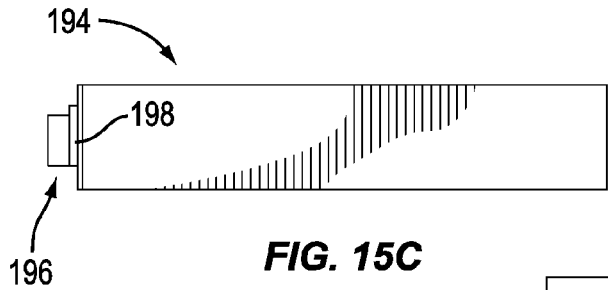
Figure 15D:
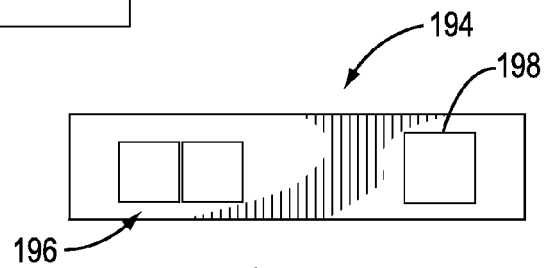
Figure 16A:
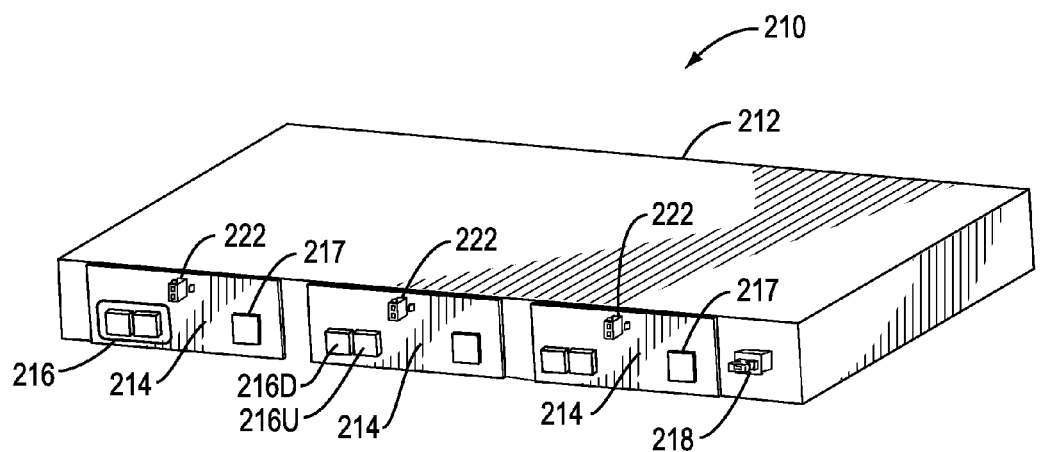
Figure 16B:
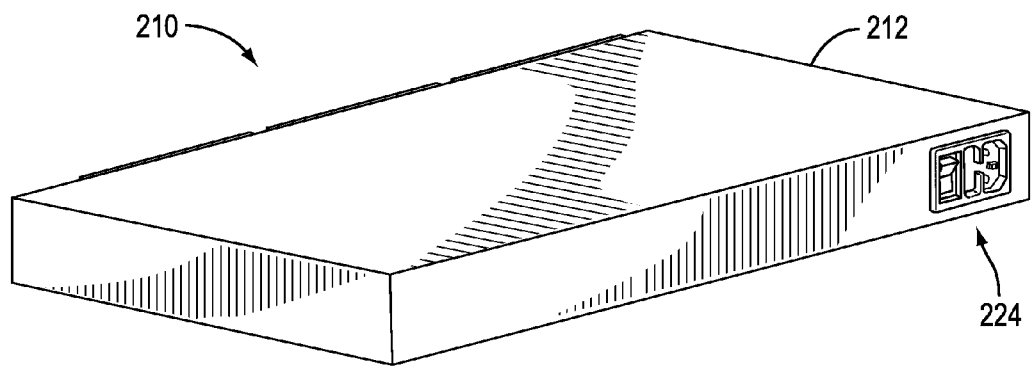
Figure 16E:
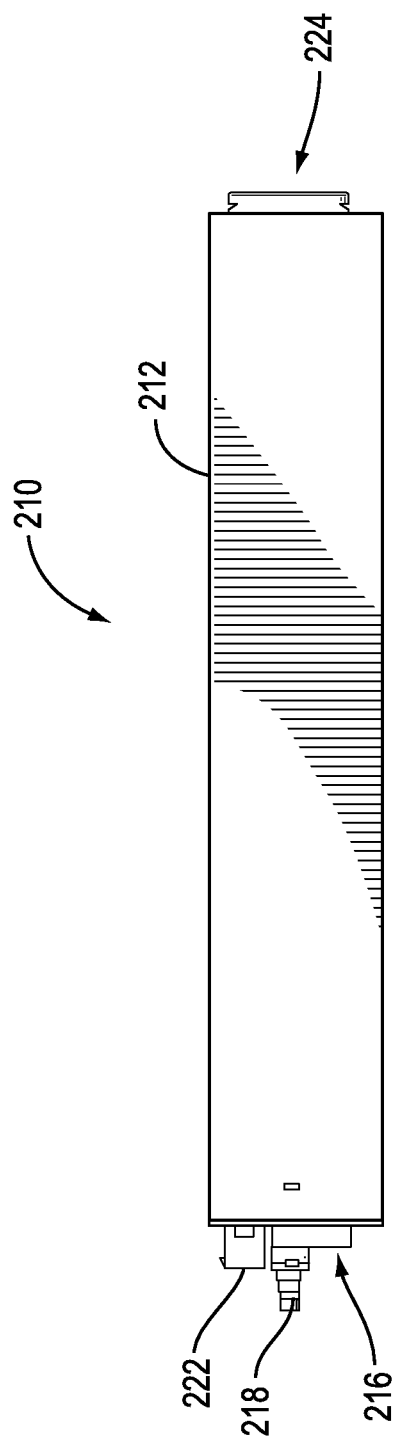
Figure 17A:
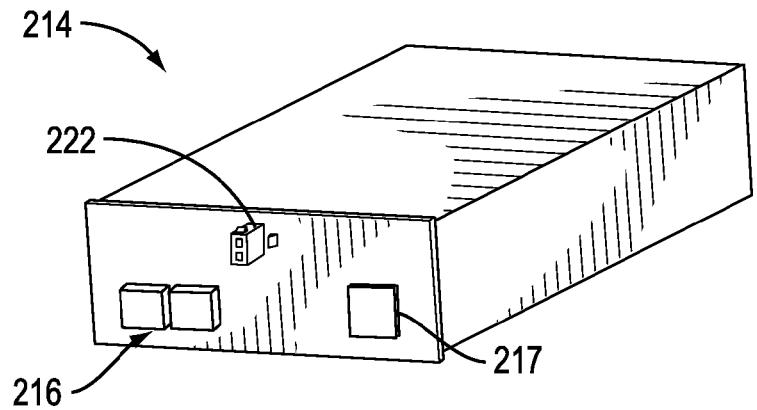
FIGS. 17A-17E illustrate front perspective, front, side, rear, and top views, respectively, of the distribution modules contained in the ICU housing of FIGS. 16A-16E.
Figure 17B:
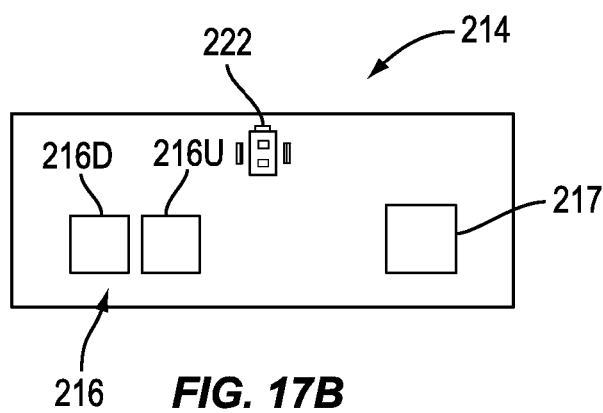
Figure 17C:
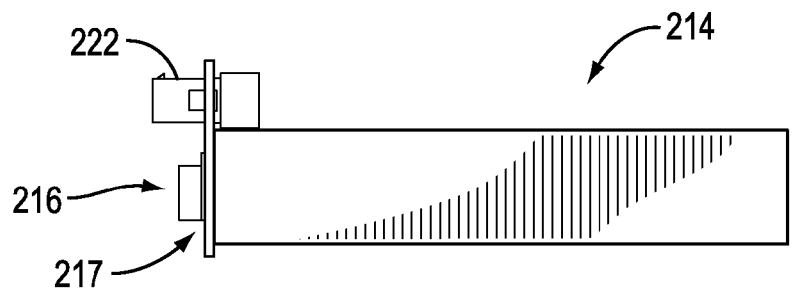
Figure 17D:
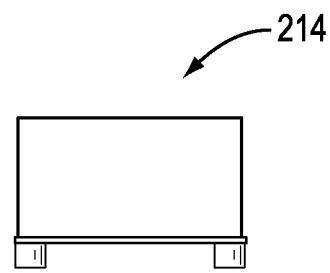
Figure 17E:
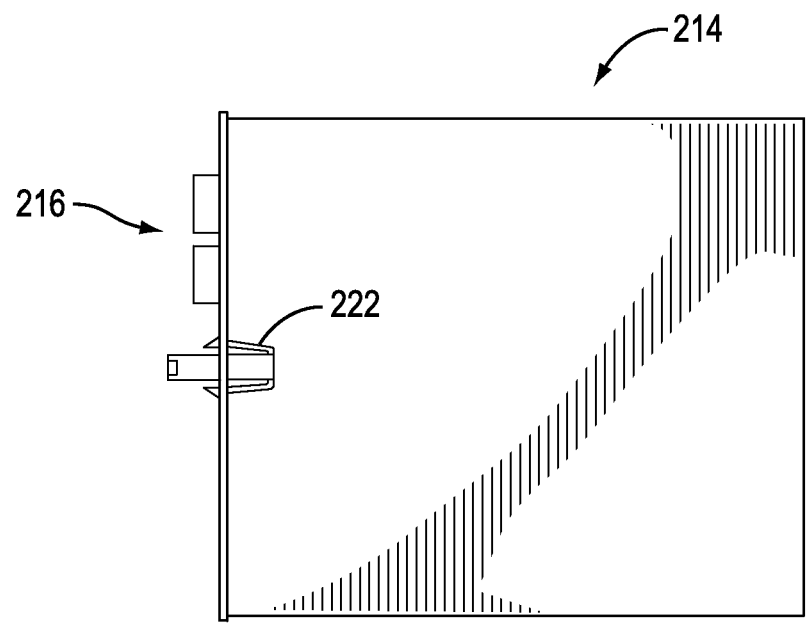

Other configurations are possible to provide digital data services in an optical fiber-based distributed communications system. For example, FIG. 9 is a schematic diagram of another exemplary embodiment of providing digital data services in an optical fiber-based distributed communications system configured to provide RF communication services. In this regard, FIG. 9 provides an optical fiber-based distributed communications system 150. The optical fiber-based distributed communications system 150 may be similar and include common components provided in the optical fiber-based distributed communications system 90 in FIG. 4. In this embodiment, instead of the HMC 94 being provided separated from the HEU 12, the HMC 94 is co-located with the HEU 12. The downlink and uplink optical fibers 102D, 102U for providing digital data services from the digital data services switch 96 are also connected to the patch panel 92. The downlink and uplink optical fibers 16D, 16U for RF communications and the downlink and uplink optical fibers 102D, 102U for digital data services are then routed to the ICU 85, similar to FIG. 2.

The downlink and uplink optical fibers 16D, 16U for RF communications, and the downlink and uplink optical fibers 102D, 102U for digital data services, may be provided in a common fiber optic cable or provided in separate fiber optic cables. Further, as illustrated in FIG. 9, stand alone media converters (MC) 141 may be provided separately from the RAUs 14 in lieu of being integrated with RAUs 14, as illustrated in FIG. 4. The stand alone MCs 141 can be configured to contain the digital data services module 103, including the media converter 134 in FIG. 8, if desired. The AU 118 may also each include antennas 152 to provide wireless digital data services in lieu of or in addition to wired services through port 128.

Digital data services are described above as being provided in the optical fiber-based distributed communications systems through external media converters. The media converters can be connected at the ICU as an example if desired. If connected at the ICU, the ICU must support receipt of downlink digital data signals via cabling to provide such downlink digital data signals to RAUs. Further, the ICU must support receipt of uplink digital data signals via cabling to provide uplink digital data signals to digital data service switches.

In this regard, embodiments disclosed herein provide power distribution in optical fiber-based distributed communications systems configured to provide digital data services and radio frequency (RF) communications services. Related components and methods are also disclosed. In this regard, embodiments disclosed herein include units that can be provided in optical fiber-based distributed communications systems that are configured to support RF communication services and digital data services. The units may also be configured to support providing distribution of power. The units may be interconnect units (ICUs). Further, embodiments disclosed herein also include optical fiber-based distributed communications systems that provide and support both RF communication services and digital data services. The RF communication services and digital data services can be distributed over optical fiber to client devices, such as remote antenna units for example. Digital data services can be distributed over optical fiber separate from optical fiber distributing RF communication services. Alternatively, digital data services can be distributed over a common optical fiber with RF communication services.

In this regard, FIGS. 10A-10E illustrate front perspective, rear perspective, front, rear, and side views, respectively, of an exemplary ICU 151 that may be provided to support both RF communication services and digital data services and power distribution. As illustrated in FIGS. 10A-10E, the ICU 151 comprises an ICU housing 152. The ICU housing 152 allows up to four (4) distribution modules 154 to be provided in the ICU housing 152. FIGS. 11A-11E illustrate front perspective, rear perspective, front, top, and side views, respectively, of the distribution modules 154 contained in the ICU housing 152 of FIGS. 10A-10E. As discussed in more detail below, the distribution modules 154 provide media conversion for digital data services provided to RAUs 14.

In this regard, the ICU housing 152 is configured to allow the distribution modules 154 to be installed and removed in a modular fashion to provide flexibility in configuring the ICU 151. Only the needed number of distribution modules 154 need be installed to support the number of RAUs 14 supported by the ICU 151. Each distribution module 154 in this embodiment is configured to support one fiber optic cable 104 (see FIGS. 4, 8, and 9). The fiber optic cable 104 may be provided as an array cable to bundle optical fibers with electrical power lines 58 and digital data lines. Thus, the fiber optic cable 104 will be described hereinafter as an array cable 104. The digital data lines may be optical fibers 102D, 102U as illustrated in FIG. 8, or may be electrical signal lines.

In this example, each distribution module 154 includes six (6) fiber optic connectors 156, three (3) digital data services outputs of which are downlink fiber optic connectors 156D and three (3) of which are uplink fiber optic connectors 156U. In this embodiment, the fiber optic connectors 156 provide digital data services outputs to support digital data services for up to six (6) RAUs 14 (two (2) fiber optic connectors 156D, 156U support up to two (2) RAUs 14). The optical fibers 102D, 102U are connected to the fiber optic connectors 156D, 156U, respectively, to distribute digital data services to the RAUs 14 via the array cable 104. For example, the fiber optic connectors 156D, 156U may be any type of fiber optic connector, including but not limited to SC, MTP, LC, FC, ST, etc. To interface a digital data services network to the ICU 151 and the fiber optic connectors 156D, 156U, the distribution module 154 also contains three (3) digital data services inputs in the form of digital data services input connectors 158 that receive downlink and provide uplink electrical digital signals. For example, the digital data services input connectors 158 may be RJ-45 connectors. The downlink electrical digital signals are converted into downlink optical digital signals using E/O converters provided in the distribution module 154 to be communicated over the optical fibers 102D, 102U to the RAUs 14. The distribution modules 154 also contain O/E converters to convert uplink optical digital signals from the RAU 14 over the uplink optical fibers 102U to fiber optic connectors 156U to uplink electrical digital signals to be communicated through the digital data services input connectors 158.

Further, the ICU 151 includes an RF communications services input and output in the form of an RF communication services connector 160 that is configured to provide RF communication signals over optical fibers 16D, 16U (see FIGS. 4, 8 and 9) to and from the HEU 12 and the RAUs 14, as previously described. In this embodiment, the RF communication services connector 160 is an MTP connector that supports twelve (12) optical fibers in this embodiment, two optical fibers per supported RAU 14. The distribution module 154 also contains power taps 162 that are configured to connect to the electrical power lines 58 (see FIG. 8) to provide power to the RAUs 14. Power provided on the power outputs or power taps 162 is provided from a power source connected to an input power connector 164. The input power connector 164 is configured to be coupled to an electrical connector 166 provided in the rear of the ICU housing 152. The electrical connector 166 may be configured to plug into a backplane provided in the ICU housing 152 when the distribution module 154 is installed in the ICU housing 152. Each distribution module 154 contains its own power supply and/or transformer to provide any power conversions and voltage changes to provide power desired or needed for the RAUs 14 on the power taps 162. The power supply in each distribution module 154 may be configured to provide up any power level desired (e.g., 25 Watts (W)-1200 W).

FIGS. 12A-12E illustrate front perspective, rear perspective, front, rear, and side views, respectively, of another exemplary ICU 170 that can be provided in an optical fiber-based distributed communications system to support distribution of RF communication services, digital data services, and power distribution. As illustrated in FIGS. 12A-12E, the ICU 170 comprises an ICU housing 172. The ICU housing 172 allows up to twelve (12) distribution modules 174 to be provided in the ICU housing 172. FIGS. 13A-13D illustrate front perspective, front, side, and top views, respectively, of the distribution modules 174 that can be inserted in the ICU housing 172 of FIGS. 12A-12E in a vertical arrangement. As discussed in more detail below, the distribution modules 174 provide media conversion for digital data services provided to RAUs 14.

In this regard, the ICU housing 172 is configured to allow the distribution modules 174 to be installed and removed in a modular fashion to provide flexibility in configuring the ICU 170. Only the needed number of distribution modules 174 need be installed to support the number of RAUs 14 supported by the ICU 170. Three (3) distribution modules 174 in this embodiment are configured to support one (1) array cable 104 (see FIGS. 4, 8, and 9). Thus, in this embodiment, the data services and power provided by each distribution module 174 is one-third of that provided by the distribution modules 154 in FIGS. 11A-11E; however, this embodiment of the ICU 170 provides greater modularity.

In this example, each distribution module 174 includes two (2) fiber optic digital data services outputs in the form of two (2) digital data services output connectors 176, one (1) of which is a downlink fiber optic connector 176D and one (1) of which is an uplink fiber optic connector 176U. In this embodiment, the fiber optic connectors 176 support digital data services for up to two (2) RAUs 14 (two (2) fiber optic connectors 176D, 176U support up to two (2) RAUs 14). The optical fibers 102D, 102U are connected to the fiber optic connectors 176D, 176U, respectively, to distribute digital data services to the RAUs 14 via the array cable 104. For example, the fiber optic connectors 176D, 176U may be any type of fiber optic connector, including but not limited to SC, MTP, LC, FC, ST, etc. To interface a digital data services network to the ICU 170 and the fiber optic connectors 176D, 176U, the distribution module 174 also contains one (1) digital data services input connector 178 that receives downlink and provides uplink electrical digital signals. For example, the digital data services input connectors 178 may be RJ-45 connectors. The downlink electrical digital signals are converted into downlink optical digital signals using E/O converters provided in the distribution module 174 to be communicated over the optical fibers 102D, 102U to the RAUs 14. The distribution modules 174 also contain O/E converters to convert uplink optical digital signals from the RAU 14 over the uplink optical fibers 102U to fiber optic connectors 176U to uplink electrical digital signals to be communicated through the digital data services input connectors 178.

Further, the ICU 170 includes an RF communication services input and output connector 180 that is configured to provide RF communication signals over optical fibers 16D, 16U (see FIGS. 4, 8 and 9) to and from the HEU 12 and the RAUs 14, as previously described. In this embodiment, the RF communication services connector 180 is an MTP connector that supports twelve (12) optical fibers in this embodiment, two (2) optical fibers per supported RAU 14. The distribution module 174 also contains a power output or power tap 182 that is configured to connect to the electrical power lines 58 (see FIG. 8) to provide power to the RAUs 14. Power provided on the power taps 182 is provided from a power source connected to the rear of the distribution modules 174 via a power pigtail 184. Each distribution module 174 contains its own power supply and/or transformer to provide any power conversions and voltage changes to provide power desired or needed for the RAUs 14 on the power taps 162.

FIGS. 14A-14E illustrate front perspective, rear perspective, front, rear, and side views, respectively, of another exemplary ICU 190 that can be provided in an optical fiber-based distributed communications system to support distribution of RF communication services, digital data services, and power distribution. As illustrated in FIGS. 14A-14E, the ICU 190 comprises an ICU housing 192. The ICU housing 192 allows up to twelve (12) distribution modules 194 to be provided in the ICU housing 192 in a horizontal arrangement, as opposed to the vertical arrangement in FIGS. 12A-12E. FIGS. 15A-15D illustrate front perspective, top, side, and front views, respectively, of the distribution modules 194 that can be inserted in the ICU housing 192 of FIGS. 14A-14E. As discussed in more detail below, the distribution modules 194 provide media conversion for digital data services provided to RAUs 14.

In this regard, the ICU housing 192 is configured to allow the distribution modules 194 to be installed and removed in a modular fashion to provide flexibility in configuring the ICU 190. Only the needed number of distribution modules 194 need be installed to support the number of RAUs 14 supported by the ICU 190. Three (3) distribution modules 194 in this embodiment are configured to support one (1) array cable 104 (see FIGS. 4, 8, and 9). Thus, in this embodiment, the data services and power provided by each distribution module 194 is one-third of that provided by the distribution modules 154 in FIGS. 11A-11E; however, this embodiment of the ICU 190 provides greater modularity.

In this example, each distribution module 194 includes two (2) fiber optic output connectors 196, one (1) of which is a downlink fiber optic connector 196D and one (1) of which is an uplink fiber optic connector 196U. In this embodiment, the fiber optic connectors 196 support digital data services for up to two (2) RAUs 14 (two (2) fiber optic connectors 196D, 196U support up to two (2) RAUs 14). The optical fibers 102D, 102U are connected to the fiber optic connectors 196D, 196U, respectively, to distribute digital data services to the RAUs 14 via the array cable 104. For example, the fiber optic connectors 196D, 196U may be any type of fiber optic connector, including but not limited to SC, MTP, LC, FC, ST, etc. To interface a digital data services network to the ICU 190 and the fiber optic connectors 196D, 196U, the distribution module 194 also contains one (1) digital data services input connector 198 that receives downlink and provides uplink electrical digital signals. For example, the digital data services input connectors 198 may be RJ-45 connectors. The downlink electrical digital signals are converted into downlink optical digital signals using E/O converters provided in the distribution module 194 to be communicated over the optical fibers 102D, 102U to the RAUs 14. The distribution modules 194 also contain O/E converters to convert uplink optical digital signals from the RAU 14 over the uplink optical fibers 102U to fiber optic connectors 196U to uplink electrical digital signals to be communicated through digital data services input connectors 198.

Further, the ICU 190 includes an RF communication services input and output connector 200 that is configured to provide RF communication signals over optical fibers 16D, 16U (see FIGS. 4, 8 and 9) to and from the HEU 12 and the RAUs 14, as previously described. In this embodiment, the RF communication services connector 200 is an MTP connector that supports twelve (12) optical fibers in this embodiment, two (2) optical fibers per supported RAU 14. The ICU 190 in this embodiment (as opposed to the distribution modules 194) also contains a power output or power tap 202 that is configured to be connected to the electrical power lines 58 (see FIG. 8) to provide power to the RAUs 14. Power provided on the power taps 202 is provided from a power supply 204 provided in the ICU housing 192, as opposed to the distribution modules 194. The power supply 204 sources power from a power connector 206 connected to the rear of the ICU housing 192.

Thus, by providing the power supply 204 in the ICU housing 192, the power supply 204 can be shared by all distribution modules 194 to save costs. Providing the power supply 204 in the ICU housing 192 allows the power taps 202 to be provided as part of the ICU 190 instead of the distribution modules 194. The distribution modules 194 contain an electrical connector to connect to the power supply 204 to receive power for media conversion. However, the power supply 204 must be rated to supply power to the maximum number of distribution modules 194 installed in the ICU housing 192, which may increase costs if less distribution modules 194 are installed in the ICU housing 192.

FIGS. 16A-16E illustrate front perspective, rear perspective, front, rear, and side views, respectively, of another exemplary ICU 210 that can be provided in an optical fiber-based distributed communications system to support distribution of RF communication services, digital data services, and power distribution. As illustrated in FIGS. 16A-16E, the ICU 210 comprises an ICU housing 212. The ICU housing 212 allows up to three (3) distribution modules 214 to be provided in the ICU housing 212. In this manner, the ICU housing 212 can be provided of less height than, for example, the ICU housing 170 in FIGS. 12A-12E. FIGS. 17A-17E illustrate front perspective, front, side, rear, and top views, respectively, of the distribution module 214 that can be inserted in the ICU housing 212 of FIGS. 16A-16E in a horizontal arrangement. As discussed in more detail below, the distribution modules 214 provide media conversion for digital data services provided to RAUs 14.

In this regard, the ICU housing 212 is configured to allow the distribution modules 214 to be installed and removed in a modular fashion to provide flexibility in configuring the ICU 210. Only the needed number of distribution modules 214 need be installed to support the number of RAUs 14 supported by the ICU 210. Three (3) distribution modules 214 in this embodiment are configured to support one (1) array cable 104 (see FIGS. 4, 8, and 9), thus the ICU 210 in this embodiment is configured to support one (1) array cable 104. Thus, in this embodiment, the data services and power provided by each distribution module 214 is one-third of that provided by the distribution modules 154 in FIGS. 11A-11E; however, this embodiment of the ICU 210 provides greater modularity.

In this example, each distribution module 214 includes two (2) output fiber optic connectors 216, one (1) of which is a downlink fiber optic connector 216D and one (1) of which is an uplink fiber optic connector 216U. In this embodiment, the fiber optic connectors 216 support digital data services for up to two (2) RAUs 14 (two (2) fiber optic connectors 216D, 216U support up to two (2) RAUs 14). The optical fibers 102D, 102U are connected to the fiber optic connectors 216D, 216U, respectively, to distribute digital data services to the RAUs 14 via the array cable 104. For example, the fiber optic connectors 216D, 216U may be any type of fiber optic connector, including but not limited to SC, MTP, LC, FC, ST, etc. To interface a digital data services network to the ICU 210 and the fiber optic connectors 216D, 216U, the ICU 210 also contains one (1) digital data services input connector 217 that receives downlink and provides uplink electrical digital signals. For example, the digital data services input connector 217 may be a RJ-45 connector. The downlink electrical digital signals are converted into downlink optical digital signals using E/O converters provided in the distribution module 214 to be communicated over the optical fibers 102D, 102U to the RAUs 14. The distribution modules 214 also contain O/E converters to convert uplink optical digital signals from the RAU 14 over the uplink optical fibers 102U to fiber optic connectors 216U to uplink electrical digital signals to be communicated through digital data services input connectors 217.

Further, the ICU 210 includes an RF communication services input and output connector 218 that is configured to provide RF communication signals over optical fibers 16D, 16U (see FIGS. 4, 8 and 9) to and from the HEU 12 and the RAUs 14, as previously described. In this embodiment, the RF communication services connector 218 is an MTP connector that supports twelve (12) optical fibers in this embodiment, two (2) optical fibers per supported RAU 14. Each distribution module 214 also contains a power output or power tap 222 that is configured to connect to the electrical power lines 58 (see FIG. 8) to provide power to the RAUs 14. Power provided on the power taps 222 is provided from a power source connected to an input power connector 224 on the rear of the ICU housing 212. Each distribution module 214 contains its own power supply and/or transformer to provide any power conversions and voltage changes to provide power desired or needed for the RAUs 14 on the power taps 222.

Figure 18A:
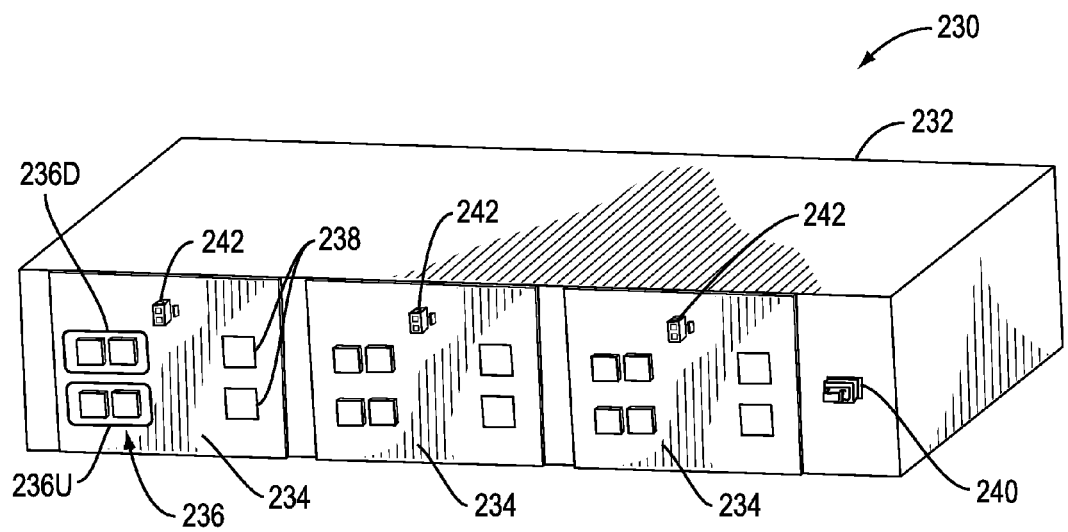
FIGS. 18A and 18B illustrate front perspective and rear perspective views of another exemplary ICU comprised of an ICU housing containing distribution modules supporting the distribution of RF communication services, digital data services, and power to RAUs in an optical fiber-based distributed communications system.
Figure 18B:
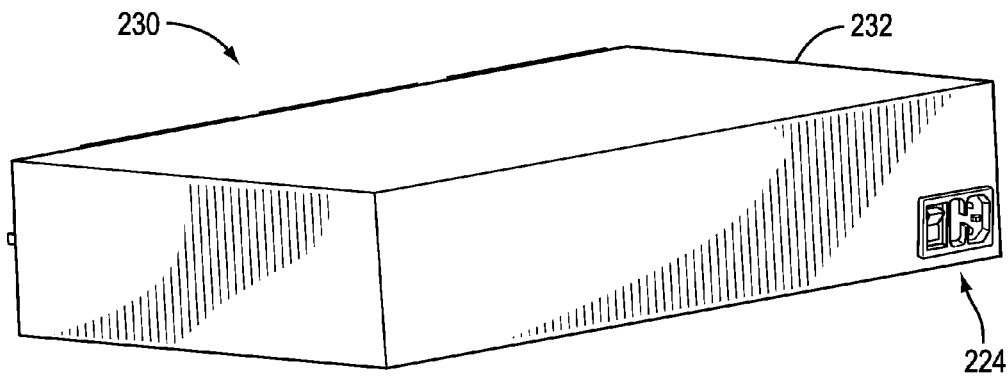
Figure 19A:
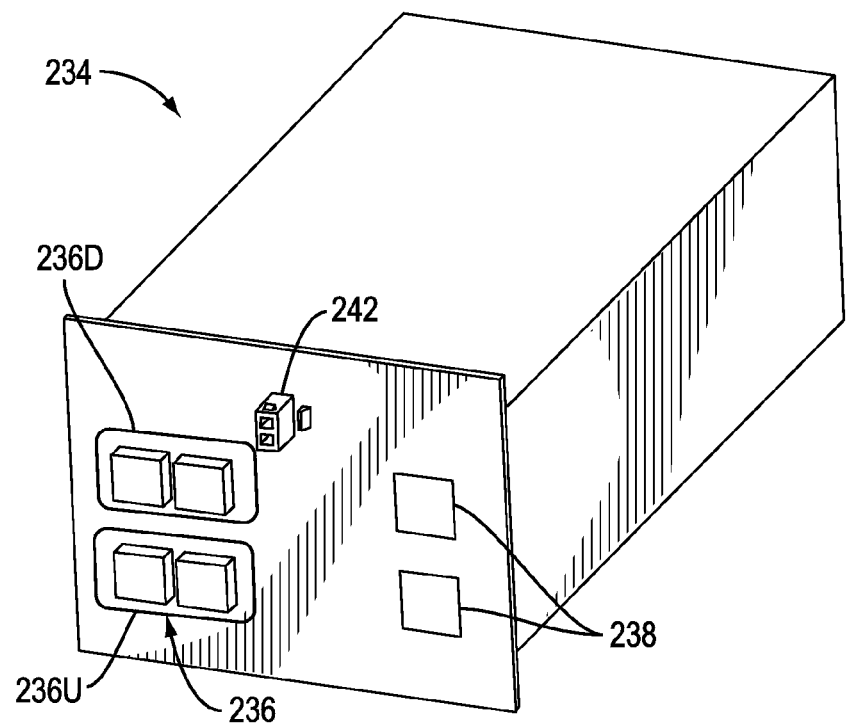
FIGS. 19A and 19B illustrate front perspective and side perspective views of the distribution modules contained in the ICU housing of FIGS. 18A and 18B.
Figure 19B:
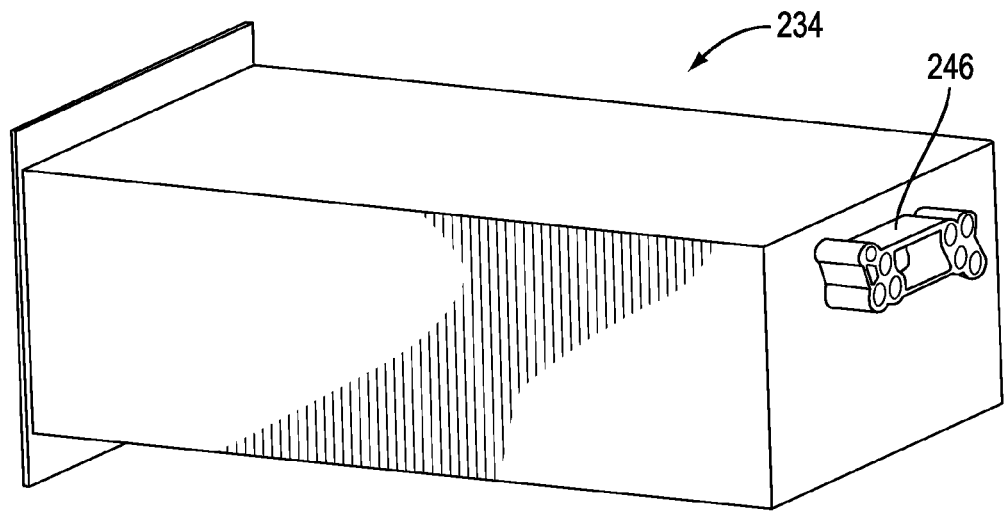

FIGS. 18A and 18B illustrate front perspective and rear perspective views of another exemplary ICU comprised of an ICU housing containing distribution modules supporting the distribution of RF communication services, digital data services, and power to RAUs in an optical fiber-based distributed communications system. As illustrated in FIGS. 18A and 18B, an ICU 230 comprises an ICU housing 232. The ICU housing 232 allows up to three (3) distribution modules 234 to be provided in the ICU housing 232. FIGS. 19A and 19B illustrate front perspective and rear perspective views, respectively, of the distribution module 234 that can be inserted in the ICU housing 232 of FIGS. 18A and 18B. As discussed in more detail below, the distribution modules 234 provide media conversion for digital data services provided to RAUs 14.

In this regard, the ICU housing 232 is configured to allow the distribution modules 234 to be installed and removed in a modular fashion to provide flexibility in configuring the ICU 230. Only the needed number of distribution modules 234 need be installed to support the number of RAUs 14 supported by the ICU 230. Three (3) distribution modules 314 in this embodiment are configured to support one (1) array cable 104 (see FIGS. 4, 8, and 9), thus the ICU 230 in this embodiment is configured to support one (1) array cable 104.

In this example, each distribution module 234 includes four (4) output fiber optic connectors 236, two (2) of which are downlink fiber optic connectors 236D and two (2) of which are uplink fiber optic connectors 236U. In this embodiment, the fiber optic connectors 236 support digital data services for up to four (4) RAUs 14 (four (4) fiber optic connectors 236D, 236U support up to four (4) RAUs 14). The optical fibers 102D, 102U are connected to the fiber optic connectors 236D, 236U, respectively, to distribute digital data services to the RAUs 14 via the array cable 104. For example, the fiber optic connectors 236D, 236U may be any type of fiber optic connector, including but not limited to SC, MTP, LC, FC, ST, etc. To interface a digital data services network to the ICU 230 and the fiber optic connectors 236D, 236U, the ICU 230 also contains two (2) digital data services input connectors 238 that receive downlink and provide uplink electrical digital signals. For example, the digital data services input connectors 238 may be RJ-45 connectors. The downlink electrical digital signals are converted into downlink optical digital signals using E/O converters provided in the distribution module 234 to be communicated over the optical fibers 102D, 102U to the RAUs 14. The distribution modules 234 also contain O/E converters to convert uplink optical digital signals from the RAU 14 over the uplink optical fibers 102U to fiber optic connectors 236U to uplink electrical digital signals to be communicated through digital data services input connectors 238.

Further, the ICU 230 includes an RF communication services input and output connector 240 that is configured to provide RF communication signals over optical fibers 16D, 16U (see FIGS. 4, 8 and 9) to and from the HEU 12 and the RAUs 14, as previously described. In this embodiment, the RF communication services connector 240 is an MTP connector that supports twelve (12) optical fibers in this embodiment, two (2) optical fibers per supported RAU 14. Each distribution module 234 also contains a power output or power tap 242 that is configured to connect to the electrical power lines 58 (see FIG. 8) to provide power to the RAUs 14. Power provided on the power taps 242 is provided from a power source connected to an input power connector 244 on the rear of the ICU housing 232. The distribution modules 234 contain electrical connectors 246 to couple the input power connector 244 to a power supply, which supplies power to the power taps 242. The electrical connector 246 may be configured to plug into a backplane provided in the ICU housing 232 when the distribution module 234 is installed in the ICU housing 232. Each distribution module 234 contains its own power supply and/or transformer to provide any power conversions and voltage changes to provide power desired or needed for the RAUs 14 on the power taps 242.

Figure 20A:
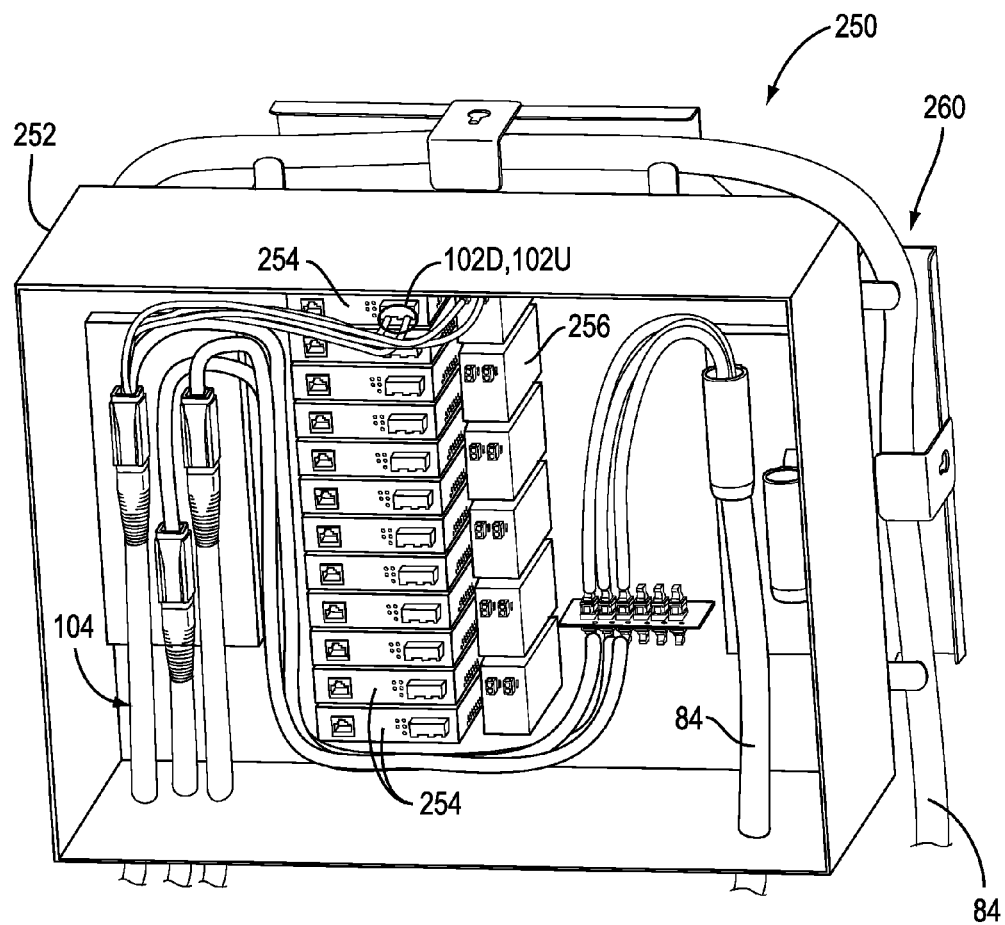
FIGS. 20A and 20B illustrate perspective views of an exemplary wall mount ICU comprised of an ICU housing containing distribution modules supporting the distribution of RF communication services, digital data services, and power to RAUs in an optical fiber-based distributed communications system.
Figure 20B:
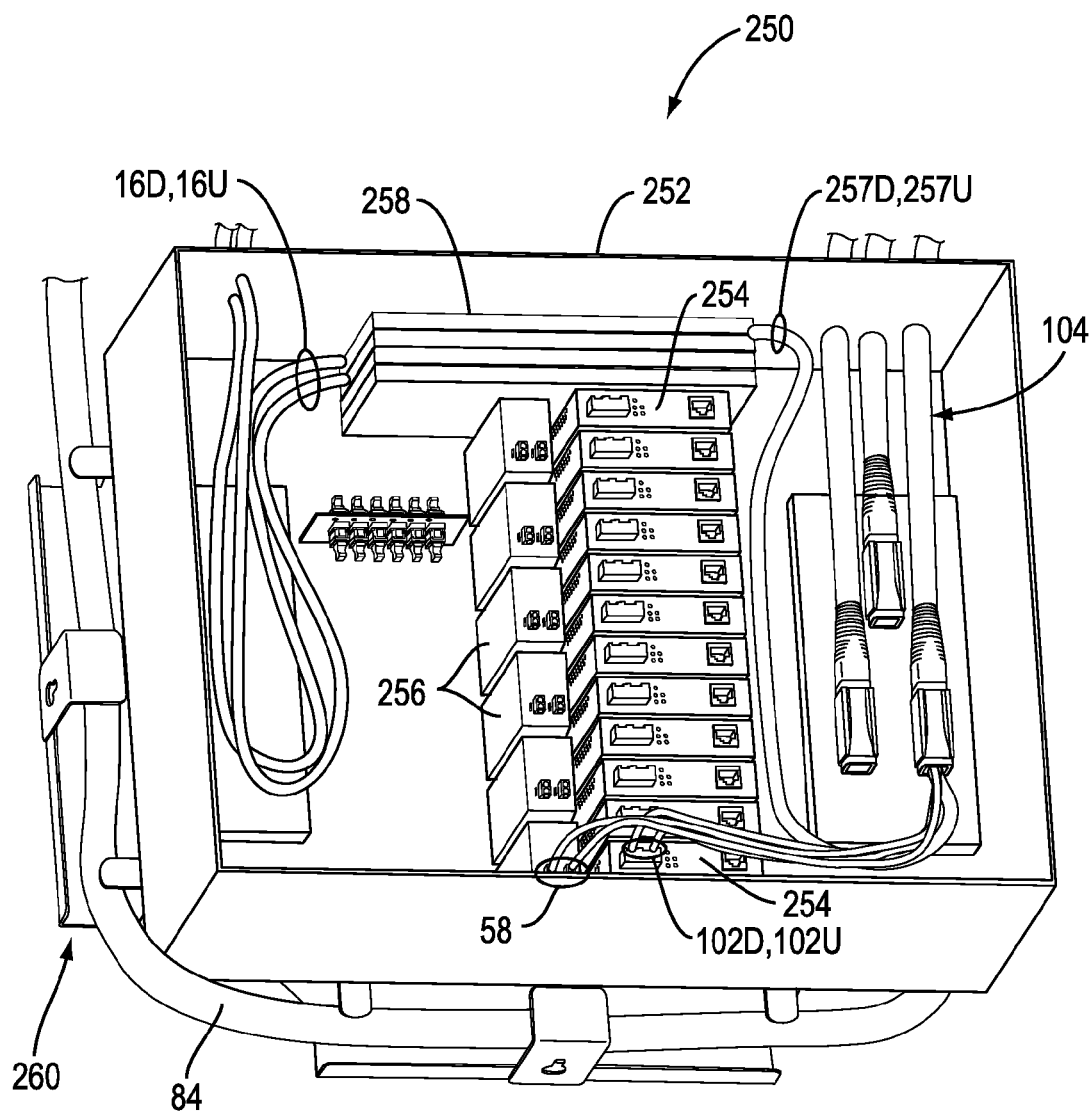

FIGS. 20A and 20B illustrate perspective views of an exemplary wall mount ICU 250 comprised of an ICU housing 252 containing distribution modules supporting the distribution of RF communication services, digital data services, and power to RAUs 14 in an optical fiber-based distributed communications system. Three (3) array cables 104 come into the ICU housing 252 and are furcated. Downlink and uplink optical fibers 102D, 102U are routed to a digital data services module 254 that provides media conversion via O/E and E/O converters. The electrical power line 58 is routed to a power supply 256 that provides power to the RAUs 14 connected to the array cable 104. Downlink and uplink optical fibers 257D, 257U are connected to a splice tray 258 which connects these optical fibers with downlink and uplink optical fibers 16D, 16U provided in a riser cable 84 (see FIG. 3) connected to the HEU 12. Slack storage 260 is provided in the ICU housing 252 to provide for slack storage of the riser cable 84.

Figure 21:
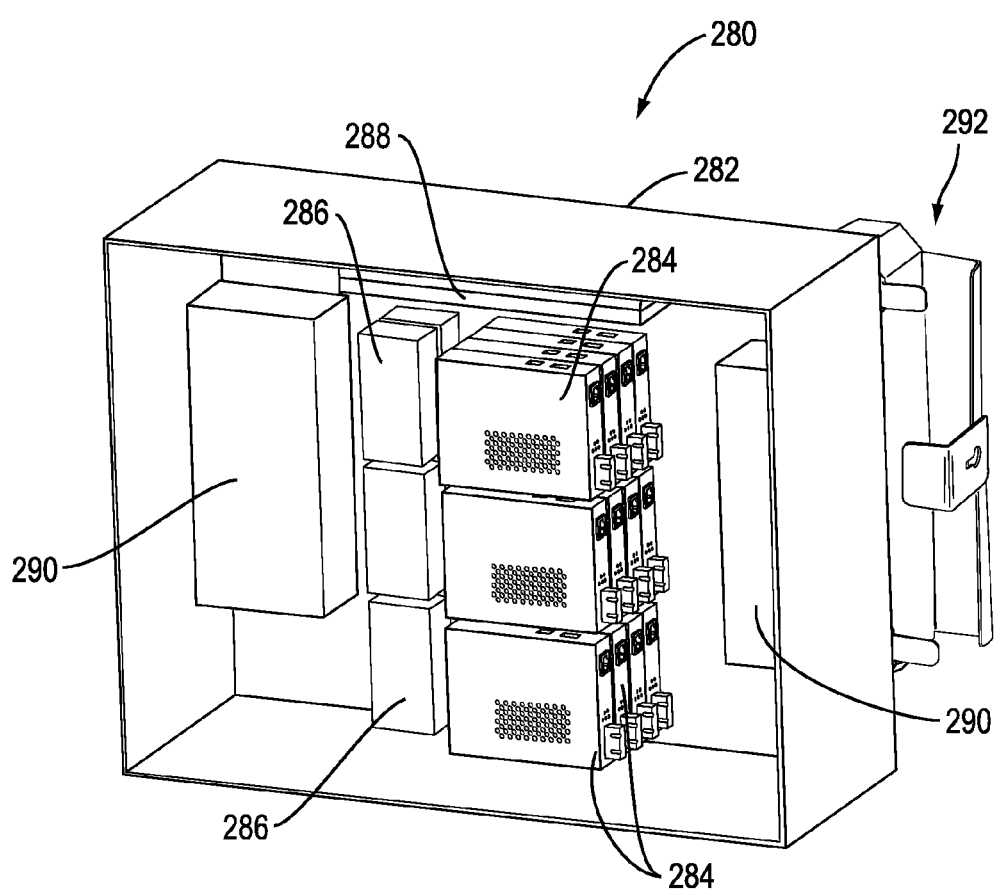
FIG. 21 illustrates a perspective view of another exemplary wall mount ICU comprised of an ICU housing containing distribution modules supporting the distribution of RF communication services, digital data services, and power to RAUs in an optical fiber-based distributed communications system.

FIG. 21 illustrates a perspective view of another exemplary wall mount ICU 280 comprised of an ICU housing 282 containing distribution modules supporting the distribution of RF communication services, digital data services, and power to RAUs 14 in an optical fiber-based distributed communications system. The components and their functions are similar to those in FIGS. 20A and 20B and thus will not be re-described. Digital data services modules 284 provide media conversion via O/E and E/O converters. Power supplies 286 to provide power via electrical power lines 58 over the array cable 104 are included. Splice trays 288 to splice RF communication optical fibers with optical fibers 16D, 16U are provided. Furcation mounts for holding furcations provided inside the ICU housing 282 are provided. Slack storage 292 for the riser cable 84 is also provided as illustrated in FIG. 21.

Figure 22:
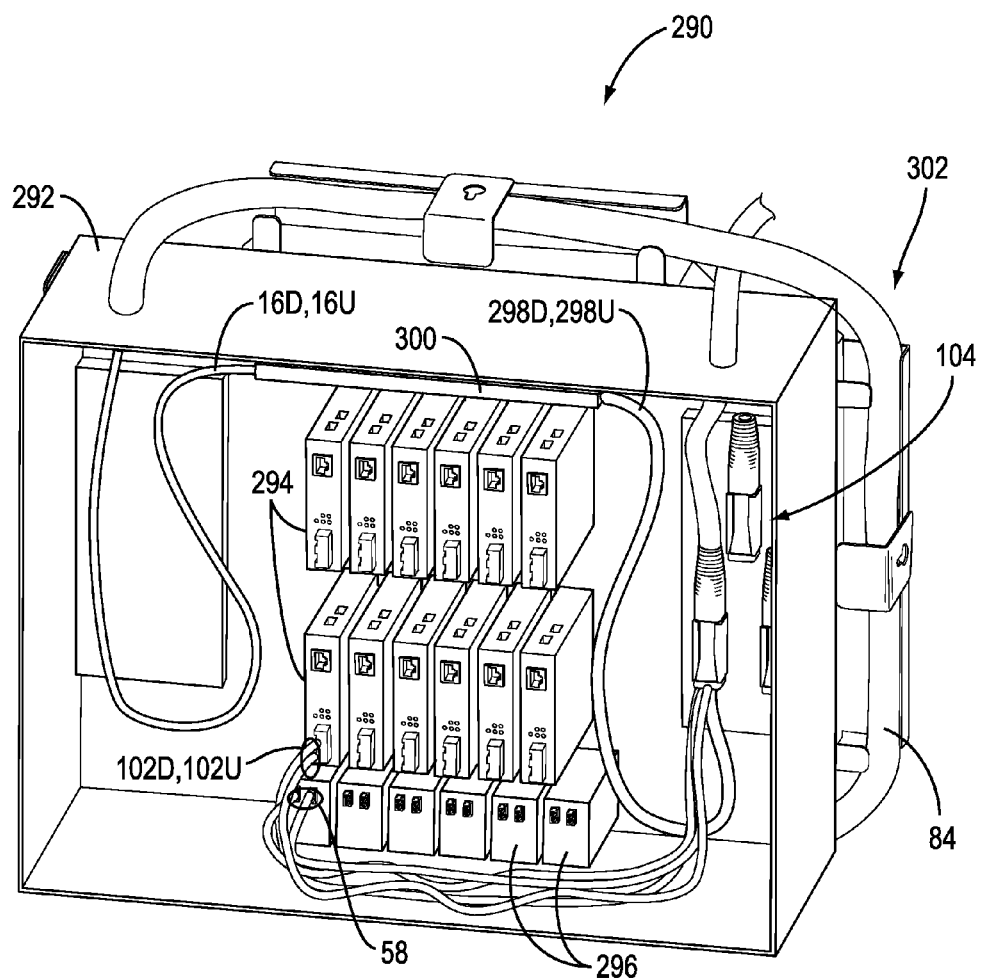
FIG. 22 illustrates a perspective view of another exemplary wall mount ICU comprised of an ICU housing containing distribution modules supporting the distribution of RF communication services, digital data services, and power to RAUs in an optical fiber-based distributed communications system.

FIG. 22 illustrates a perspective view of another exemplary wall mount ICU 290 comprised of an ICU housing 292 containing distribution modules supporting the distribution of RF communication services, digital data services, and power to RAUs 14 in an optical fiber-based distributed communications system. Three (3) array cables 104 come into the ICU housing 292 and are furcated. Downlink and uplink optical fibers 102D, 102U are routed to a digital data services module 294 that provides media conversion via O/E and E/O converters. The electrical power line 58 is routed to a power supply 296 that provides power to the RAUs 14 connected to the array cable 104. Downlink and uplink optical fibers 298D, 298U are connected to a splice tray 300 which connects these optical fibers with downlink and uplink optical fibers 16D, 16U provided in a riser cable 84 (see FIG. 3) connected to the HEU 12. Slack storage 302 is provided in the ICU housing 292 to provide for slack storage of the riser cable 84.

Figure 23:
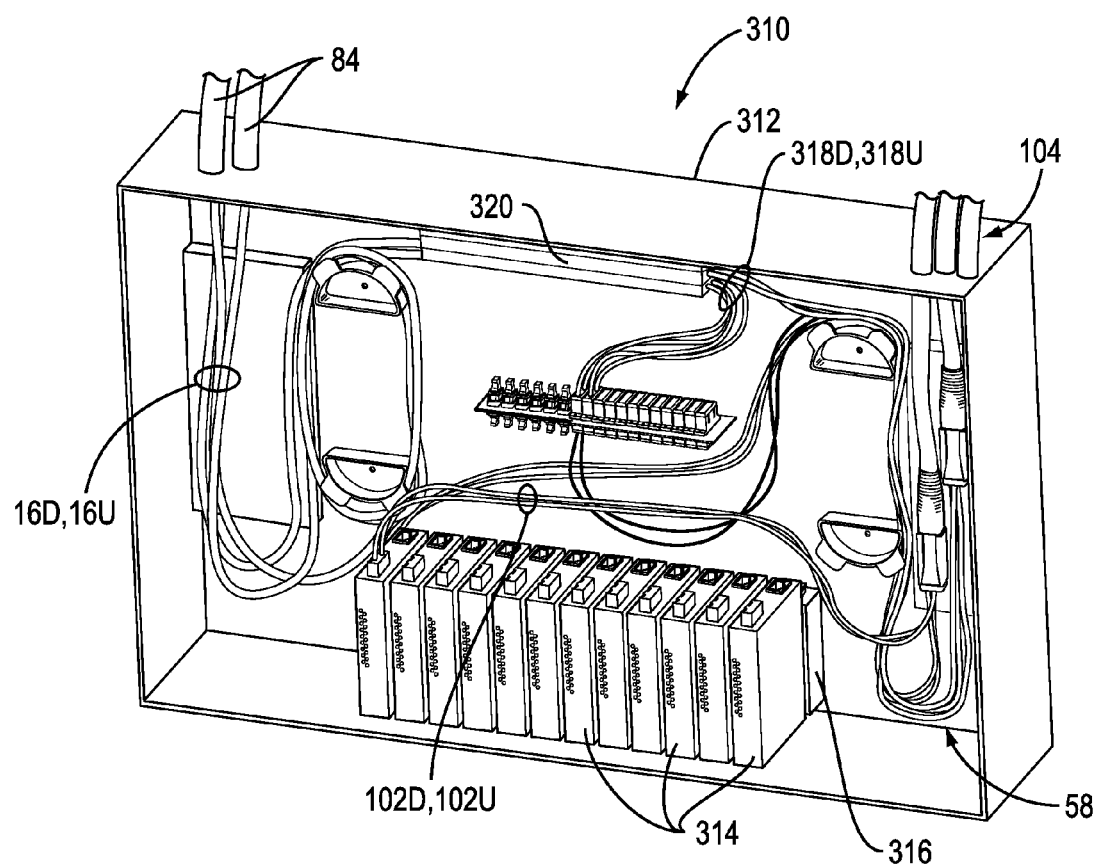
FIG. 23 illustrates a perspective view of another exemplary wall mount ICU comprised of an ICU housing containing distribution modules supporting the distribution of RF communication services, digital data services, and power to RAUs in an optical fiber-based distributed communications system.

FIG. 23 illustrates a perspective view of another exemplary wall mount ICU 310 comprised of an ICU housing 312 containing distribution modules supporting the distribution of RF communication services, digital data services, and power to RAUs 14 in an optical fiber-based distributed communications system. Three (3) array cables 104 come into the ICU housing 312 and are furcated. Downlink and uplink optical fibers 102D, 102U are routed to a digital data services module 314 that provides media conversion via O/E and E/O converters. The electrical power line 58 is routed to a power supply 316 that provides power to the RAUs 14 connected to the array cable 104. Downlink and uplink optical fibers 318D, 318U are connected to a splice tray 320 which connects these optical fibers with downlink and uplink optical fibers 16D, 16U provided in a riser cable 84 (see FIG. 3) connected to the HEU 12.

Figure 24:
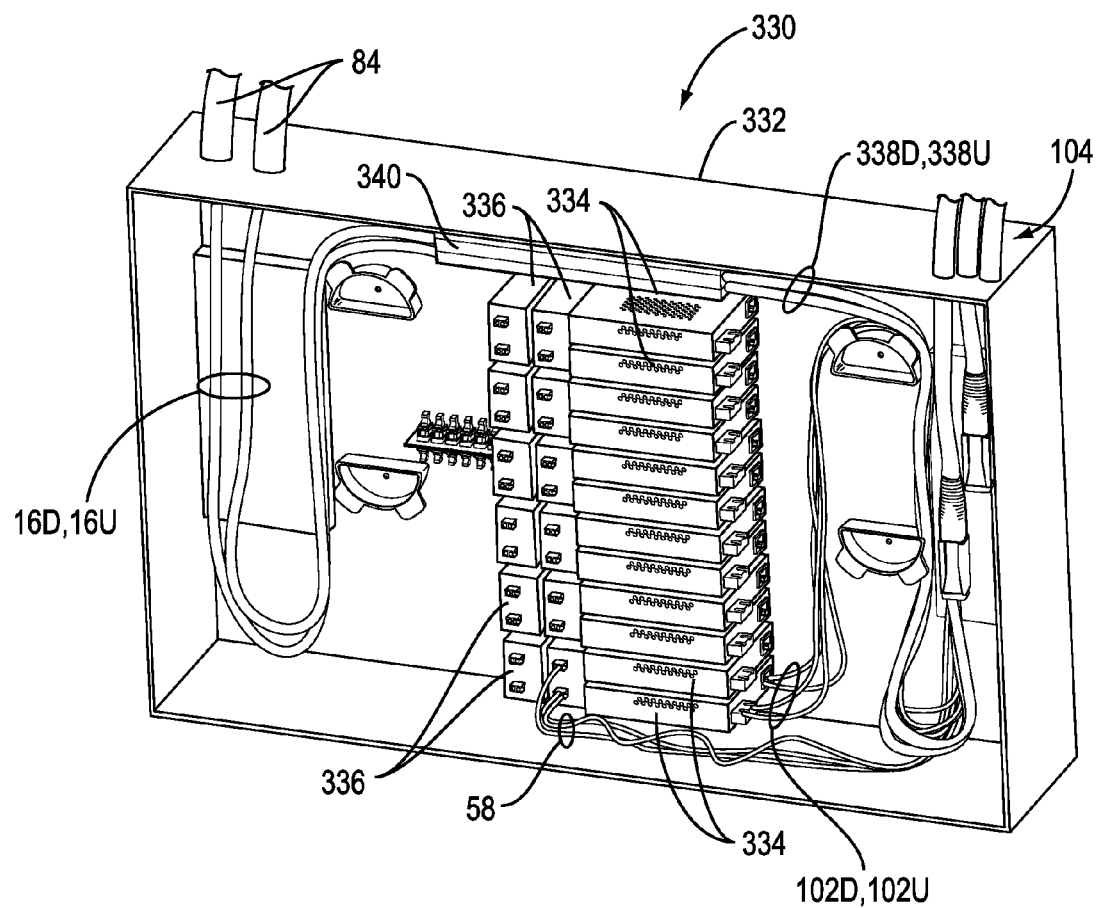
FIG. 24 illustrates a perspective view of another exemplary wall mount ICU comprised of an ICU housing containing distribution modules supporting the distribution of RF communication services, digital data services, and power to RAUs in an optical fiber-based distributed communications system.

FIG. 24 illustrates a perspective view of another exemplary wall mount ICU 330 comprised of an ICU housing 332 containing distribution modules supporting the distribution of RF communication services, digital data services, and power to RAUs 14 in an optical fiber-based distributed communications system. Three (3) array cables 104 come into the ICU housing 332 and are furcated. Downlink and uplink optical fibers 102D, 102U are routed to a digital data services module 334 that provides media conversion via O/E and E/O converters. The electrical power line 58 is routed to a power supply 316 that provides power to the RAUs 14 connected to the array cable 104. Downlink and uplink optical fibers 338D, 338U are connected to a splice tray 340 which connects these optical fibers with downlink and uplink optical fibers 16D, 16U provided in a riser cable 84 (see FIG. 3) connected to the HEU 12.

Further, as used herein, it is intended that terms "fiber optic cables" and/or "optical fibers" include all types of single mode and multi-mode light waveguides, including one or more optical fibers that may be upcoated, colored, buffered, ribbonized and/or have other organizing or protective structure in a cable such as one or more tubes, strength members, jackets or the like. The optical fibers disclosed herein can be single mode or multi-mode optical fibers. Likewise, other types of suitable optical fibers include bend-insensitive optical fibers, or any other expedient of a medium for transmitting light signals. An example of a bend-insensitive, or bend resistant, optical fiber is ClearCurve® Multimode fiber commercially available from Corning Incorporated. Suitable fibers of this type are disclosed, for example, in U.S. Patent Application Publication Nos. 2008/0166094 and 2009/0169163, the disclosures of which are incorporated herein by reference in their entireties.

Bend resistant multimode optical fibers may comprise a graded-index core region and a cladding region surrounding and directly adjacent to the core region, the cladding region comprising a depressed-index annular portion comprising a depressed relative refractive index relative to another portion of the cladding. The depressed-index annular portion of the cladding is preferably spaced apart from the core. Preferably, the refractive index profile of the core has a parabolic or substantially curved shape. The depressed-index annular portion may, for example, comprise a) glass comprising a plurality of voids, or b) glass doped with one or more downdopants such as fluorine, boron, individually or mixtures thereof. The depressed-index annular portion may have a refractive index delta less than about −0.2% and a width of at least about 1 micron, said depressed-index annular portion being spaced from said core by at least about 0.5 microns.

In some embodiments that comprise a cladding with voids, the voids in some preferred embodiments are non-periodically located within the depressed-index annular portion. By "non-periodically located" we mean that when one takes a cross section (such as a cross section perpendicular to the longitudinal axis) of the optical fiber, the non-periodically disposed voids are randomly or non-periodically distributed across a portion of the fiber (e.g. within the depressed-index annular region). Similar cross sections taken at different points along the length of the fiber will reveal different randomly distributed cross-sectional hole patterns, i.e., various cross sections will have different hole patterns, wherein the distributions of voids and sizes of voids do not exactly match for each such cross section. That is, the voids are non-periodic, i.e., they are not periodically disposed within the fiber structure. These voids are stretched (elongated) along the length (i.e. generally parallel to the longitudinal axis) of the optical fiber, but do not extend the entire length of the entire fiber for typical lengths of transmission fiber. It is believed that the voids extend along the length of the fiber a distance less than about 20 meters, more preferably less than about 10 meters, even more preferably less than about 5 meters, and in some embodiments less than 1 meter.

The multimode optical fiber disclosed herein exhibits very low bend induced attenuation, in particular very low macrobending induced attenuation. In some embodiments, high bandwidth is provided by low maximum relative refractive index in the core, and low bend losses are also provided. Consequently, the multimode optical fiber may comprise a graded index glass core; and an inner cladding surrounding and in contact with the core, and a second cladding comprising a depressed-index annular portion surrounding the inner cladding, said depressed-index annular portion having a refractive index delta less than about −0.2% and a width of at least 1 micron, wherein the width of said inner cladding is at least about 0.5 microns and the fiber further exhibits a 1 turn, 10 mm diameter mandrel wrap attenuation increase of less than or equal to about 0.4 dB/turn at 850 nm, a numerical aperture of greater than 0.14, more preferably greater than 0.17, even more preferably greater than 0.18, and most preferably greater than 0.185, and an overfilled bandwidth greater than 1.5 GHz-km at 850 nm.

50 micron diameter core multimode fibers can be made which provide (a) an overfilled (OFL) bandwidth of greater than 1.5 GHz-km, more preferably greater than 2.0 GHz-km, even more preferably greater than 3.0 GHz-km, and most preferably greater than 4.0 GHz-km at an 850 nm wavelength. These high bandwidths can be achieved while still maintaining a 1 turn, 10 mm diameter mandrel wrap attenuation increase at an 850 nm wavelength of less than 0.5 dB, more preferably less than 0.3 dB, even more preferably less than 0.2 dB, and most preferably less than 0.15 dB. These high bandwidths can also be achieved while also maintaining a 1 turn, 20 mm diameter mandrel wrap attenuation increase at an 850 nm wavelength of less than 0.2 dB, more preferably less than 0.1 dB, and most preferably less than 0.05 dB, and a 1 turn, 15 mm diameter mandrel wrap attenuation increase at an 850 nm wavelength, of less than 0.2 dB, preferably less than 0.1 dB, and more preferably less than 0.05 dB. Such fibers are further capable of providing a numerical aperture (NA) greater than 0.17, more preferably greater than 0.18, and most preferably greater than 0.185. Such fibers are further simultaneously capable of exhibiting an OFL bandwidth at 1300 nm which is greater than about 500 MHz-km, more preferably greater than about 600 MHz-km, even more preferably greater than about 700 MHz-km. Such fibers are further simultaneously capable of exhibiting minimum calculated effective modal bandwidth (Min EMBc) bandwidth of greater than about 1.5 MHz-km, more preferably greater than about 1.8 MHz-km and most preferably greater than about 2.0 MHz-km at 850 nm.

Preferably, the multimode optical fiber disclosed herein exhibits a spectral attenuation of less than 3 dB/km at 850 nm, preferably less than 2.5 dB/km at 850 nm, even more preferably less than 2.4 dB/km at 850 nm and still more preferably less than 2.3 dB/km at 850 nm. Preferably, the multimode optical fiber disclosed herein exhibits a spectral attenuation of less than 1.0 dB/km at 1300 nm, preferably less than 0.8 dB/km at 1300 nm, even more preferably less than 0.6 dB/km at 1300 nm.

In some embodiments, the numerical aperture ("NA") of the optical fiber is preferably less than 0.23 and greater than 0.17, more preferably greater than 0.18, and most preferably less than 0.215 and greater than 0.185.

In some embodiments, the core extends radially outwardly from the centerline to a radius R1, wherein 10≤R1≤40 microns, more preferably 20≤R1≤40 microns. In some embodiments, 22≤R1≤34 microns. In some preferred embodiments, the outer radius of the core is between about 22 to 28 microns. In some other preferred embodiments, the outer radius of the core is between about 28 to 34 microns.

In some embodiments, the core has a maximum relative refractive index, less than or equal to 1.2% and greater than 0.5%, more preferably greater than 0.8%. In other embodiments, the core has a maximum relative refractive index, less than or equal to 1.1% and greater than 0.9%.

In some embodiments, the optical fiber exhibits a 1 turn, 10 mm diameter mandrel attenuation increase of no more than 1.0 dB, preferably no more than 0.6 dB, more preferably no more than 0.4 dB, even more preferably no more than 0.2 dB, and still more preferably no more than 0.1 dB, at all wavelengths between 800 and 1400 nm.

Figure 25:
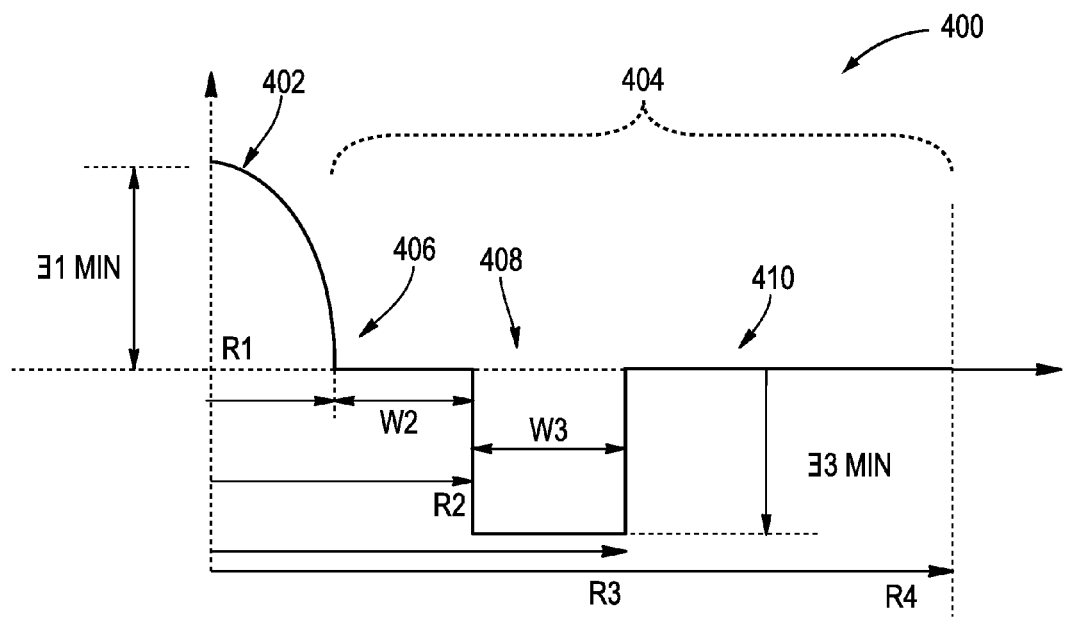
FIG. 25 shows a schematic representation (not to scale) of a refractive index profile of a cross-section of a glass portion of an exemplary embodiment of multimode optical fiber disclosed herein wherein a depressed-index annular portion is offset from a core and is surrounded by an outer annular portion.
Figure 26:
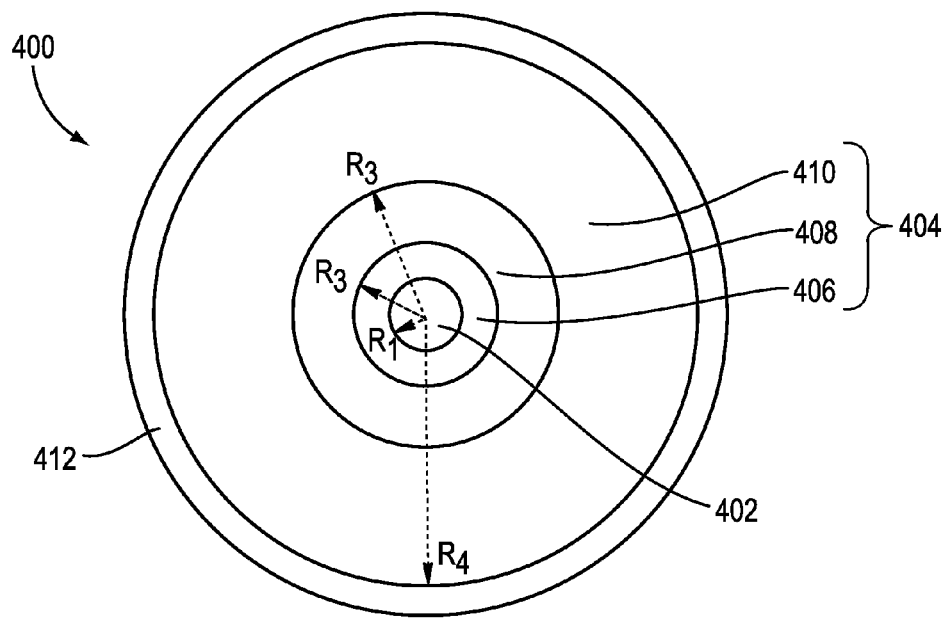
FIG. 26 is a schematic representation (not to scale) of a cross-sectional view of an optical waveguide fiber of FIG. 25.

FIG. 25 shows a schematic representation of the refractive index profile of a cross-section of the glass portion of an embodiment of a multimode optical fiber 400 comprising a glass core 402 and a glass cladding 404, the cladding comprising an inner annular portion 406, a depressed-index annular portion 408, and an outer annular portion 410. FIG. 26 is a schematic representation (not to scale) of a cross-sectional view of the optical waveguide fiber of FIG. 25. The core 402 has outer radius R1 and maximum refractive index delta Δ1MAX. The inner annular portion 406 has width W2 and outer radius R2. Depressed-index annular portion 408 has minimum refractive index delta percent Δ3MIN, width W3 and outer radius R3. The depressed-index annular portion 408 is shown offset, or spaced away, from the core 402 by the inner annular portion 406. The depressed-index annular portion 408 surrounds and contacts the inner annular portion 406. The outer annular portion 410 surrounds and contacts the depressed-indexed annular portion 408. The clad layer 404 is surrounded by at least one coating 412, which may in some embodiments comprise a low modulus primary coating and a high modulus secondary coating.

The inner annular portion 406 has a refractive index profile Δ2(r) with a maximum relative refractive index Δ2MAX, and a minimum relative refractive index Δ2MIN, where in some embodiments Δ2MAX=Δ2MIN. The depressed-index annular portion 408 has a refractive index profile Δ3(r) with a minimum relative refractive index Δ3MIN. The outer annular portion 410 has a refractive index profile Δ4(r) with a maximum relative refractive index Δ4MAX, and a minimum relative refractive index Δ4MIN, where in some embodiments Δ4MAX=Δ4MIN. Preferably, Δ1MAX>Δ2MAX>Δ3MIN. In some embodiments, the inner annular portion 406 has a substantially constant refractive index profile, as shown in FIG. 25 with a constant Δ2(r); in some of these embodiments, Δ2(r)=0%. In some embodiments, the outer annular portion 410 has a substantially constant refractive index profile, as shown in FIG. 25 with a constant Δ4(r); in some of these embodiments, Δ4(r)=0%. The core 402 has an entirely positive refractive index profile, where Δ1(r)>0%. R1 is defined as the radius at which the refractive index delta of the core first reaches value of 0.05%, going radially outwardly from the centerline. Preferably, the core 402 contains substantially no fluorine, and more preferably the core 402 contains no fluorine. In some embodiments, the inner annular portion 406 preferably has a relative refractive index profile Δ2(r) having a maximum absolute magnitude less than 0.05%, and Δ2MAX<0.05% and Δ2MIN>−0.05%, and the depressed-index annular portion 408 begins where the relative refractive index of the cladding first reaches a value of less than −0.05%, going radially outwardly from the centerline. In some embodiments, the outer annular portion 410 has a relative refractive index profile Δ4(r) having a maximum absolute magnitude less than 0.05%, and Δ4MAX<0.05% and Δ4MIN>−0.05%, and the depressed-index annular portion 408 ends where the relative refractive index of the cladding first reaches a value of greater than −0.05%, going radially outwardly from the radius where Δ3MIN is found.

Figure 27:
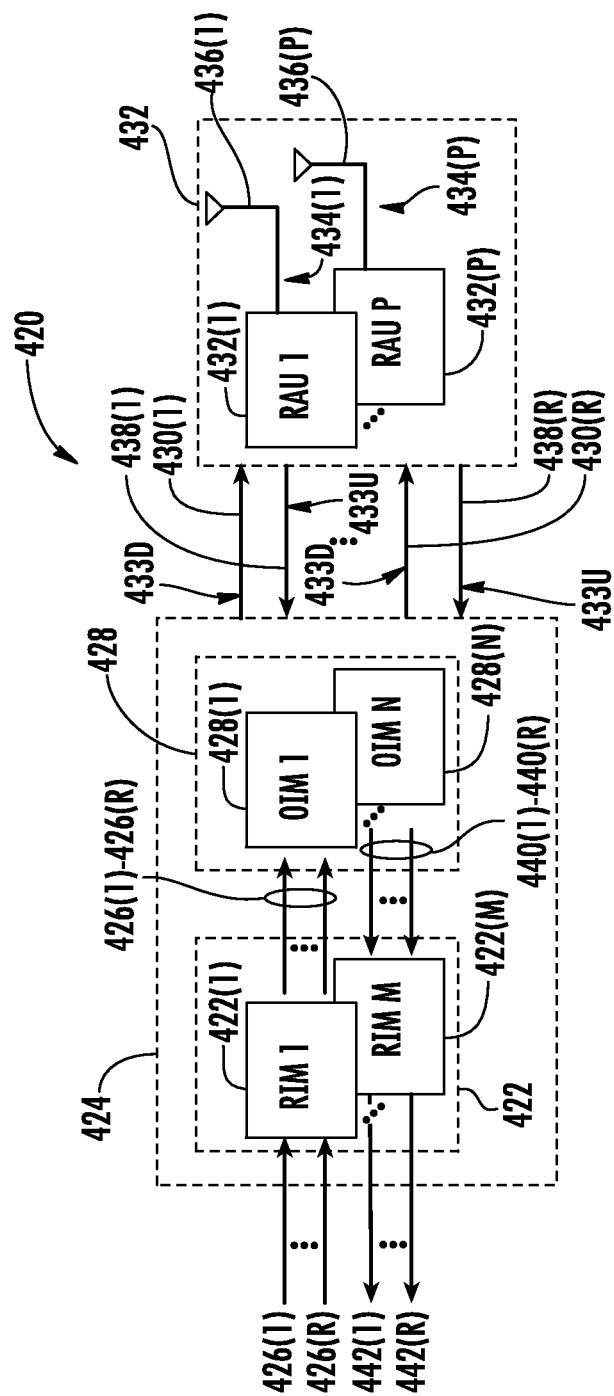
FIG. 27 is a schematic diagram of providing RF communication services to RAUs in an alternative optical fiber-based distributed communications system.

FIG. 27 is a schematic diagram of another exemplary distributed antenna system 420 that may be employed according to the embodiments disclosed herein to provide RF communication services and digital data services to RAUs. In this embodiment, the distributed antenna system 420 is an optical fiber-based distributed antenna system comprised of three (3) main components. One or more radio interfaces provided in the form of radio interface modules (RIMs) 422(1)-422(M) in this embodiment are provided in an HEU 424 to receive and process downlink electrical RF communications signals 426(1)-426(R) prior to optical conversion into downlink optical RF communications signals. The processing of the downlink electrical RF communications signals 426(1)-426(R) can include any of the processing previously described above in the HEU 12 in FIGS. 1-3. The notations "1-R" and "1-M" indicate that any number of the referenced component, 1-R and 1-M, respectively, may be provided. As will be described in more detail below, the HEU 424 is configured to accept a plurality of RIMs 422(1)-422(M) as modular components that can easily be installed and removed or replaced in the HEU 424. In one embodiment, the HEU 424 is configured to support up to four (4) RIMs 422(1)-422(M) as an example.

Each RIM 422(1)-422(M) can be designed to support a particular type of radio source or range of radio sources (i.e., frequencies) to provide flexibility in configuring the HEU 424 and the optical fiber-based distributed antenna system 420 to support the desired radio sources. For example, one RIM 422 may be configured to support the Personal Communication Services (PCS) radio band. Another RIM 422 may be configured to support the 700 MHz radio band. In this example, by inclusion of these RIMs 422, the HEU 424 would be configured to support and distribute RF communications signals on both PCS and LTE 700 radio bands. RIMs 422 may be provided in the HEU 424 that support any frequency bands desired, including but not limited to the US Cellular band, Personal Communication Services (PCS) band, Advanced Wireless Services (AWS) band, 700 MHz band, Global System for Mobile communications (GSM) 900, GSM 1800, and Universal Mobile Telecommunication System (UMTS). RIMs 422 may be provided in the HEU 424 that support any wireless technologies desired, including but not limited to Code Division Multiple Access (CDMA), CDMA200, 1×RTT, Evolution—Data Only (EV-DO), UMTS, High-speed Packet Access (HSPA), GSM, General Packet Radio Services (GPRS), Enhanced Data GSM Environment (EDGE), Time Division Multiple Access (TDMA), Long Term Evolution (LTE), iDEN, and Cellular Digital Packet Data (CDPD).

RIMs 422 may be provided in the HEU 424 that support any frequencies desired, including but not limited to US FCC and Industry Canada frequencies (824-849 MHz on uplink and 869-894 MHz on downlink), US FCC and Industry Canada frequencies (1850-1915 MHz on uplink and 1930-1995 MHz on downlink), US FCC and Industry Canada frequencies (1710-1755 MHz on uplink and 2110-2155 MHz on downlink), US FCC frequencies (698-716 MHz and 776-787 MHz on uplink and 728-746 MHz on downlink) EU R & TTE frequencies (880-915 MHz on uplink and 925-960 MHz on downlink), EU R & TTE frequencies (1710-1785 MHz on uplink and 1805-1880 MHz on downlink), EU R & TTE frequencies (1920-1980 MHz on uplink and 2110-2170 MHz on downlink), US FCC frequencies (806-824 MHz on uplink and 851-869 MHz on downlink), US FCC frequencies (896-901 MHz on uplink and 929-941 MHz on downlink), US FCC frequencies (793-805 MHz on uplink and 763-775 MHz on downlink), and US FCC frequencies (2495-2690 MHz on uplink and downlink).

The downlink electrical RF communications signals 426(1)-426(R) are provided to a plurality of optical interfaces provided in the form of optical interface modules (OIMs) 428(1)-428(N) in this embodiment to convert the downlink electrical RF communications signals 426(1)-426(N) into downlink optical signals 430(1)-430(R). The notation "1-N" indicates that any number of the referenced component 1-N may be provided. The OIMs 428 may be configured to provide one or more optical interface components (OICs) that contain O/E and E/O converters, as will be described in more detail below. The OIMs 428 support the radio bands that can be provided by the RIMs 422, including the examples previously described above. Thus, in this embodiment, the OIMs 428 may support a radio band range from 400 MHz to 2700 MHz, as an example, so providing different types or models of OIMs 428 for narrower radio bands to support possibilities for different radio band-supported RIMs 422 provided in the HEU 424 is not required. Further, as an example, the OIMs 428s may be optimized for sub-bands within the 400 MHz to 2700 MHz frequency range, such as 400-700 MHz, 700 MHz-1 GHz, 1 GHz-1.6 GHz, and 1.6 GHz-2.7 GHz, as examples.

The OIMs 428(1)-428(N) each include E/O converters to convert the downlink electrical RF communications signals 426(1)-426(R) to downlink optical signals 430(1)-430(R). The downlink optical signals 430(1)-430(R) are communicated over downlink optical fiber(s) 433D to a plurality of RAUs 432(1)-432(P). The notation "1-P" indicates that any number of the referenced component 1-P may be provided. O/E converters provided in the RAUs 432(1)-432(P) convert the downlink optical signals 430(1)-430(R) back into downlink electrical RF communications signals 426(1)-426(R), which are provided over links 434(1)-434(P) coupled to antennas 436(1)-436(P) in the RAUs 232(1)-232(P) to client devices in the reception range of the antennas 436(1)-436(P).

E/O converters are also provided in the RAUs 432(1)-432(P) to convert uplink electrical RF communications signals received from client devices through the antennas 436(1)-436(P) into uplink optical signals 438(1)-438(R) to be communicated over uplink optical fibers 433U to the OIMs 428(1)-428(N). The OIMs 428(1)-428(N) include O/E converters that convert the uplink optical signals 438(1)-438(R) into uplink electrical RF communications signals 440(1)-440(R) that are processed by the RIMs 422(1)-422(M) and provided as uplink electrical RF communications signals 442(1)-442(R).

It may be desirable to provide both digital data services and RF communication services for client devices. For example, it may be desirable to provide digital data services and RF communication services in the building infrastructure 70 (FIG. 3) to client devices located therein. Wired and wireless devices may be located in the building infrastructure 70 that are configured to access digital data services. Examples of digital data services include, but are not limited to, Ethernet, WLAN, WiMax, WiFi, Digital Subscriber Line (DSL), and LTE, etc. Ethernet standards could be supported, including but not limited to 100 Megabits per second (Mbs) (i.e., fast Ethernet) or Gigabit (Gb) Ethernet, or ten Gigabit (10 G) Ethernet. Examples of digital data devices include, but are not limited to, wired and wireless servers, wireless access points (WAPs), gateways, desktop computers, hubs, switches, remote radio heads (RRHs), baseband units (BBUs), and femtocells. A separate digital data services network can be provided to provide digital data services to digital data devices.

Figure 28:
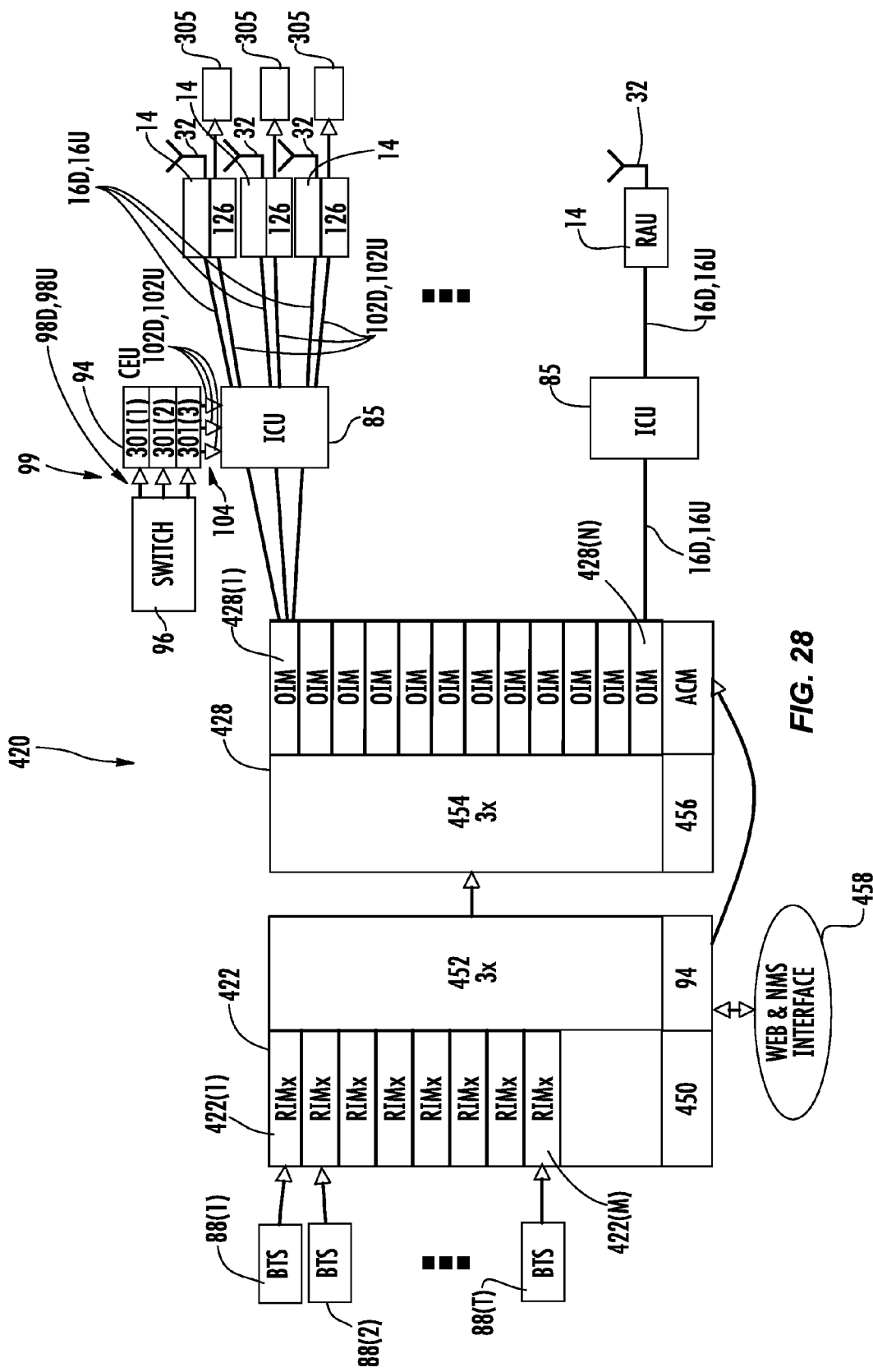
FIG. 28 is a schematic diagram of providing digital data services and RF communication services to RAUs and/or other remote units in the optical fiber-based distributed communications system of FIG. 27.

FIG. 28 is a schematic diagram of providing digital data services and RF communication services to RAUs and/or other remote units in the optical fiber-based distributed communications system 420 of FIG. 15. The digital data services can be provided to digital data services devices 305 connected to the RAUs 14, as illustrated in FIG. 15, such as Ethernet devices as examples. Common components between FIGS. 27 and 28 and other figures provided have the same element numbers and thus will not be re-described. As illustrated in FIG. 28, a power supply module (PSM) 450 may be provided to provide power to the RIMs 422(1)-422(M) and radio distribution cards (RDCs) 452 that distribute the RF communications from the RIMs 422(1)-422(M) to the OIMs 428(1)-428(N) through RDCs 454. A PSM 456 may be provided to provide power to the OIMs 428(1)-428(N). An interface, which may include web and network management system (NMC) interfaces, may also be provided to allow configuration and communication to the RIMs 422(1)-422(M) and other components of the optical fiber-based distributed communications system 220.

Figure 29:
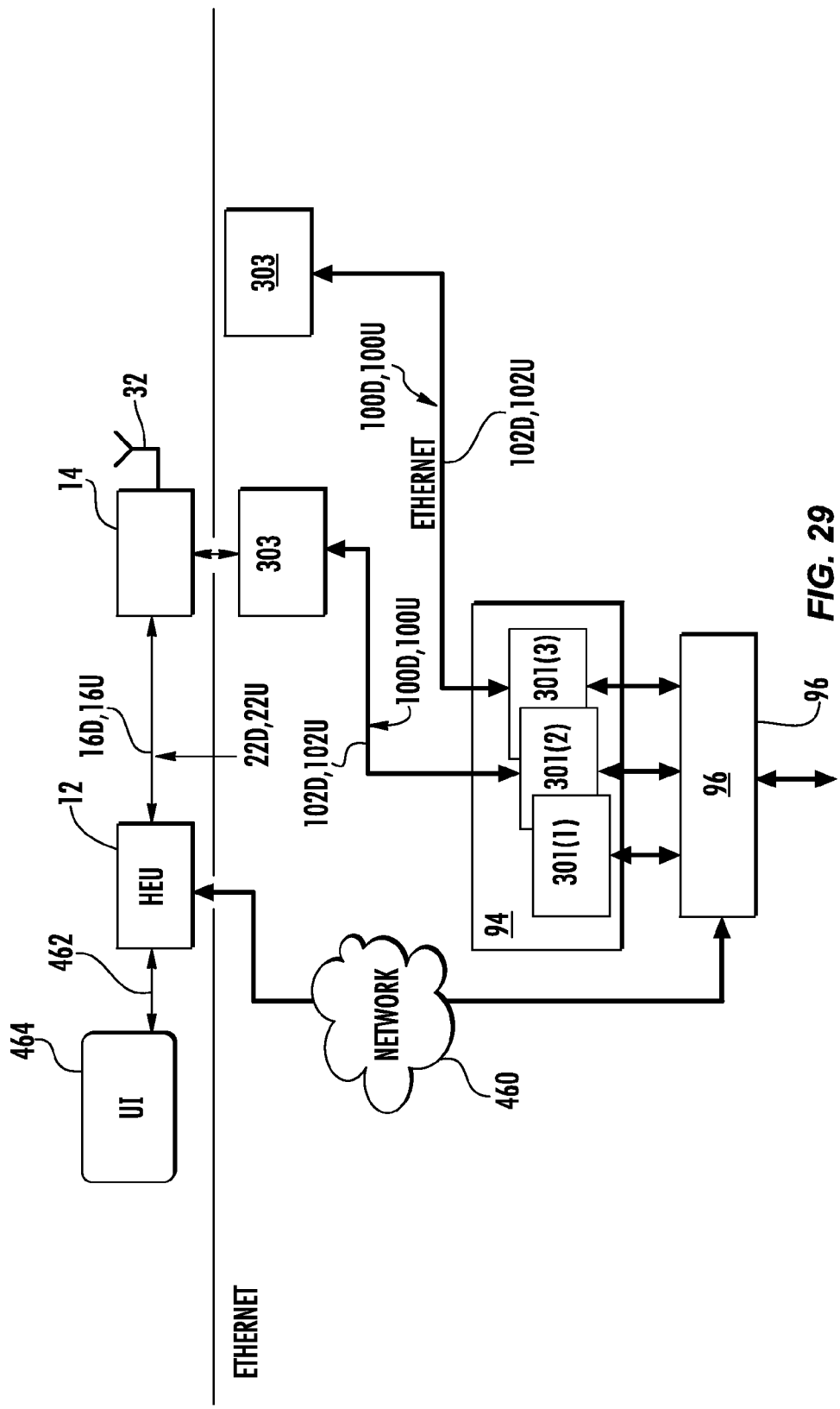
FIG. 29 is a schematic diagram of exemplary inter-module communication and management in the optical fiber-based distributed communications system of FIG. 27.

FIG. 29 is a schematic diagram of exemplary inter-module communication and management that may be provided in the optical fiber-based distributed communications system 420 of FIG. 28. For example, the HEU 12 and digital data services switch 96 may each be configured with interfaces that allow these devices to communicate over a network 460, such as an Internet protocol (IP) network as an example, to provide inter-module communications. Further, digital data services modules 301 provided in the HMC 94 and digital data services modules 303 provided in the RAUs 14 and standalone MCs 141 to provide AIls 118 (FIGS. 4 and 9) may also be equipped with interfaces that allow these modules to communicate to each other and to the HEU 12 and DDS switch 96 via the network 460. Various management functions can be provided by such inter-module communication, such as providing and distributing power, determining power budgets for modules, determining status of the modules and configuring modules, determining environment condition, such as temperature, determining signal status, such as signal strength, and PoE management at the RAUs 14 as examples. Examples of power management are discussed U.S. Patent Application Ser. Nos. 61/392,660 and 61/392,687 previously referenced and incorporated herein by reference in their entireties. The modules, such as the HEU 12 as illustrated in FIG. 29, may include a user interface (UI) 462 to allow a UI device 464, such as a web graphical UI (GUI), to access the HEU 12 and/or the other modules in the distributed communication system 420 to support user access to management features via inter-module communications.

Figure 30:
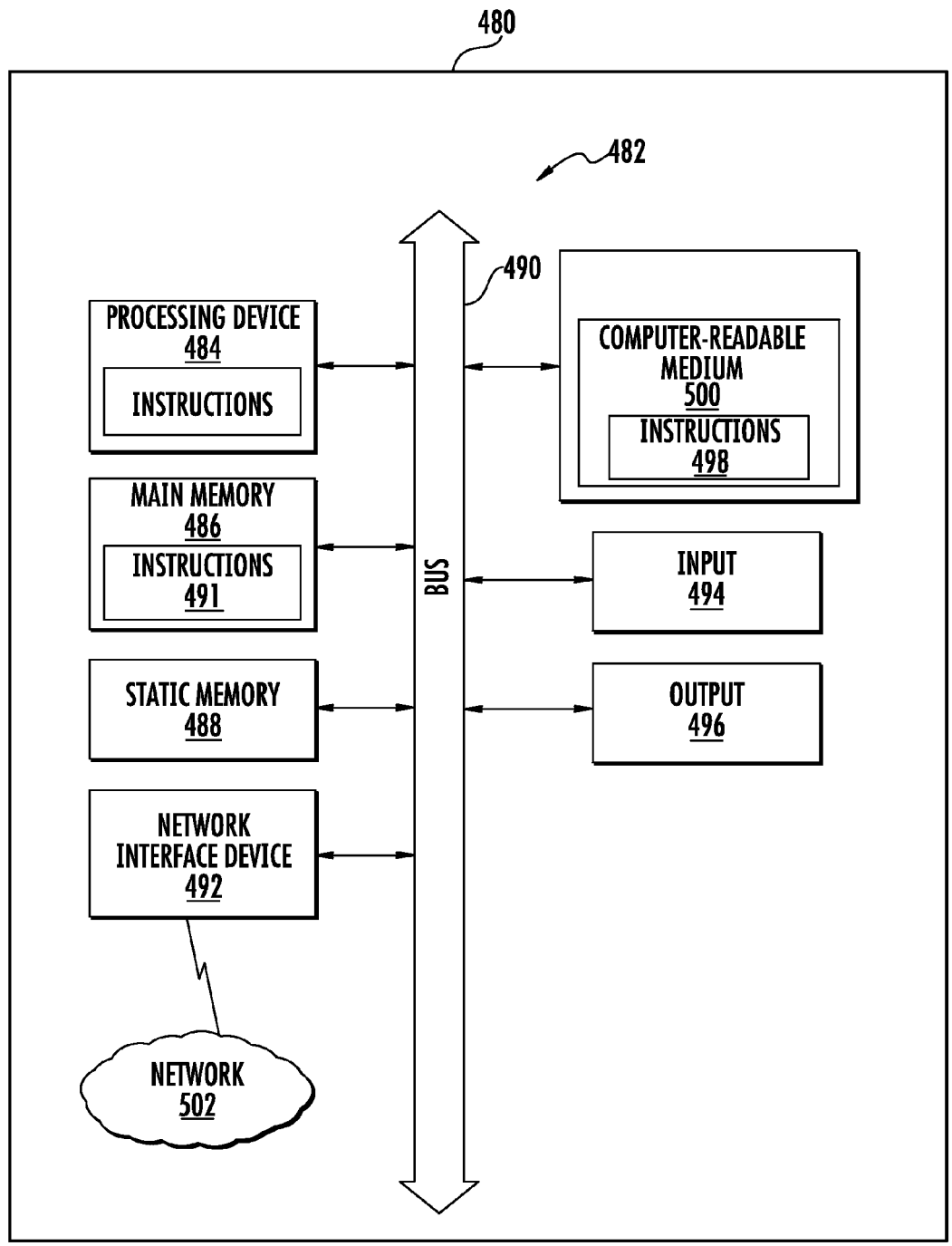
FIG. 30 is a schematic diagram of a generalized representation of an exemplary computer system that can be included in any of the modules provided in the exemplary distributed communications systems and/or their components described herein, wherein the exemplary computer system is adapted to execute instructions from an exemplary computer-readable medium.

FIG. 30 is a schematic diagram representation of an exemplary electronic device 480 in the exemplary form of an exemplary computer system 482 adapted to execute instructions from an exemplary computer-readable medium to perform power management functions. The electronic device 480 may be the digital data services modules 301 and/or 303, but could be any other module or device provided in the distributed communication systems described herein. In this regard, the electronic device 480 may comprise the computer system 482 within which a set of instructions for causing the electronic device 480 to perform any one or more of the methodologies discussed herein may be executed. The electronic device 480 may be connected (e.g., networked) to other machines in a LAN, an intranet, an extranet, or the Internet. The electronic device 480 may operate in a client-server network environment, or as a peer machine in a peer-to-peer (or distributed) network environment. While only a single device is illustrated, the term "device" shall also be taken to include any collection of devices that individually or jointly execute a set (or multiple sets) of instructions to perform any one or more of the methodologies discussed herein. The electronic device 480 may be a circuit or circuits included in an electronic board card, such as a printed circuit board (PCB) as an example, a server, a personal computer, a desktop computer, a laptop computer, a personal digital assistant (PDA), a computing pad, a mobile device, or any other device, and may represent, for example, a server or a user's computer.

The exemplary computer system 482 includes a processing device or processor 484, a main memory 486 (e.g., read-only memory (ROM), flash memory, dynamic random access memory (DRAM) such as synchronous DRAM (SDRAM), etc.), and a static memory 488 (e.g., flash memory, static random access memory (SRAM), etc.), which may communicate with each other via a bus 490. Alternatively, the processing device 484 may be connected to the main memory 486 and/or static memory 488 directly or via some other connectivity means. The processing device 484 may be a controller, and the main memory 486 or static memory 488 may be any type of memory, each of which can be included in the HEU 112, HMC 94, digital data services modules 301, 303, RAU 114, and/or AUs 118.

The processing device 484 represents one or more general-purpose processing devices such as a microprocessor, central processing unit, or the like. More particularly, the processing device 484 may be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing device 484 is configured to execute processing logic in instructions 491 for performing the operations and steps discussed herein.

The computer system 482 may further include a network interface device 492. The computer system 482 also may or may not include an input 494 to receive input and selections to be communicated to the computer system 482 when executing instructions. The computer system 482 also may or may not include an output 496, including but not limited to a display, a video display unit (e.g., a liquid crystal display (LCD) or a cathode ray tube (CRT)), an alphanumeric input device (e.g., a keyboard), and/or a cursor control device (e.g., a mouse).

The computer system 482 may or may not include a data storage device that includes instructions 498 stored in a computer-readable medium 500 embodying any one or more of the RAU power management methodologies or functions described herein. The instructions 498 may also reside, completely or at least partially, within the main memory 486 and/or within the processing device 484 during execution thereof by the computer system 482, the main memory 486 and the processing device 484 also constituting computer-readable media. The instructions 488 may further be transmitted or received over a network 502 via the network interface device 492.

While the computer-readable medium 500 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding or carrying a set of instructions for execution by the processing device and that cause the processing device to perform any one or more of the methodologies of the embodiments disclosed herein. The term "computer-readable medium" shall accordingly be taken to include, but not be limited to, solid-state memories, optical and magnetic media, and carrier wave signals.

The embodiments disclosed herein include various steps. The steps of the embodiments disclosed herein may be performed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes a machine-readable storage medium (e.g., read only memory ("ROM"), random access memory ("RAM"), magnetic disk storage media, optical storage media, flash memory devices, etc.), a machine-readable transmission medium (electrical, optical, acoustical or other form of propagated signals (e.g., carrier waves, infrared signals, digital signals, etc.), etc.

Unless specifically stated otherwise as apparent from the previous discussion, it is appreciated that throughout the description, discussions utilizing terms such as "processing," "computing," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The algorithms and displays presented herein are not inherently related to any particular computer or other apparatus. Various systems may be used with programs in accordance with the teachings herein, or it may prove convenient to construct more specialized apparatus to perform the required method steps. The required structure for a variety of these systems will appear from the description above. In addition, the embodiments described herein are not described with reference to any particular programming language. It will be appreciated that a variety of programming languages may be used to implement the teachings of the embodiments as described herein.

Those of skill in the art would further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The components of the distributed antenna systems described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A controller may be a processor. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The embodiments disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. It is to be understood that the operational steps illustrated in the flow chart diagrams may be subject to numerous different modifications as will be readily apparent to one of skill in the art. Those of skill in the art would also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Many modifications and other embodiments of the embodiments set forth herein will come to mind to one skilled in the art to which the embodiments pertain having the benefit of the teachings presented in the foregoing descriptions and the associated drawings. The embodiments disclosed herein do not have to include power distribution. Any combination of RF communication services, digital data services, and power distribution can be provide, including in the ICU examples described herein. For example, the ICU could be equipped to distribute RF communication services and digital data services. The ICU could also be equipped to distribute digital data services and power as another example. Therefore, it is to be understood that the description and claims are not to be limited to the specific embodiments disclosed and that modifications and other embodiments are intended to be included within the scope of the appended claims. It is intended that the embodiments cover the modifications and variations of the embodiments provided they come within the scope of the appended claims and their equivalents. Although specific terms are employed herein, they are used in a generic and descriptive sense only and not for purposes of limitation.

We claim:

1. A distribution unit for an optical-fiber based distributed communications system, comprising:
   at least one digital data services input configured to receive electrical digital data signals;
   at least one downlink digital data services output configured to distribute downlink digital data signals representing the electrical digital data signals over at least one downlink digital data services line to at least one remote antenna unit (RAU);
   at least one uplink digital data services output configured to distribute uplink digital data signals representing the electrical digital data signals over at least one uplink digital data services line from the at least one RAU;
   at least one radio frequency (RF) communications services input configured to receive optical RF communications signals;
   at least one RF communications services output configured to distribute the optical RF communications signals over at least one RF communications services optical fiber to the at least one RAU; and
   at least one power output configured to distribute power over at least one power line to the at least one RAU.

2. The distribution unit of claim 1 provided as an interconnect unit (ICU).

3. The distribution unit of claim 1, wherein:
the at least one downlink digital data services line is comprised of at least one downlink digital data services optical fiber; and
the at least one uplink digital data services line is comprised of at least one uplink digital data services optical fiber.

4. The distribution unit of claim 1, wherein the at least one downlink digital data services output is configured to distribute downlink optical digital data signals over at least one downlink digital data services optical fiber to at least one RAU.

5. The distribution unit of claim 1, wherein the at least one uplink digital data services output is configured to distribute uplink optical digital data signals over at least one uplink digital data services optical fiber to at least one RAU.

6. The distribution unit of claim 1, wherein the at least one RF communications services output is comprised of at least one downlink RF communications services output configured to distribute downlink optical digital signals over at least one RF communications services downlink optical fiber to at least one RAU.

7. The distribution unit of claim 1, wherein the at least one RF communications services output is comprised of at least one uplink RF communications services output configured to distribute uplink optical digital signals over at least one uplink RF communications services optical fiber from the at least RAU.

8. The distribution unit of claim 1, wherein the at least one downlink one digital data services line, the at least one uplink digital data services line, and the at least one RF communications services optical fiber are disposed in an array cable connected to the least one RAU.

9. The distribution unit of claim 1 disposed in a housing.

10. The distribution unit of claim 9, wherein the housing is comprised of a wall-mount housing.

11. The distribution unit of claim 1, further comprising at least one media controller configured to convert the electrical digital data signals from the at least one digital data services input into optical digital data signals.

12. The distribution unit of claim 11, wherein the at least one downlink digital data services output is configured to distribute the optical digital data signals over the at least one downlink digital data services line to at least one RAU.

13. The distribution unit of claim 11, wherein the at least one uplink digital data services output is configured to distribute the optical digital data signals over the at least one digital data services line to at least one RAU.

14. The distribution unit of claim 1, wherein the at least one downlink digital data services line, the at least one uplink digital data services line, the at least one RF communications services optical fiber, and the at least one power line are disposed in an array cable connected to the least one RAU.

15. The distribution unit of claim 1, wherein the at least one digital data services input, the at least one downlink digital data services output, the at least one uplink digital data services output, the at least one RF communications services input, and the at least one RF communications services output are provided in at least one distribution module.

16. The distribution unit of claim 15, wherein the at least one distribution module is configured to be installed in a housing.

17. The distribution unit of claim 15, further comprising at least one power supply configured to provide power to the at least one power output.

18. The distribution unit of claim 17, wherein the at least one power output is not co-located with the at least one distribution module.

19. The distribution unit of claim 15, further comprising a power supply not co-located with the at least one distribution module configured to provide power to the at least one power output in of the at least one distribution module.

20. The distribution unit of claim 15, wherein the at least one RF communications services input is not co-located with the at least one distribution module.

21. The distribution unit of claim 15, wherein the at least one digital data services input is not co-located with the at least one distribution module.

22. The distribution unit of claim 15, wherein the at least one distribution module is comprised of a plurality of distribution modules, each of the plurality of distribution modules including at least one digital data services input, at least one downlink digital data services output, at least one uplink digital data services output, at least one RF communications services input, and at least one RF communications services output.

23. The distribution unit of claim 22, further comprising a power supply in each of the plurality of distribution modules configured to provide power to the at least one power output in each of the plurality of distribution modules.

24. The distribution unit of claim 16, wherein the at least one distribution module is configured to be modularly installed in the housing.

25. The distribution unit of claim 1, wherein the at least one downlink digital data services line, the at least one uplink digital data services line, and the at least one RF communications services optical fiber are separate physical lines.

26. An optical-fiber based distributed communications system, comprising:
head-end equipment configured to:
receive downlink electrical radio frequency (RF) communications services signals; and
convert the downlink electrical RF communications services signals into downlink optical RF communications services signals to be communicated over at least one optical RF communications services downlink;
a controller configured to:
receive downlink digital data services signals containing at least one digital data service; and
provide the downlink digital data services signals over at least one digital data services downlink; and
a distribution unit, comprising:
at least one RF communications services input configured to receive the downlink optical RF communications services signals from the at least one downlink RF communications services downlink; and
at least one RF communications services output configured to distribute the downlink optical RF communications services signals over at least one RF communications services optical fiber to at least one remote antenna unit (RAU);
at least one digital data services input configured to receive the downlink digital data services signals from the at least one digital data services downlink;
at least one digital data services output configured to distribute the downlink digital data services signals over at least one digital data services line to the at least one RAU; and at least one power output configured to distribute power over at least one power line to the at least one RAU.

27. The system of claim 26, wherein
the at least one RF communications services input is further configured to distribute uplink optical RF communications services signals from the at least one RAU over at least one uplink RF communication services uplink to head-end equipment; and
the at least one digital data services input is further configured to distribute uplink digital data services signals from the at least one RAU over at least one digital data services uplink to the controller.

28. The system of claim 27, further comprising:
head-end equipment configured to:
receive the uplink optical RF communications services signals from the at least one RF communications services input;
convert the uplink optical RF communications services signals into uplink electrical RF communications services signals; and
wherein the controller is further configured to:
receive the uplink digital data services signals from the at least one digital data services input; and
provide the uplink digital data services signals over a digital data services network.

29. The system of claim 26, wherein the at least one digital data services downlink is comprised of at least one digital data services downlink optical fiber.

30. The system of claim 26, wherein the downlink digital data services signals are comprised of downlink electrical digital data services signals, and further comprising at least one media controller configured to convert the downlink electrical digital data services signals from the digital data services input into downlink optical digital data services signals.

31. The system of claim 26, wherein the at least one digital data services input, the at least one digital data services output, the at least one RF communications services input, and the at least one RF communications services output are provided in at least one distribution module.

32. The system of claim 31, further comprising at least one power supply configured to provide power to the at least one power output.

33. The system of claim 32, wherein the at least one power output is not co-located with the at least one distribution module.

34. The system of claim 31, further comprising a power supply not co-located with the at least one distribution module configured to provide power to the at least one power output in of the at least one distribution module.

35. The system of claim 31, wherein the at least one RF communications services input is not co-located with the at least one distribution module.

36. The system of claim 31, wherein the at least one digital data services input is not co-located with the at least one distribution module.

37. The system of claim 31, wherein the at least one distribution module is comprised of a plurality of distribution modules, each of the plurality of distribution modules including at least one digital data services input, at least one digital data services output, at least one RF communications services input, and at least one RF communications services output.

38. The system of claim 37, further comprising a power supply in each of the plurality of distribution modules configured to provide power to the at least one power output in each of the plurality of distribution modules.

39. The system of claim 26, wherein the at least one RF communications services optical fiber and the at least one digital data services line are separate physical lines.

* * * * *